(12) United States Patent
Lelieveldt et al.

(10) Patent No.: US 12,440,573 B2
(45) Date of Patent: Oct. 14, 2025

(54) ANTIBODY-CONJUGATES FOR TARGETING OF TUMOURS EXPRESSING PTK7

(71) Applicant: Synaffix B.V., Oss (NL)

(72) Inventors: Lianne Lelieveldt, Nijmegen (NL); Remon van Geel, Lithoijen (NL); Sander Sebastiaan van Berkel, Oss (NL); Floris Louis van Delft, Nijmegen (NL)

(73) Assignee: Synaffix B. V., Oss (NL)

( * ) Notice: Subject to any disclaimer, the term of this patent is extended or adjusted under 35 U.S.C. 154(b) by 0 days.

(21) Appl. No.: 18/892,253

(22) Filed: Sep. 20, 2024

(65) Prior Publication Data
US 2025/0099601 A1    Mar. 27, 2025

Related U.S. Application Data
(63) Continuation of application No. PCT/EP2023/057560, filed on Mar. 23, 2023.

(30) Foreign Application Priority Data
Mar. 23, 2022 (EP) ..................... 22163924

(51) Int. Cl.
- *A61K 47/68* (2017.01)
- *A61P 35/00* (2006.01)
- *C07K 16/40* (2006.01)

(52) U.S. Cl.
CPC .... *A61K 47/68037* (2023.08); *A61K 47/6815* (2017.08); *A61K 47/6889* (2017.08); *A61P 35/00* (2018.01); *C07K 16/40* (2013.01)

(58) Field of Classification Search
CPC combination set(s) only.
See application file for complete search history.

(56) References Cited

U.S. PATENT DOCUMENTS

| | | | |
|---|---|---|---|
| 2019/0153071 A1* | 5/2019 | Klein | C07K 16/468 |
| 2020/0140815 A1* | 5/2020 | Terrett | C12N 15/86 |

(Continued)

FOREIGN PATENT DOCUMENTS

| | | |
|---|---|---|
| EP | 3088419 B1 | 10/2018 |
| WO | WO-2009073546 A2 | 6/2009 |

(Continued)

OTHER PUBLICATIONS

Van Geel R, Wijdeven MA, Heesbeen R, Verkade JM, Wasiel AA, van Berkel SS, van Delft FL. Bioconjug Chem. Nov. 18, 2015;26(11):2233-42. doi: 10.1021/acs.bioconjchem.5b00224. Epub Jun. 10, 2015. PMID: 26061183. (Year: 2015).*

(Continued)

*Primary Examiner* — Adam Weidner
*Assistant Examiner* — Laura Ann Essex
(74) *Attorney, Agent, or Firm* — Dechert LLP; Andrew T. Wilkins; John P. Rearick

(57) ABSTRACT

The present invention concerns antibody-conjugates which are especially suitable for the targeting of PTK7-expressing cells, in particular tumour cells. The antibody-conjugates according to the invention have structure (1):

$$AB\text{-}[(L^6)_b\text{-}\{Z\text{-}L\text{-}D\}_x]_y \quad 1$$

Herein, AB is an antibody capable of targeting PTK7-expressing tumours; L is a linker that links Z to D; Z is a connecting group; $L^6$ is -GlcNAc(Fuc)$_w$-(G)$_j$-S-($L^7$)$_{w'}$-, wherein G is a monosaccharide, j is an integer in the range of 0-10, S is a sugar or a sugar derivative, GlcNAc is N-acetylglucosamine and Fuc is fucose, w is 0 or 1, w' is 0, 1 or 2 and $L^7$ is —N(H)C(O)CH$_2$—, —N(H)C(O)CF$_2$— or —CH$_2$—; D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, (Continued)

indolinobenzodiazepine dimers or pyrrolobenzodiazepine dimers (PBDs), and analogues or prodrugs thereof; b is 0 or 1; x is 1 or 2; and y is 1, 2, 3 or 4. The invention further concerns a method for preparing the antibody-conjugates of structure (1) and application of the antibody-conjugates of structure (1).

9 Claims, 11 Drawing Sheets

Specification includes a Sequence Listing.

(56) References Cited

U.S. PATENT DOCUMENTS

| | | | |
|---|---|---|---|
| 2023/0330245 A1 | 10/2023 | Hoogenboom et al. | |
| 2025/0082770 A1 | 3/2025 | Lelieveldt et al. | |
| 2025/0090679 A1 | 3/2025 | Wijdeven et al. | |

FOREIGN PATENT DOCUMENTS

| | | | | |
|---|---|---|---|---|
| WO | WO-2015168019 A2 | 11/2015 | | |
| WO | WO-2017137456 A1 | 8/2017 | | |
| WO | WO-2017137457 A1 * | 8/2017 | ............ | A61K 38/07 |
| WO | WO-2017137458 A1 | 8/2017 | | |
| WO | 2020094670 A1 | 5/2020 | | |
| WO | 2022058395 A1 | 3/2022 | | |

OTHER PUBLICATIONS

Tong JTW, Harris PWR, Brimble MA, Kavianinia I. An Insight into FDA Approved Antibody-Drug Conjugates for Cancer Therapy. Molecules. Sep. 27, 2021;26(19):5847. doi: 10.3390/molecules26195847. PMID: 34641391; PMCID: PMC8510272. (Year: 2021).*

Damelin M, Bankovich A, et al. Sci Transl Med. Jan. 11, 2017;9(372):eaag2611. doi: 10.1126/scitranslmed.aag2611. PMID: 28077676. (Year: 2017).*

Fu Z, Li S, Han S, Shi C, Zhang Y. Antibody drug conjugate: the "biological missile" for targeted cancer therapy. Signal Transduct Target Ther. Mar. 22, 2022;7(1):93. doi: 10.1038/s41392-022-00947-7. PMID: 35318309; PMCID: PMC8941077. (Year: 2022).* https://www.medchemexpress.com/ Retrieved May 7, 2025 (Year: 2025).*

Damelin et al., "A PTK7-targeted antibody-drug conjugate reduces tumor-initiating cells and induces sustained tumor regressions", Science Translational Medicine. 2017; 9(372): 2611.

Geel et al., "Chemoenzymatic Conjugation of Toxic Payloads to the Globally Conserved N-Glycan of Native mAbs Provides Homogeneous and Highly Efficacious Antibody-Drug Conjugates", Bioconjugate Chemistry. 2015, 26(11): 2233-2242.

Verkade et al., "A Polar Sulfamide Spacer Significantly Enhances the Manufacturability, Stability, and Therapeutic Index of Antibody-Drug Conjugates", Antibodies. 2018, 7(1): 12.

International Search Report for International Application No. PCT/EP2023/057560 dated Jul. 4, 2023.

Ashraf et al., "Humanised IgG1 antibody variants targeting membrane-bound carcinoembryonic antigen by antibody-dependent cellular cytotoxicity and phagocytosis," Br J Cancer. 2009;101(10):1758-68.

Dotan et al., "Phase I/II Trial of Labetuzumab Govitecan (Anti-CEACAM5/SN-38 Antibody-Drug Conjugate) in Patients With Refractory or Relapsing Metastatic Colorectal Cancer," J Clin Oncol. 2017;35(29):3338-3346.

Gazzah et al., "Safety, pharmacokinetics, and antitumor activity of the anti-CEACAM5-DM4 antibody-drug conjugate tusamitamab ravtansine (SAR408701) in patients with advanced solid tumors: first-in-human dose-escalation study," Ann Oncol. 2002;33(4):416-425.

International Search Report from PCT/EP2023/057561 dated Jun. 23, 2023.

International Search Report from PCT/EP2023/057565 dated Jun. 26, 2023.

Okajima et al., "Datopotamab Deruxtecan, a Novel TROP2-directed Antibody-drug Conjugate, Demonstrates Potent Antitumor Activity by Efficient Drug Delivery to Tumor Cells," Mol Cancer Ther. 2021;20(12):2329-2340.

* cited by examiner

2a R$^1$ = OH; R$^2$ = (CH$_2$)$_2$SH
2b R$^1$ = OH; R$^2$ = CH$_2$N$_3$
2c R$^1$ = OH; R$^2$ = CF$_2$N$_3$
2d R$^1$ = N$_3$; R$^2$ = CH$_3$

```
                            SEQUENCE LISTING

Sequence total quantity: 37
SEQ ID NO: 1            moltype = AA  length = 120
FEATURE                 Location/Qualifiers
REGION                  1..120
                        note = Anti-PTK7 VH
source                  1..120
                        mol_type = protein
                        organism = synthetic construct
SEQUENCE: 1
QITLKESGPT LVKPTQTLTL TCTFSGFSLS TSNMGVGWIR QPPGKALEWL AHIWWDDDKY   60
YSPSLKSRLT ITKDTSKNQV VLTMTNMDPV DTATYYCVRS NYGYAWFAYW GQGTLVTVSS  120

SEQ ID NO: 2            moltype = AA  length = 107
FEATURE                 Location/Qualifiers
REGION                  1..107
                        note = Anti-PTK7 VL
source                  1..107
                        mol_type = protein
                        organism = synthetic construct
SEQUENCE: 2
DIQMTQSPSS LSASVGDRVT ITCKASQDIY PYLNWFQQKP GKAPKTLIYR TNRLLDGVPS   60
RFSGSGSGTD FTFTISSLQP EDIATYYCLQ YDEFPLTFGA GTKLEIK                107

SEQ ID NO: 3            moltype = AA  length = 450
FEATURE                 Location/Qualifiers
REGION                  1..450
                        note = Anti-PTK7 HC
source                  1..450
                        mol_type = protein
                        organism = synthetic construct
SEQUENCE: 3
QITLKESGPT LVKPTQTLTL TCTFSGFSLS TSNMGVGWIR QPPGKALEWL AHIWWDDDKY   60
YSPSLKSRLT ITKDTSKNQV VLTMTNMDPV DTATYYCVRS NYGYAWFAYW GQGTLVTVSS  120
ASTKGPSVFP LAPSSKSTSG GTAALGCLVK DYFPEPVTVS WNSGALTSGV HTFPAVLQSS  180
GLYSLSSVVT VPSSSLGTQT YICNVNHKPS NTKVDKKVEP KSCDKTHTCP PCPAPELLGG  240
PSVFLFPPKP KDTLMISRTP EVTCVVVDVS HEDPEVKFNW YVDGVEVHNA KLTKPREEQY  300
NSTYRVVSVL TLVHQDWLNG KEYKCKVSNK ALPAPIEKTI SKAKGQPREP QVYTLPPSRD  360
ELTKNQVSLT CLVKGFYPSD IAVEWESNGQ PENNYKTTPP VLDSDGSFFL YSKLTVDKSR  420
WQQGNVFSCS VMHEALHNHY TQKSLSLSPG                                   450
```

```
SEQ ID NO: 4              moltype = AA   length = 213
FEATURE                   Location/Qualifiers
REGION                    1..213
                          note = Anti-PTK7 LC
source                    1..213
                          mol_type = protein
                          organism = synthetic construct
SEQUENCE: 4
DIQMTQSPSS LSASVGDRVT ITCKASQDIY PYLNWFQQKP GKAPKTLIYR TNRLLDGVPS    60
RFSGSGSGTD FTFTISSLQP EDIATYYCLQ YDEFPLTFGA GTKLEIKRTV AAPSVFIFPP   120
SDEQLKSGTA SVVCLLNNFY PREAKVQWKV DNALQSGNSQ ESVTQDSKDS TYSLSSTLTL   180
SKADYEKHKV YACEVTHQGL SSPVTKSFNR GEC                                213

SEQ ID NO: 5              moltype = AA   length = 119
FEATURE                   Location/Qualifiers
REGION                    1..119
                          note = Hu24, cofetuzumab VH
source                    1..119
                          mol_type = protein
                          organism = synthetic construct
SEQUENCE: 5
QVQLVQSGPE VKKPGASVKV SCKASGYTFT DYAVHWVRQA PGKRLEWIGV ISTYNDYTYN    60
NQDFKGRVTM TRDTSASTAY MELSRLRSED TAVYYCARGN SYFYALDYWG QGTSVTVSS    119

SEQ ID NO: 6              moltype = AA   length = 111
FEATURE                   Location/Qualifiers
REGION                    1..111
                          note = Hu24, cofetuzumab VL
source                    1..111
                          mol_type = protein
                          organism = synthetic construct
SEQUENCE: 6
EIVLTQSPAT LSLSPGERAT LSCRASESVD SYGKSFMHWY QQKPGQAPRL LIYRASNLES    60
GIPARFSGSG SGTDFTLTIS SLEPEDFAVY YCQQSNEDPW TFGGGTKLEI K            111

SEQ ID NO: 7              moltype = AA   length = 448
FEATURE                   Location/Qualifiers
REGION                    1..448
                          note = Hu24, cofetuzumab HC
source                    1..448
                          mol_type = protein
                          organism = synthetic construct
SEQUENCE: 7
QVQLVQSGPE VKKPGASVKV SCKASGYTFT DYAVHWVRQA PGKRLEWIGV ISTYNDYTYN    60
NQDFKGRVTM TRDTSASTAY MELSRLRSED TAVYYCARGN SYFYALDYWG QGTSVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSRDEL   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPG                                     448

SEQ ID NO: 8              moltype = AA   length = 218
FEATURE                   Location/Qualifiers
REGION                    1..218
                          note = Hu24, cofetuzumab LC
source                    1..218
                          mol_type = protein
                          organism = synthetic construct
SEQUENCE: 8
EIVLTQSPAT LSLSPGERAT LSCRASESVD SYGKSFMHWY QQKPGQAPRL LIYRASNLES    60
GIPARFSGSG SGTDFTLTIS SLEPEDFAVY YCQQSNEDPW TFGGGTKLEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218

SEQ ID NO: 9              moltype = AA   length = 113
FEATURE                   Location/Qualifiers
REGION                    1..113
                          note = Anti-PTK7 VL
source                    1..113
                          mol_type = protein
                          organism = synthetic construct
SEQUENCE: 9
DIVMTQSPLS LPVTPGEPAS ISCRSSKSLL HTKGDTYLYW FLQKPGQSPQ LLIYRMSNRA    60
SGVPDRFSGS GSGTDFTLKI SRVEAEDVGV YYCMQHLEYP FTFGQGTKLE IKR          113

SEQ ID NO: 10             moltype = AA   length = 118
FEATURE                   Location/Qualifiers
```

```
REGION                  1..118
                        note = Anti-PTK7 VH
source                  1..118
                        mol_type = protein
                        organism = synthetic construct
SEQUENCE: 10
QVQLVQSGAE VKKPGASVKV SCKASGYTFK DYYMHWVRQA PGQGLEWMGW IDPENGDTEY    60
APEFQGRVTM TRDTSTSTVY MELSSLRSED TAVYYCNACN YGSAYGYWGQ GTTLTVSS    118

SEQ ID NO: 11           moltype = AA   length = 108
FEATURE                 Location/Qualifiers
REGION                  1..108
                        note = Anti-PTK7 VL
source                  1..108
                        mol_type = protein
                        organism = synthetic construct
SEQUENCE: 11
ETTLTQSPAF MSATPGDKVN ISCITNTDID DDMNWYQQKP GEAAILLISE GNGLRPGIPP    60
RFSGSGYGTD FTLTINNIES EDAAYYFCLQ SDDNLPLTFG SGTKLEIK               108

SEQ ID NO: 12           moltype = AA   length = 120
FEATURE                 Location/Qualifiers
REGION                  1..120
                        note = Anti-PTK7 VH
source                  1..120
                        mol_type = protein
                        organism = synthetic construct
SEQUENCE: 12
EVQLVESGGG LVQPGGSLRL SCAASGFDFS RYWMSWVRQA PGKGLEWIGD LNPASSAINY    60
VDSVKGRFTI SRDNAKNSLY LQMNSLRAED TAVYYCTLIT TLVPYTMDFW GQGTSVTVSS  120

SEQ ID NO: 13           moltype = AA   length = 130
FEATURE                 Location/Qualifiers
REGION                  1..130
                        note = 4D5 VH
source                  1..130
                        mol_type = protein
                        organism = synthetic construct
SEQUENCE: 13
QVQLVESGGG VVQPGRSLRL SCAASGFTFS SYAFHWVRQA PGKGLEWVAV ISYDGSIKYY    60
ADSVKGRFTI SRDNSKNTLY LQMNSLRAED TAVYYCARTY YFDYWGQGTL VTVSSASTKG  120
PSVFPLAPSS                                                         130

SEQ ID NO: 14           moltype = AA   length = 107
FEATURE                 Location/Qualifiers
REGION                  1..107
                        note = 4D5 VL
source                  1..107
                        mol_type = protein
                        organism = synthetic construct
SEQUENCE: 14
EIVLTQSPDF QSVTPKEKVT ITCRASQSIG SSLHWYQQKP DQSPKLLIKY ASQSFSGVPS    60
RFSGSGSGTD FTLTINSLEA EDAAAYYCHQ SSSLPITFGQ GTRLEIK                107

SEQ ID NO: 15           moltype = AA   length = 444
FEATURE                 Location/Qualifiers
REGION                  1..444
                        note = 4D5 HC
source                  1..444
                        mol_type = protein
                        organism = synthetic construct
SEQUENCE: 15
QVQLVESGGG VVQPGRSLRL SCAASGFTFS SYAFHWVRQA PGKGLEWVAV ISYDGSIKYY    60
ADSVKGRFTI SRDNSKNTLY LQMNSLRAED TAVYYCARTY YFDYWGQGTL VTVSSASTKG  120
PSVFPLAPSS KSTSGGTAAL GCLVKDYFPE PVTVSWNSGA LTSGVHTFPA VLQSSGLYSL  180
SSVVTVPSSS LGTQTYICNV NHKPSNTKVD KKVEPKSCDK THTCPPCPAP ELLGGPSVFL  240
FPPKPKDTLM ISRTPEVTCV VVDVSHEDPE VKFNWYVDGV EVHNAKTKPR EEQYNSTYRV  300
VSVLTVLHQD WLNGKEYKCK VSNKALPAPI EKTISKAKGQ PREPQVYTLP PSRDELTKNQ  360
VSLTCLVKGF YPSDIAVEWE SNGQPENNYK TTPPVLDSDG SFFLYSKLTV DKSRWQQGNV  420
FSCSVMHEAL HNHYTQKSLS LSPG                                         444

SEQ ID NO: 16           moltype = AA   length = 214
FEATURE                 Location/Qualifiers
REGION                  1..214
                        note = 4D5 LC
source                  1..214
                        mol_type = protein
                        organism = synthetic construct
SEQUENCE: 16
```

```
EIVLTQSPDF QSVTPKEKVT ITCRASQSIG SSLHWYQQKP DQSPKLLIKY ASQSFSGVPS    60
RFSGSGSGTD FTLTINSLEA EDAAAYYCHQ SSSLPITFGQ GTRLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                              214

SEQ ID NO: 17           moltype = AA  length = 112
FEATURE                 Location/Qualifiers
REGION                  1..112
                        note = 12C6 VH
source                  1..112
                        mol_type = protein
                        organism = synthetic construct
SEQUENCE: 17
EVQLVQSGGG LVHPGGSLRL SCAGSGFTFS TYLMYWVRQA PGKTLEWVSA IGSGGDTYYA    60
DSVKGRFTIS RDNAKNSLYL QMNSLRAEDM AVYYCARGLG YWGQGTLVTV SS           112

SEQ ID NO: 18           moltype = AA  length = 109
FEATURE                 Location/Qualifiers
REGION                  1..109
                        note = 12C6 VL
source                  1..109
                        mol_type = protein
                        organism = synthetic construct
SEQUENCE: 18
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPMYTF GQGTKLEIK              109

SEQ ID NO: 19           moltype = AA  length = 440
FEATURE                 Location/Qualifiers
REGION                  1..440
                        note = 12C6 HC
source                  1..440
                        mol_type = protein
                        organism = synthetic construct
SEQUENCE: 19
VQLVQSGGGL VHPGGSLRLS CAGSGFTFST YLMYWVRQAP GKTLEWVSAI GSGGDTYYAD    60
SVKGRFTISR DNAKNSLYLQ MNSLRAEDMA VYYCARGLGY WGQGTLVTVS SASTKGPSVF   120
PLAPSSKSTS GGTAALGCLV KDYFPEPVTV SWNSGALTSG VHTFPAVLQS SGLYSLSSVV   180
TVPSSSLGTQ TYICNVNHKP SNTKVDKKVE PKSCDKTHTC PPCPAPELLG GPSVFLFPPK   240
PKDTLMISRT PEVTCVVVDV SHEDPEVKFN WYVDGVEVHN AKTKPREEQY NSTYRVVSVL   300
TVLHQDWLNG KEYKCKVSNK ALPAPIEKTI SKAKGQPREP QVYTLPPSRD ELTKNQVSLT   360
CLVKGFYPSD IAVEWESNGQ PENNYKTTPP VLDSDGSFFL YSKLTVDKSR WQQGNVFSCS   420
VMHEALHNHY TQKSLSLSPG                                              440

SEQ ID NO: 20           moltype = AA  length = 216
FEATURE                 Location/Qualifiers
REGION                  1..216
                        note = 12C6 LC
source                  1..216
                        mol_type = protein
                        organism = synthetic construct
SEQUENCE: 20
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPMYTF GQGTKLEIKR TVAAPSVFIF   120
PPSDEQLKSG TASVVCLLNN FYPREAKVQW KVDNALQSGN SQESVTEQDS KDSTYSLSST   180
LTLSKADYEK HKVYACEVTH QGLSSPVTKS FNRGEC                            216

SEQ ID NO: 21           moltype = AA  length = 107
FEATURE                 Location/Qualifiers
REGION                  1..107
                        note = 12C6A = 1F12 VL
source                  1..107
                        mol_type = protein
                        organism = synthetic construct
SEQUENCE: 21
DIQMTQSPSS LSASVGDRVT ITCRASQGIS SWLAWYQQKP EKAPKSLIYA ASSLQSGVPS    60
RFSGSGSGTD FTLTISSLQP EDFATYYCQQ YNSYPYTFGQ GTKLEIK                107

SEQ ID NO: 22           moltype = AA  length = 214
FEATURE                 Location/Qualifiers
REGION                  1..214
                        note = 12C6A = 1F12 LC
source                  1..214
                        mol_type = protein
                        organism = synthetic construct
SEQUENCE: 22
DIQMTQSPSS LSASVGDRVT ITCRASQGIS SWLAWYQQKP EKAPKSLIYA ASSLQSGVPS    60
RFSGSGSGTD FTLTISSLQP EDFATYYCQQ YNSYPYTFGQ GTKLEIKRTV AAPSVFIFPP   120
SDEQLKSGTA SVVCLLNNFY PREAKVQWKV DNALQSGNSQ ESVTEQDSKD STYSLSSTLT   180
```

```
LSKADYEKHK VYACEVTHQG LSSPVTKSFN RGEC                            214

SEQ ID NO: 23           moltype = AA   length = 126
FEATURE                 Location/Qualifiers
REGION                  1..126
                        note = 7C8 VH
source                  1..126
                        mol_type = protein
                        organism = synthetic construct
SEQUENCE: 23
QVQLVESGGG VVQPGRSLRL SCAASGFTFS SYGMHWVRQA PGKGLEWVAV IWDDGSNKYY  60
VDSVKGRFTI SRDNSKNTLY LQMNSLRAED TAVYYCARDD YYGSGSFNSY YGTDVWGQGT 120
TVTVSS                                                           126

SEQ ID NO: 24           moltype = AA   length = 108
FEATURE                 Location/Qualifiers
REGION                  1..108
                        note = 7C8 VL
source                  1..108
                        mol_type = protein
                        organism = synthetic construct
SEQUENCE: 24
EIVLTQSPAT LSLSPGERAT LSCRASQSVS IYLAWYQQKP GQAPRLLIYD ASNRATGIPA  60
RFSGSGSGTD FTLTISSLEP EDFAVYYCQQ RSNWPPFTFG PGTKVDIK             108

SEQ ID NO: 25           moltype = AA   length = 215
FEATURE                 Location/Qualifiers
REGION                  1..215
                        note = 7C8 LC
source                  1..215
                        mol_type = protein
                        organism = synthetic construct
SEQUENCE: 25
EIVLTQSPAT LSLSPGERAT LSCRASQSVS IYLAWYQQKP GQAPRLLIYD ASNRATGIPA  60
RFSGSGSGTD FTLTISSLEP EDFAVYYCQQ RSNWPPFTFG PGTKVDIKRT VAAPSVFIFP 120
PSDEQLKSGT ASVVCLLNNF YPREAKVQWK VDNALQSGNS QESVTEQDSK DSTYSLSSTL 180
TLSKADYEKH KVYACEVTHQ GLSSPVTKSF NRGEC                            215

SEQ ID NO: 26           moltype = AA   length = 455
FEATURE                 Location/Qualifiers
REGION                  1..215
                        note = 7C8 HC
source                  1..455
                        mol_type = protein
                        organism = synthetic construct
SEQUENCE: 26
QVQLVESGGG VVQPGRSLRL SCAASGFTFS SYGMHWVRQA PGKGLEWVAV IMDDGSNKYY  60
VDSVKGRFTI SRDNSKNTLY LQMNSLRAED TAVYYCARDD YYGSGSFNSY YGTDVWGQGT 120
TVTVSSASTK GPSVFPLAPS SKSTSGGTAA LGCLVKDYFP EPVTVSWNSG ALTSGVHTFP 180
AVLQSSGLYS LSSVVTVPSS SLGTQTYICN VNHKPSNTKV DKKVEPKSCD KTHTCPPCPA 240
PELLGGPSVF LFPPKPKDTL MISRTPEVTC VVVDVSHEDP EVKFNWYVDG VEVHNAKTKP 300
REEQYNSTYR VVSVLTVLHQ DWLNGKEYKC KVSNKALPAP IEKTISKAKG QPREPQVYTL 360
PPSRDELTKN QVSLTCLVKG FYPSDIAVEW ESNGQPENNY KTTPPVLDSD GSFFLYSKLT 420
VDKSRWQQGN VFSCSVMHEA LHNHYTQKSL SLSPG                            455

SEQ ID NO: 27           moltype = AA   length = 457
FEATURE                 Location/Qualifiers
REGION                  1..457
                        note = B12 HC
source                  1..457
                        mol_type = protein
                        organism = synthetic construct
SEQUENCE: 27
QVQLVQSGAE VKKPGASVKV SCQASGYRFS NFVIHWVRQA PGQRFEWMGW INPYNGNKEF  60
SAKFQDRVTF TADTSANTAY MELRSLRSAD TAVYYCARVG PYSWDDSPQD NYYMDVWGKG 120
TTVIVSSAST KGPSVFPLAP SSKSTSGGTA ALGCLVKDYF PEPVTVSWNS GALTSGVHTF 180
PAVLQSSGLY SLSSVVTVPS SSLGTQTYIC NVNHKPSNTK VDKKVEPKSC DKTHTCPPCP 240
APELLGGPSV FLFPPKPKDT LMISRTPEVT CVVVDVSHED PEVKFNWYVD GVEVHNAKTK 300
PREEQYNSTY RVVSVLTVLH QDWLNGKEYK CKVSNKALPA PIEKTISKAK GQPREPQVYT 360
LPPSRDELTK NQVSLTCLVK GFYPSDIAVE WESNGQPENN YKTTPPVLDS DGSFFLYSKL 420
TVDKSRWQQG NVFSCSVMHE ALHNHYTQKS LSLSPGK                          457

SEQ ID NO: 28           moltype = AA   length = 215
FEATURE                 Location/Qualifiers
REGION                  1..215
                        note = B12 LC
source                  1..215
                        mol_type = protein
                        organism = synthetic construct
```

```
SEQUENCE: 28
EIVLTQSPGT LSLSPGERAT FSCRSSHSIR SRRVAWYQHK PGQAPRLVIH GVSNRASGIS    60
DRFSGSGSGT DFTLTITRVE PEDFALYYCQ VYGASSYTFG QGTKLERKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGEC                              215

SEQ ID NO: 29           moltype = AA   length = 4
FEATURE                 Location/Qualifiers
REGION                  1..4
                        note = Artificial Sequence
source                  1..4
                        mol_type = protein
                        organism = synthetic construct
SEQUENCE: 29
GGFG                                                                  4

SEQ ID NO: 30           moltype = AA   length = 120
FEATURE                 Location/Qualifiers
source                  1..120
                        mol_type = protein
                        organism = synthetic construct
SEQUENCE: 30
QITLKESGPT LVKPTQTLTL TCTFSGFSLS TSNMGVGWIR QPPGKALEWL AHIWWDDDKY    60
YSPSLKSRLT ITKDTSKNQV VLTMTNMDPV DTATYYCVRS NYGYAWFAYW GQGTLVTVSS   120

SEQ ID NO: 31           moltype = AA   length = 449
FEATURE                 Location/Qualifiers
source                  1..449
                        mol_type = protein
                        organism = synthetic construct
SEQUENCE: 31
QITLKESGPT LVKPTQTLTL TCTFSGFSLS TSNMGVGWIR QPPGKALEWL AHIWWDDDKY    60
YSPSLKSRLT ITKDTSKNQV VLTMTNMDPV DTATYYCVRS NYGYAWFAYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSRDE   360
LTKNQVSLTC LVKGFYPSDI AVEWESNGQP ENNYKTTPPV LDSDGSFFLY SKLTVDKSRW   420
QQGNVFSCSV MHEALHNHYT QKSLSLSPG                                     449

SEQ ID NO: 32           moltype = AA   length = 107
FEATURE                 Location/Qualifiers
source                  1..107
                        mol_type = protein
                        organism = synthetic construct
SEQUENCE: 32
DIQMTQSPSS LSASVGDRVT ITCKASQDIY PYLNWFQQKP GKAPKTLIYR TNRLLDGVPS    60
RFSGSGSGTD FTFTISSLQP EDIATYYCLQ YDEFPLTFGA GTKLEIK                 107

SEQ ID NO: 33           moltype = AA   length = 214
FEATURE                 Location/Qualifiers
source                  1..214
                        mol_type = protein
                        organism = synthetic construct
SEQUENCE: 33
DIQMTQSPSS LSASVGDRVT ITCKASQDIY PYLNWFQQKP GKAPKTLIYR TNRLLDGVPS    60
RFSGSGSGTD FTFTISSLQP EDIATYYCLQ YDEFPLTFGA GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 34           moltype = AA   length = 120
FEATURE                 Location/Qualifiers
source                  1..120
                        mol_type = protein
                        organism = synthetic construct
```

```
SEQUENCE: 34
EVQLVESGGG LVQPGGSLRL SCAASGFDFS RYWMSWVRQA PGKGLEWIGD LNPDSSAINY    60
VDSVKGRFTI SRDNAKNSLY LQMNSLRAED TAVYYCTLIT TLVPYTMDFW GQGTSVTVSS   120

SEQ ID NO: 35           moltype = AA  length = 449
FEATURE                 Location/Qualifiers
source                  1..449
                        mol_type = protein
                        organism = synthetic construct
SEQUENCE: 35
EVQLVESGGG LVQPGGSLRL SCAASGFDFS RYWMSWVRQA PGKGLEWIGD LNPDSSAINY    60
VDSVKGRFTI SRDNAKNSLY LQMNSLRAED TAVYYCTLIT TLVPYTMDFW GQGTSVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKKVEP KSCDKTHTCP PCPAPELLGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSRDE   360
LTKNQVSLTC LVKGFYPSDI AVEWESNGQP ENNYKTTPPV LDSDGSFFLY SKLTVDKSRW   420
QQGNVFSCSV MHEALHNHYT QKSLSLSPG                                    449

SEQ ID NO: 36           moltype = AA  length = 107
FEATURE                 Location/Qualifiers
source                  1..107
                        mol_type = protein
                        organism = synthetic construct
SEQUENCE: 36
ETTLTQSPAF MSATPGDKVN ISCITNTDID DDMNWYQQKP GEAAILLISE GNGLRPGIPP    60
RFSGSGYGTD FTLTINNIES EDAAYYFCLQ SDNLPLTFGS GTKLEIK                107

SEQ ID NO: 37           moltype = AA  length = 214
FEATURE                 Location/Qualifiers
source                  1..214
                        mol_type = protein
                        organism = synthetic construct
SEQUENCE: 37
ETTLTQSPAF MSATPGDKVN ISCITNTDID DDMNWYQQKP GEAAILLISE GNGLRPGIPP    60
RFSGSGYGTD FTLTINNIES EDAAYYFCLQ SDNLPLTFGS GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                              214
```

ANTIBODY-CONJUGATES FOR TARGETING OF TUMOURS EXPRESSING PTK7

RELATED APPLICATIONS

This application is a continuation of International Patent Application No. PCT/EP2023/057560, filed Mar. 23, 2023, which claims priority to European Patent Application Serial No. 22163924.8, filed Mar. 23, 2022, the entire disclosures of which are hereby incorporated herein by reference.

SEQUENCE LISTING

The content of the electronically submitted Sequence Listing (Name: "P6108678PCT-1.xml"; Size: 58,000 bytes; Date of Creation: May 10, 2023) submitted in this application is incorporated herein by reference in its entirety.

FIELD OF THE INVENTION

The present invention is in the field of bioconjugation. More specifically, the present invention relates to antibody-drug conjugates for targeted treatment of patients with cancer, in particular PTK7-expressing tumours.

BACKGROUND

A promising approach for targeted treatment of tumours entails the conjugation of a multitude (2 to 8) of highly toxic payloads to a monoclonal antibody, thereby generating an antibody-drug conjugate (ADCs). ADCs are well known in the art, as for example described by Chari et al., *Angew. Chem. nt. Ed.* 2014, 53, 3796 and Beck et al., *Nat. Rev. Drug Discov.* 2017,16, 315-37. Mechanistically, the antibody is designed to bind with high specificity to tumour-associated receptor that is overexpressed versus healthy tissue. The ADC is thought to internalize into the tumour cell after binding to the receptor, then to release the toxic payload upon degradation of the antibody and/or the linker in the lysosome.

Current ADCs are commonly prepared by various conjugation technologies (summarized in FIG. 1), mostly based on conjugation to cysteine side chains with maleimides or to lysine side chains with activated esters. To generate an ADC based on native cysteines naturally engaged in disulfide bonds, the thiol in the side-chain can be liberated by subjection of the antibody to a suitable reducing agent such as TCEP or DTT, followed by treatment with a maleimide-functionalized linker-drug. The resulting ADC will typically consist of a mixture of positional isomers, in case only the total of eight free thiols are not comprehensively alkylated. Alternatively, to generate a site-specific ADC, an antibody can be generated by mutating one or more amino acids at defined positions in the sequence to cysteines, the side-chain of which can be selectively liberated for alkylation by a reduction-oxidation sequence. Commonly employed cysteines for site-specific conjugation are LC-41C (light chain 41C), HC-41C (heavy chain 41C), LC-80C, HC-118C, HC-265C, HC-140C, LC-149C, LC-124C, LC-180C, HC-190C, HC-160C, LC-183C, HC-290C, LC-205C, HC-220C, HC-239C, HC-442C. An additional cysteine can also be inserted into the sequence, for example HC-i239C. Besides maleimides as alkylating agents, reaction of cysteine side chain with haloacetamide or vinylbenzene derivatives has also been reported. Besides reaction to natural amino acid side chains, specific unnatural (non-canonical) amino acids can also be engineered into the amino acid sequence of an antibody, thereby providing a unique handle for chemical conjugation, such as ketone, acetylene, azide, cyclic alkyne or cyclic alkene, for reaction with oxime, azide, alkyne or tetrazine, respectively. However, a disadvantage of the latter approach is that the natural sequence of the antibody must be re-engineered, which besides being time-consuming and costly, may lead to instability issues.

Conjugation through the glycan by an oxidation-ligation sequence is known in the art and has for example been described by Hamann et al. (*Bioconjugate Chem.* 2002, 13, 47-58). Chemoenzymatic conjugation through the glycan is known in the art and has been described for the use of sialyltransferase by Boons et al, *Angew. Chem. Int. Ed.* 2014, 53, 7179, and for the use of a mutant galactosyltransferase by Zhu et al, *mAbs* 2014, 6, 1 and Cook et al, *Bioconjugate Chem.* 2016, 27, 1789.

Chemoenzymatic conjugation through the glycan including first trimming of the glycan is known in the art and has been described by van Geel et al, *Bioconjugate Chem.* 2015, 26, 2233 and is schematically depicted in FIG. 2. In short, the monoclonal antibody is treated with an endoglycosidase to trim the glycan down to the core GlcNAc (attached directly to Asn-297), followed by transfer of an azido-modified sugar under the action of a glycosyltransferase. Various structures of UDP-azidosugars are depicted in FIG. 3. One particularly suitable combination involves that transfer of GalNAz 2b (2-azidoacetyl-N-galactosamine) under the action of a mutant galactosyltransferase GalT(Y289L) as disclosed in WO 2007/095506, EP 2911699 B1 and van Geel et al. Another useful combination entails GlcNAz with a-1,3-mannosyl-glycoprotein-2-b-N-acetylglucosaminyl-transferase (MGAT1) and a-1,6-mannosyl-glycoprotein-2-b-N-acetylglucosaminyltransferase (MGAT2) and as disclosed in WO2018/126092 and WO2021/248048.

Various cyclooctynes for application in metal-free click chemistry are known in the art (FIG. 4). In particular, various cyclooctynes such as DIBO (I), DBCO/DIBAC (J), s-DIBO (K), BCN (L) and TMTHSI (T) are regularly applied for conjugation to azide.

A payload for an ADCs is typically a highly cytotoxic molecule, with $IC_{50}$-value in low nanomolar or picomolar range, in particular low to medium molecular weight compounds (e.g. about 200 to about 2500 Da). Examples of suitable cytotoxin classes for ADCs include anthracyclines, camptothecins, taxanes, tubulysins, enediynes, inhibitory peptides, amanitins, duocarmycins, maytansinoids, auristatins, eribulins, hemiasterlins, BCL-XL inhibitors, KSP inhibitors, TLR agonists, indolinobenzodiazepine dimers or pyrrolobenzodiazepine dimers (PBDs) and analogues or prodrugs thereof. A representative set of cytotoxic molecules, and/or synthetic derivatives or prodrugs thereof, with suitable attachment point for conjugation to a monoclonal antibody, is depicted in FIG. 5.

Specific examples of anthracyclins suitable of application in ADCs include (but are not limited to) doxorubicin, daunorubicin, nemorubicin and PNU-159,682.

Specific examples of camptothecins suitable for application in ADCs include (but are not limited to)SN-38, exatecan, exatecan-S, topotecan, silatecan, cositecan, lurtotecan, gimatecan, belotecan, rubitecan, AMDCPT, G-AMDCPT and other synthetic camptothecins the structures of which are depicted in FIG. 6. Various novel camptothecins have been disclosed in EP0296597, WO2019/236954, WO2020/200880, WO2020/219287, CN113816969, CN113710277 and US20180200273.

Specific examples of enediynes suitable for application in ADCs include (but are not limited to) calicheamicin, esperamicins, shishijimicins and namenamicins and other enediynes as summarized by Galm et al., *Chem. Rev.* 2005, 105, 739-758.

Specific examples of auristatins suitable for application in ADCs include (but are not limited to) MMAD, MMAE, MMAF and PF-06380101 and other auristatins as summarized by Maderna et al., *Mol. Pharmaceutics* 2015, 12, 1798-1812.

Protein tyrosine kinase 7 (PTK7) is a highly conserved member of the pseudokinase family of receptor tyrosine kinases, without observable kinase activity across various species. Genetic and biochemical studies have demonstrated a key function for PTK7 in noncanonical Wnt signaling, and PTK7-deficient embryos exhibit severe developmental defects in planar cell polarity. There is also evidence for additional functions of PTK7 in the vascular endothelial growth factor (VEGF), semaphorin/plexin, and canonical Wnt signaling pathways. Oncogenic functions of PTK7 have been documented in colon cancer, lung cancer, breast cancer, ovarian cancer and esophageal cancer, and PTK7 promotes cell survival and resistance to chemotherapy in acute myeloid leukemia.

Antibodies against PTK7 are known in the art, as disclosed in U.S. Pat. No. 9,777,070B2 (H23 and H24, also known as cofetuzumab), U.S. Pat. No. 9,777,070B2, U.S. Pat. No. 9,505,845B2/U.S. Pat. No. 9,102,738B2 (4D6, 12C6, 12C6A/1F12 and 7C8) and WO2015/168019 (e.g. Hu23 and Hu58).

ADCs targeting PTK7 are known in the art, such as for example PF-06647020/ABBV-647 (cofetuzumab pelidotin), based on a humanized, anti-PTK7 antibody and an auristatin microtubule inhibitor payload (Aur0101). PF-06647020 was shown to induce prolonged tumor regression in patient-derived, tumor xenograft preclinical models and a tolerable safety profile and preliminary clinical activity in previously treated patients administered every 2 or 3 weeks, with locally advanced/metastatic, PTK7-positive NSCLC, TNBC, and platinum-resistant OvCa.

SUMMARY OF THE INVENTION

The inventors have developed antibody-conjugates that are highly suitable for targeting PTK7-expressing cells, in particular tumours. Thus, the antibody-conjugates according to the invention are highly suitable for treating PTK7-positive cancer, especially colon cancer, lung cancer, breast cancer, ovarian cancer and esophageal cancer.

In a first aspect, the present invention concerns an antibody-conjugate. Related thereto, in a second aspect, the invention concerns a process for preparing the antibody-conjugate according to the invention. In a third aspect, the invention concerns a method for targeting PTK7-expressing cells. Related thereto are the first medical use of the antibody-conjugate according to the invention, as well as the second medical use for the treatment of cancer. In a last aspect, the invention concerns the use of a mode of conjugation for increasing the therapeutic index of an antibody-conjugate in the treatment of PTK7-expressing tumours.

DETAILED DESCRIPTION

Definitions

The verb "to comprise", and its conjugations, as used in this description and in the claims is used in its non-limiting sense to mean that items following the word are included, but items not specifically mentioned are not excluded.

In addition, reference to an element by the indefinite article "a" or "an" does not exclude the possibility that more than one of the element is present, unless the context clearly requires that there is one and only one of the elements. The indefinite article "a" or "an" thus usually means "at least one".

A linker is herein defined as a moiety that connects (covalently links) two or more elements of a compound. A linker may comprise one or more spacer moieties. A spacer-moiety is herein defined as a moiety that spaces (i.e. provides distance between) and covalently links together two (or more) parts of a linker. The linker may be part of e.g. a linker-construct, a linker-conjugate, a linker-payload (e.g. linker-drug) or an antibody-conjugate, as defined below.

A "hydrophilic group" or "polar linker" is herein defined as any molecular structure containing one or more polar functional groups that imparts improved polarity, and therefore improved aqueous solubility, to the molecule it is attached to. Preferred hydrophilic groups are selected from a carboxylic acid group, an alcohol group, an ether group, a polyethylene glycol group, an amino group, an ammonium group, a sulfonate group, a phosphate group, an acyl sulfamide group or a carbamoyl sulfamide group. In addition to higher solubility other effects of the hydrophilic group include improved click conjugation efficiency, and, once incorporated into an antibody-drug conjugate: less aggregation, improved pharmacokinetics resulting in higher efficacy and in vivo tolerability.

The term "salt thereof" means a compound formed when an acidic proton, typically a proton of an acid, is replaced by a cation, such as a metal cation or an organic cation and the like. Where applicable, the salt is a pharmaceutically acceptable salt, although this is not required for salts that are not intended for administration to a patient. For example, in a salt of a compound the compound may be protonated by an inorganic or organic acid to form a cation, with the conjugate base of the inorganic or organic acid as the anionic component of the salt. The term "pharmaceutically accepted" salt means a salt that is acceptable for administration to a patient, such as a mammal (salts with counterions having acceptable mammalian safety for a given dosage regime). Such salts may be derived from pharmaceutically acceptable inorganic or organic bases and from pharmaceutically acceptable inorganic or organic acids. "Pharmaceutically acceptable salt" refers to pharmaceutically acceptable salts of a compound, which salts are derived from a variety of organic and inorganic counter ions known in the art and include, for example, sodium, potassium, calcium, magnesium, ammonium, tetraalkylammonium, etc., and when the molecule contains a basic functionality, salts of organic or inorganic acids, such as hydrochloride, hydrobromide, formate, tartrate, besylate, mesylate, acetate, maleate, oxalate, etc.

The term "enediyne" or "enediyne antibiotic" or "enediyne-containing cytotoxin" refers to any cytotoxin characterized by the presence of a 3-ene-1,5-diyne structural feature as part of a cyclic molecule as known in the art and include neocarzinostatin (NCS), C-1027, kedarcidin (KED), maduropeptin (MDP), N1999A2, the sporolides (SPO), the cyanosporasides (CYA and CYN), and the fijiolides, calicheamicins (CAL), the esperamicins (ESP), dynemicin (DYN), namenamicin, shishijimicin, and uncialamycin (UCM).

The term "alkylaminosugar" as used herein means a tetrahydropyranyl moiety connected to an alcohol function via its 2-position, thereby forming an acetal function, and further substituted by (at least) one N-alkylamino group in position 3, 4 or 5. "N-alkylamino group" in this context refers to an amino group having one methyl, ethyl or 2-propyl group.

The term "click probe" refers to a functional moiety that is capable of undergoing a click reaction, i.e. two compatible click probes mutually undergo a click reaction such that they are covalently linked in the product. Compatible probes for click reactions are known in the art, and preferably include (cyclic) alkynes and azides. In the context of the present invention, click probe Q in the compound according to the invention is capable of reacting with click probe F on the (modified) protein, such that upon the occurrence of a click reaction, a conjugate is formed wherein the protein is conjugated to the compound according to the invention. Herein, F and Q are compatible click probes.

An "acylsulfamide moiety" is herein defined as a sulfamide moiety ($H_2NSO_2NH_2$) that is N-acylated or N-carbamoylated on one end of the molecule and N-alkylated (mono or bis) at the other end of the molecule. In the context of the present invention, especially in the examples, this group is also referred to as "HS".

A "coding sequence" or a sequence "encoding" an expression product, such as a RNA, polypeptide, protein, or enzyme, is a nucleotide sequence that, when expressed, results in the production of that RNA, polypeptide, protein, or enzyme, i.e., the nucleotide sequence encodes an amino acid sequence for that polypeptide, protein or enzyme. A coding sequence for a protein may include a start codon (usually ATG) and a stop codon.

The term "gene" means a DNA sequence that codes for, or corresponds to, a particular sequence of amino acids which comprises all or part of one or more proteins or enzymes, and may or may not include regulatory DNA sequences, such as promoter sequences, which determine for example the conditions under which the gene is expressed. Some genes, which are not structural genes, may be transcribed from DNA to RNA, but are not translated into an amino acid sequence. Other genes may function as regulators of structural genes or as regulators of DNA transcription. In particular, the term gene may be intended for the genomic sequence encoding a protein, i.e. a sequence comprising regulator, promoter, intron and exon sequences.

The term "glycoprotein" is herein used in its normal scientific meaning and refers to a protein comprising one or more monosaccharide or oligosaccharide chains ("glycans") covalently bonded to the protein. A glycan may be attached to a hydroxyl group on the protein (O-linked-glycan), e.g. to the hydroxyl group of serine, threonine, tyrosine, hydroxylysine or hydroxyproline, or to an amide function on the protein (N-glycoprotein), e.g. asparagine or arginine, or to a carbon on the protein (C-glycoprotein), e.g. tryptophan. A glycoprotein may comprise more than one glycan, may comprise a combination of one or more monosaccharide and one or more oligosaccharide glycans, and may comprise a combination of N-linked, O-linked and C-linked glycans. It is estimated that more than 50% of all proteins have some form of glycosylation and therefore qualify as glycoprotein. Examples of glycoproteins include PSMA (prostate-specific membrane antigen), CAL (*Candida antartica* lipase), gp41, gp120, EPO (erythropoietin), antifreeze protein and antibodies.

The term "glycan" is herein used in its normal scientific meaning and refers to a monosaccharide or oligosaccharide chain that is linked to a protein. The term glycan thus refers to the carbohydrate-part of a glycoprotein. The glycan is attached to a protein via the C-1 carbon of one sugar, which may be without further substitution (monosaccharide) or may be further substituted at one or more of its hydroxyl groups (oligosaccharide). A naturally occurring glycan typically comprises 1 to about 10 saccharide moieties. However, when a longer saccharide chain is linked to a protein, said saccharide chain is herein also considered a glycan. A glycan of a glycoprotein may be a monosaccharide. Typically, a monosaccharide glycan of a glycoprotein consists of a single N-acetylglucosamine (GlcNAc), glucose (Glc), mannose (Man) or fucose (Fuc) covalently attached to the protein. A glycan may also be an oligosaccharide. An oligosaccharide chain of a glycoprotein may be linear or branched. In an oligosaccharide, the sugar that is directly attached to the protein is called the core sugar. In an oligosaccharide, a sugar that is not directly attached to the protein and is attached to at least two other sugars is called an internal sugar. In an oligosaccharide, a sugar that is not directly attached to the protein but to a single other sugar, i.e. carrying no further sugar substituents at one or more of its other hydroxyl groups, is called the terminal sugar. For the avoidance of doubt, there may exist multiple terminal sugars in an oligosaccharide of a glycoprotein, but only one core sugar. A glycan may be an O-linked glycan, an N-linked glycan or a C-linked glycan. In an O-linked glycan a monosaccharide or oligosaccharide glycan is bonded to an O-atom in an amino acid of the protein, typically via a hydroxyl group of serine (Ser) orthreonine (Thr). In an N-linked glycan a monosaccharide or oligosaccharide glycan is bonded to the protein via an N-atom in an amino acid of the protein, typically via an amide nitrogen in the side chain of asparagine (Asn) or arginine (Arg). In a C-linked glycan a monosaccharide or oligosaccharide glycan is bonded to a C-atom in an amino acid of the protein, typically to a C-atom of tryptophan (Trp).

The term "antibody" (AB) is herein used in its normal scientific meaning. An antibody is a protein generated by the immune system that is capable of recognizing and binding to a specific antigen. An antibody is an example of a glycoprotein. The term antibody herein is used in its broadest sense and specifically includes monoclonal antibodies, polyclonal antibodies, dimers, multimers, multispecific antibodies (e.g. bispecific antibodies), antibody fragments, and double and single chain antibodies. The term "antibody" is herein also meant to include human antibodies, humanized antibodies, chimeric antibodies and antibodies specifically binding cancer antigen. The term "antibody" is meant to include whole antibodies, but also fragments of an antibody, for example an antibody Fab fragment, F(ab')$_2$, Fv fragment or Fc fragment from a cleaved antibody, a scFv-Fc fragment, a minibody, a diabody or a scFv. Furthermore, the term includes genetically engineered antibodies and derivatives of an antibody. Antibodies, fragments of antibodies and genetically engineered antibodies may be obtained by methods that are known in the art.

An antibody may be a natural or conventional antibody in which two heavy chains are linked to each other by disulfide bonds and each heavy chain is linked to a light chain by a disulfide bond. There are two types of light chain, lambda (l) and kappa (k). The light chain includes two domains or regions, a variable domain (VL) and a constant domain (CL). The heavy chain includes four domains, a variable domain (VH) and three constant domains (CH1, CH2 and CH3, collectively referred to as CH). The variable regions of both light (VL) and heavy (VH) chains determine binding recognition and specificity to the antigen. The constant region domains of the light (CL) and heavy (CH) chains confer important biological properties, such as antibody chain association, secretion, trans-placental mobility, complement binding, and binding to Fc receptors (FcR). The Fv fragment is the N-terminal part of the Fab fragment of an immunoglobulin and consists of the variable portions of one light chain and one heavy chain. The immunoglobulin can be of any type (e.g. IgG, IgE, IgM, IgD, and IgA), class (e.g. IgG1, IgG2, IgG3, IgG4, IgA1 and IgA2) or subclass, or allotype (e.g. human G1 m1, G1m2, G m3, non-G1 m1 [that, is any allotype other than G1 m1], G1m17, G2m23, G3m21, G3m28, G3 m1.1, G3m5, G3m13, G3m14, G3m10, G3m15, G3m16, G3m6, G3m24, G3m26, G3m27, A2 m1, A2m2, Km1, Km2 and Km3) of immunoglobulin molecule. Preferred allotypes for administration include a non-G1 m1 allotype (nG1 ml), such as G1m17,1, G1m3, G1m3.1, G1m3.2 or G1m3.1.2. More preferably, the allotype is selected from the group consisting of the G1m17,1 or G1m3 allotype. The antibody may be engineered in the Fc-domain to enhance or nihilate binding to Fc-gamma receptors, as summarized by Saunders et al. *Front. Immunol.* 2019, 10, doi: 10.3389/fimmu.2019.01296 and Ward et al., *Mol. Immunol.* 2015, 67, 131-141. For example, the combination of Leu234Ala and Leu235Ala (commonly called LALA mutations) eliminate FcγRIIa binding. Elimination of binding to Fc-gamma receptors can also be achieved by mutation of the N297 amino acid to any other amino acid except asparagine, by mutation of the T299 amino acid to any other amino acid except threonine or serine, or by enzymatic deglycosylation or trimming of the fully glycosylated antibody with for example PNGase F or an endoglycosidase. The immunoglobulins can be derived from any species, including human, murine, or rabbit origin. Each chain contains distinct sequence domains.

A percentage of "sequence identity" may be determined by comparing the two sequences, optimally aligned over a comparison window, wherein the portion of the polynucleotide or polypeptide sequence in the comparison window may comprise additions or deletions (i.e., gaps) as compared to the reference sequence (which does not comprise additions or deletions) for optimal alignment of the two sequences. A sequence "at least 85% identical to a reference sequence" is a sequence having, on its entire length, 85%, or more, for instance 90%, 91%, 92%, 93%, 94%, 95%, 96%, 97%, 98% or 99% sequence identity with the entire length of the reference sequence.

The term "CDR" refers to complementarity-determining region: the specificity of the antibody resides in the structural complementarity between the antibody combining site and the antigenic determinant. Antibody combining sites are made up of residues that are primarily from the hypervariable or complementarity determining regions (CDRs). Occasionally, residues from non-hypervariable or framework regions (FR) influence the overall domain structure and hence the combining site. Complementarity Determining Regions or CDRs therefore refer to amino acid sequences which together define the binding affinity and specificity of the natural Fv region of a native immunoglobulin binding site. The light and heavy chains of an immunoglobulin each have three CDRs, designated CDR1-L, CDR2-L, CDR3-L and CDR1-H, CDR2-H, CDR3-H, respectively. A conventional antibody antigen-binding site, therefore, includes six CDRs, comprising the CDR set from each of a heavy and a light chain V region. "CDR"

The term "monoclonal antibody" or "mAb" as used herein refers to an antibody molecule of a single amino acid sequence, which is directed against a specific antigen, and is not to be construed as requiring production of the antibody by any particular method. A monoclonal antibody may be produced by a single clone of B cells or hybridoma, but may also be recombinant, i.e. produced by protein engineering.

The term "chimeric antibody" refers to an engineered antibody which, in its broadest sense, contains one or more regions from one antibody and one or more regions from one or more other antibodies. In an embodiment, a chimeric antibody comprises a VH domain and a VL domain of an antibody derived from a non-human animal, in association with a CH domain and a CL domain of another antibody, in an embodiment, a human antibody. As the non-human animal, any animal such as mouse, rat, hamster, rabbit or the like can be used. A chimeric antibody may also denote a multispecific antibody having specificity for at least two different antigens.

The term "humanised antibody" refers to an antibody which is wholly or partially of non-human origin and which has been modified to replace certain amino acids, for instance in the framework regions of the VH and VL domains, in order to avoid or minimize an immune response in humans. The constant domains of a humanized antibody are most of the time human CH and CL domains. "Fragments" of (conventional) antibodies comprise a portion of an intact antibody, in particular the antigen binding region or variable region of the intact antibody. Examples of antibody fragments include Fv, Fab, F(ab')2, Fab', dsFv, (dsFv)2, scFv, sc(Fv)2, diabodies, bispecific and multispecific antibodies formed from antibody fragments. A fragment of a conventional antibody may also be a single domain antibody, such as a heavy chain antibody or VHH.

As used herein "PTK7" also known as colon carcinoma kinase 4 (CCK4) designates the highly conserved member of the pseudokinase family of receptor tyrosine kinases, without observable kinase activity across various species.

THE INVENTION

Figure 1:
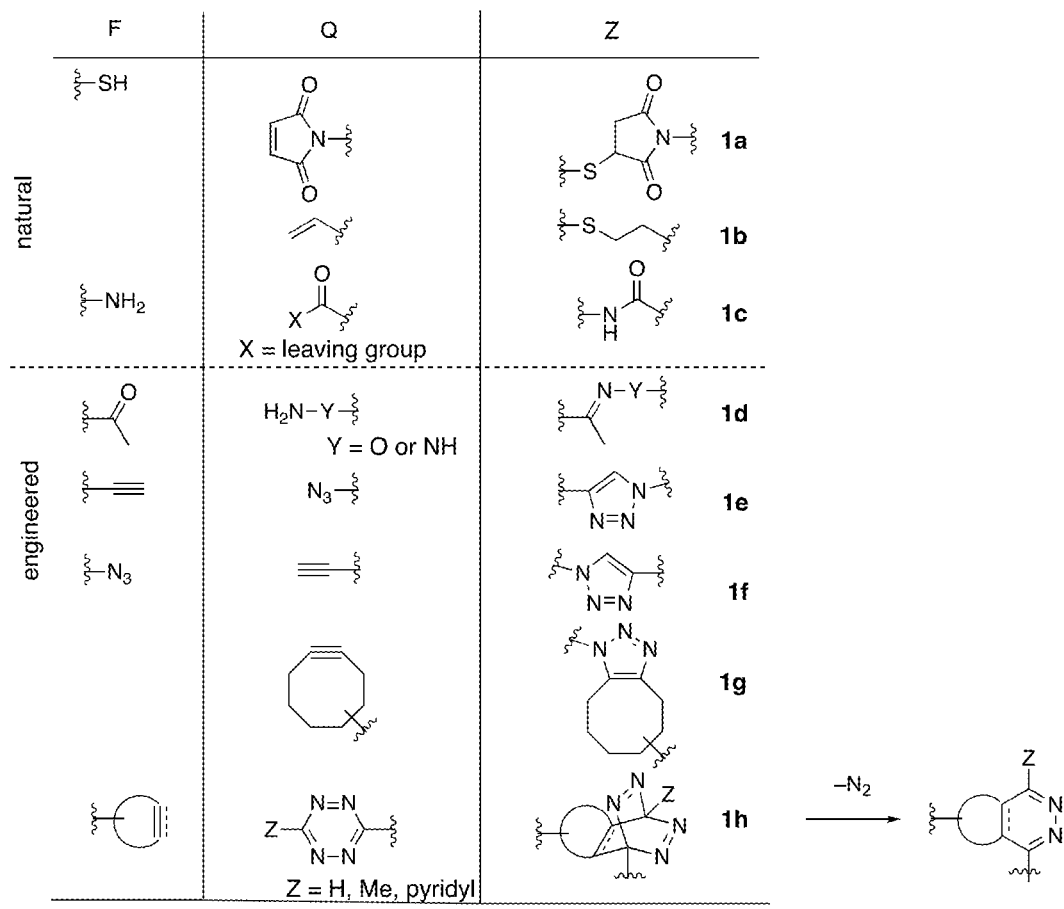
FIG. 1 shows a representative set of reactive groups (F) that when present in a biomolecule lead to connecting group Z (1*a*-1*h*) upon reaction with reactive group Q. Functional groups F can be naturally present of may be artificially introduced (engineered) into a biomolecule at any position of choice.
Figure 2:
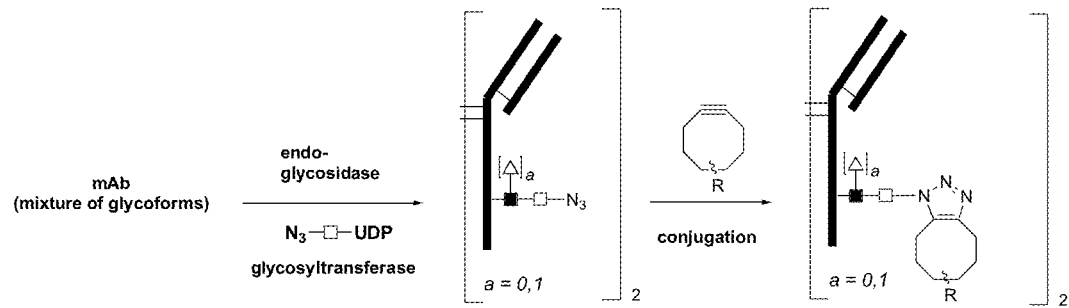
FIG. 2 schematically displays how an antibody conjugate can be obtained from any monoclonal antibody in a two-stage process. In the first stage, an azido-modified UPD-Gal or UDP-GalNAc may be attached to the monoclonal antibody in a one pot process involving (a) trimming of the glycan by an endoglycosidase (to the core GlcNAc) and (b) attachment of the azido-sugar under the action of a glycosyltransferase (a galactosyltransferase or a mutant thereof or a GalNAc-transferase), thereby generating a β-glycosidic 1-4 linkage between the azido-modified GalNAc and GlcNAc. In the second stage, the azido-modified antibody is reacted with an appropriately functionalized cyclooctyne, thereby generating the antibody conjugate.

In a first aspect, the invention concerns antibody-conjugates of general structure (1)

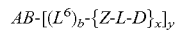

wherein:
AB is an antibody capable of targeting PTK7-expressing tumours;
L is a linker that links Z to D;
Z is a connecting group;
$L^6$ is $-GlcNAc(Fuc)_w-(G)_j-S-(L^7)_{w'}-$, wherein G is a monosaccharide, j is an integer in the range of 0-10, S is a sugar or a sugar derivative, GlcNAc is N-acetylglucosamine and Fuc is fucose, w is 0 or 1, w' is 0, 1 or 2 and $L^7$ is $-N(H)C(O)CH_2-$, $-N(H)C(O)CF_2-$ or $-CH_2-$;
D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof;
b is 0 or 1;
x is 1 or 2; and
y is 1, 2, 3 or 4.

Also contemplated within the present invention are salts, preferably pharmaceutically acceptable salts, of the antibody-conjugate according to structure (1).

In a second aspect, the invention concerns a process for preparing the antibody-conjugate according to the invention, comprising reacting the compound according to general structure (2) with an antibody (3). The compound according to general structure (2) comprises a reactive moiety Q and the antibody a reactive moiety F which is capable of reacting with Q in a conjugation reaction, wherein Q and F react to form connecting group Z. In this reaction, a conjugate according to general structure (1) is formed. The process according to this aspect this concerns the following bioconjugation reaction:

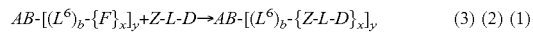

Here below, the antibody-conjugate according to structure (1) is first defined. The structural features of the antibody-conjugate according to structure (1) also apply to the compound according to structure (2) and the antibody according to structure (3), as those are unchanged in the conjugation reaction except for reactive moieties F and Q, which are transformed into connecting group Z upon reaction of the compound according to structure (2) with an antibody according to structure (3).

In a third aspect, the invention concerns the application antibody-conjugate according to structure (1), for targeting PTK7-expressing cells. Related thereto, the invention concerns the first medical use and second medical use of the antibody-conjugate according to structure (1).

As will be understood by the skilled person, the definition of the chemical moieties, as well as their preferred embodiments, apply to all aspects of the invention.

Antibody-conjugate of general structure (1)

In a first aspect, the invention concerns antibody-conjugates of general structure (1):

$$AB\text{-}[(L^6)_b\text{-}\{Z\text{-}L\text{-}D\}_x]_y \qquad 1$$

wherein:
- AB is an antibody capable of targeting PTK7-expressing tumours;
- b is 0 or 1;
- $L^6$ is -GlcNAc(Fuc)$_w$-(G)$_j$-S-(L$^7$)$_{w'}$-, wherein G is a monosaccharide, j is an integer in the range of 0-10, S is a sugar or a sugar derivative, GlcNAc is N-acetylglucosamine and Fuc is fucose, w is 0 or 1, w' is 0, 1 or 2 and $L^7$ is —N(H)C(O)CH$_2$—, —N(H)C(O)CF$_2$— or —CH$_2$—;
- Z is a connecting group;
- L is a linker that links Z to D;
- D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof;
- x is 1 or 2; and
- y is 1, 2, 3 or 4.

Antibody AB

The antibody-conjugate according to the invention contains an antibody that is capable of targeting PTK7-expressing cells, in particular tumour cells. PTK7 is a known target for cancer treatment. The term "expressing" is used as common in the art, and refers to overexpression of the target with respect to the expression in healthy tissue. Antibodies capable of targeting PTK7-expressing tumours may also be referred to as anti-PTK7 antibodies, PTK7-targeting antibodies or PTK7-binding antibodies. Anti-PTK7 antibodies selectively bind to PTK7-expressing cells. Anti-PTK7 antibodies are known in the art, and any suitable one can be used in the context of the present invention.

The Fc regions of these antibodies may have one or more mutations, such as 0-10 mutations or 0-5 mutations. Especially preferred are mutations that change binding to the FcRn receptor to modulate half-life of the antibody. For example, inclusion of mutations Met-to-Tyr, Ser-to-Thr and Thr-to-Glu in the region of amino acids 254-260 of the heavy chain, often called YTE, in the IgG1 Fc results in a ~11-fold higher binding of the antibody to human FcRn, thereby increasing the circulation half-life with a factor ~3.5. For example, the YTE mutations for cofetuzumab are Met254Tyr, Ser256Thr, and Thr258Glu. Therefore, in one embodiment, the antibody has an apparent human FcRn binding affinity $K_{D,app}$ of below $2.5 \times 10^{-6}$ M, preferably in the range of $0.05\text{-}0.99 \times 10^{-6}$ M, more preferably in the range of $0.1\text{-}0.49 \times 10^{-6}$ M, most preferably in the range of $0.2\text{-}0.4 \times 10^{-6}$ M. The apparent binding affinity $K_{D,app}$ may be determined according to Mackness et al. *MABS*, 2019, 11(7), 1276-1288. In a preferred embodiment, the antibody AB is the YTE mutant of the preferred antibodies defined here above or below.

In a preferred embodiment, the antibody is cofetuzumab. Cofetuzumab may also be defined as containing a light chain sequence according to SEQ ID No. 8 and a heavy chain sequence according to SEQ ID No. 7, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is 12C6. 12C6 may also be defined as containing a light chain sequence according to SEQ ID No. 20 and a heavy chain sequence according to SEQ ID No. 19, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is 12C6a. 12C6a may also be defined as containing a light chain sequence according to SEQ ID No. 22 and a heavy chain sequence according to SEQ ID No. 19, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is 4D5. 4D5 may also be defined as containing a light chain sequence according to SEQ ID No. 16 and a heavy chain sequence according to SEQ ID No. 15, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is 7C8. 7C8 may also be defined as containing a light chain sequence according to SEQ ID No. 25 and a heavy chain sequence according to SEQ ID No. 26, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is Hu23. Hu23 may also be defined as containing a light chain sequence according to SEQ ID No. 33 and a heavy chain sequence according to SEQ ID No. 31, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

In a preferred embodiment, the antibody is Hu58. Hu58 may also be defined as containing a light chain sequence according to SEQ ID No. 37 and a heavy chain sequence according to SEQ ID No. 35, wherein the sequence identity is at least 90%, preferably at least 95%, more preferably at least 99%, most preferably 100%. In a particularly preferred embodiment, the antibody according to this embodiment is combined with a payload D selected from the group consisting of calicheamicin, MMAE, PF-06380101, exatecan and DXd, more preferably with a payload D selected from the group consisting of calicheamicin, MMAE, and exatecan, most preferably with exatecan as payload D.

Thus, in a preferred embodiment, the antibody is selected from cofetuzumab, 12C6, 12C6a, 4D5, 7C8, Hu23 and Hu58, all as defined above, more preferably from cofetuzumab, 12C6, 4D5 and 7C8, even more preferably from cofetuzumab and 12C6. In one embodiment, the antibody is cofetuzumab. In one embodiment, the antibody is 12C6.

Preferred antibodies are defined by their VL and VH domains, which together form the variable domain that binds to the antigen. Thus, in a preferred embodiment, the antibody contains a VL domain selected from the group consisting of SEQ ID No. 2, 6, 9, 11, 14, 18, 21, 24, 32 and 36, and a VH domain selected from the group consisting of SEQ ID No. 1, 5, 10, 12, 13, 17, 23, 30 and 34, wherein the sequence identity is at least 70%, preferably at least 75% or at least 80%, more preferably at least 85% or at least 90% or at least 95%, most preferably at least 99% or even 100%. In an especially preferred embodiment, the antibody contains a VL domain of SEQ ID No. 6, and a $V_H$ domain of SEQ ID No. 5, wherein the sequence identity is at least 70%, preferably at least 75% or at least 80%, more preferably at least 85% or at least 90% or at least 95%, most preferably at least 99% or even 100%.

The aforementioned sequence identities refer to the complete sequence of the $V_L$ and $V_H$ domains. While the entire sequences of these domains allow for some variation in the sequence without jeopardizing the binding to PTK7, it is preferred that the complementarity-determining regions (CDRs) have a higher sequence identity, to ensure that the binding to PTK7 is not significantly jeopardized. The location of the CDRs is given in the tables below. Thus, it is preferred that the antibody contains a $V_L$ domain selected from the group consisting of SEQ ID No. 2, 6, 9, 11, 14, 18, 21, 24, 32 and 36, and a $V_H$ domain selected from the group consisting of SEQ ID No. 1, 5, 10, 12, 13, 17, 23, 30 and 34, preferably a $V_L$ domain of SEQ ID No. 6, and a $V_H$ domain of SEQ ID No. 5, wherein the sequence identity of the CDR is at least 90%, preferably at least 95%, more preferably at least 99%, most preferably 100%. The skilled person understands that the $V_L$ and $V_H$ domains identified above can be combined with a suitable constant domain to form a complete antibody.

Preferred $V_L$ Domains

| SEQ ID No. | CDR (amino acid numbers within the sequence) |
|---|---|
| 2 | 23-34 \| 50-56 \| 89-97 |
| 6 | 24-38 \| 54-60 \| 93-101 |
| 9 | 24-39 \| 55-61 \| 94-102 |
| 11 | 24-34 \| 50-56 \| 89-97 |
| 14 | 24-34 \| 50-56 \| 89-97 |
| 18 | 24-25 \| 51-57 \| 90-99 |
| 21 | 24-34 \| 50-56 \| 89-97 |
| 24 | 24-34 \| 50-56 \| 89-98 |

Preferred $V_H$ Domains

| SEQ ID No. | CDR (amino acid numbers within the sequence) |
|---|---|
| 1 | 26-37 \| 52-67 \| 100-109 |
| 5 | 26-35 \| 50-65 \| 97-108 |
| 10 | 31-35 \| 50-66 \| 99-107 |
| 12 | 31-35 \| 50-66 \| 99-109 |
| 13 | 31-35 \| 50-66 \| 99-104 |
| 17 | 31-35 \| 50-65 \| 98-101 |
| 23 | 31-35 \| 50-65 \| 98-101 |

In an especially preferred embodiment, the antibody contains a $V_L$ domain of SEQ ID No. 2 and a $V_H$ domain of SEQ ID No. 1, or a $V_L$ domain of SEQ ID No. 6 and a $V_H$ domain of SEQ ID No. 5, or a $V_L$ domain of SEQ ID No. 9 and a $V_H$ domain of SEQ ID No. 10, or a $V_L$ domain of SEQ ID No. 11 and a $V_H$ domain of SEQ ID No. 12, or a $V_L$ domain of SEQ ID No. 14 and a $V_H$ domain of SEQ ID No. 13, or a $V_L$ domain of SEQ ID No. 18 or 21 and a $V_H$ domain of SEQ ID No. 17, or a $V_L$ domain of SEQ ID No. 24 and a $V_H$ domain of SEQ ID No. 23, or a $V_L$ domain of SEQ ID No. 32 and a $V_H$ domain of SEQ ID No. 30, or a $V_L$ domain of SEQ ID No. 36 and a $V_H$ domain of SEQ ID No. 34. Herein, the sequence identities as defined above for the complete sequence as well as for the CDR apply.

Alternatively, the antibody is defined by its light and heavy chains, which together form the antibody. Thus, in a preferred embodiment, the antibody contains a light chain selected from the group consisting of SEQ ID No. 4, 8, 16, 20, 22, 26, 33 and 37, and a heavy chain selected from the group consisting of SEQ ID No. 3, 7, 15, 19, 25, 31 and 35, wherein the sequence identity is at least 70%, preferably at least 75% or at least 80%, more preferably at least 85% or at least 90% or at least 95%, most preferably at least 99% or even 100%. In a further preferred embodiment, the antibody contains a light chain of SEQ ID No. 8, and a heavy chain of SEQ ID No. 7, wherein the sequence identity is at least 70%, preferably at least 75% or at least 80%, more preferably at least 85% or at least 90% or at least 95%, most preferably at least 99% or even 100%.

The aforementioned sequence identities refer to the complete sequence of the light and heavy chains. While the entire sequences of these chains allow for some variation in the sequence without jeopardizing the binding to PTK7, it is preferred that the CDRs have a higher sequence identity, to ensure that the binding to PTK7 is not significantly jeopardized. The location of the CDRs is given in the tables below. Thus, it is preferred that the antibody contains a light chain selected from the group consisting of SEQ ID No. 4, 8, 16, 20, 22, 26, 33 and 37, and a heavy chain selected from the group consisting of SEQ ID No. 3, 7, 15, 19, 25, 31 and 35, wherein the sequence identity of the CDR is at least 90%, preferably at least 95%, more preferably at least 99%, most preferably 100%.

Preferred Light Chains

| SEQ ID No. | CDR (amino acid numbers within the sequence) |
|---|---|
| 4 | 23-34 \| 50-56 \| 89-97 |
| 8 | 24-38 \| 54-60 \| 93-101 |
| 16 | 24-34 \| 50-56 \| 89-97 |
| 20 | 24-25 \| 51-57 \| 90-99 |
| 22 | 24-34 \| 50-56 \| 89-97 |
| 26 | 24-34 \| 50-56 \| 89-98 |

Preferred Heavy Chains

| SEQ ID No. | CDR (amino acid numbers within the sequence) |
|---|---|
| 3 | 26-37 \| 52-67 \| 100-109 |
| 7 | 26-35 \| 50-65 \| 97-108 |
| 15 | 31-35 \| 50-66 \| 99-104 |
| 19 | 31-35 \| 50-65 \| 98-101 |
| 25 | 31-35 \| 50-65 \| 99-115 |

In an especially preferred embodiment, the antibody contains a light chain of SEQ ID No. 4 and a heavy chain of SEQ ID No. 3, or a light chain of SEQ ID No. 8 and a heavy chain of SEQ ID No. 7, or a light chain of SEQ ID No. 16 and a heavy chain of SEQ ID No. 15, or a light chain of SEQ ID No. 20 or 22 and a heavy chain of SEQ ID No. 19, or a light chain of SEQ ID No. 26 and a heavy chain of SEQ ID No. 25, or a light chain of SEQ ID No. 33 and a heavy chain of SEQ ID No. 31, or a light chain of SEQ ID No. 37 and a heavy chain of SEQ ID No. 35. Herein, the sequence identities as defined above for the complete sequence as well as for the CDR apply.

Linker $L^6$

In case reactive group F is directly connected to the antibody, or even part of the antibody structure, linker $L^6$ that connects AB to F (for antibodies of structure (3)) or AB to Z (for conjugates of structure (1) is absent and b=0. This is for example the case for cysteine conjugation and lysine conjugation. Alternatively, reactive group F may also be introduced onto the antibody using a linker $L^6$ that connects AB to F (for antibodies of structure (3)) or AB to Z (for conjugates of structure (1), in which case $L^6$ is present and b=1. In case $L^6$ is present, reactive group F is typically introduced at the glycan of the antibody. This is for example the case for conjugation via an artificially introduced reactive group F, such as for example using transglutaminase or by enzymatic glycan modification (e.g. glycosyltransferase or a-1,3-mannosyl-glycoprotein-2-b-N-acetylglucosaminyl-transferase). For example, a modified sugar residue $S(F)_x$ may be introduced at the glycan, extending the glycan with one monosaccharide residue S, which introduces x reactive groups F on the glycan of an antibody. In a most preferred embodiment, conjugation occurs via the glycan of the antibody and b=1. The site of conjugation is preferably at the heavy chain of the antibody.

If present, $L^6$ is a linker that links AB to F or Z, and is represented by -GlcNAc(Fuc)$_w$-(G)$_j$-S-(L$^7$)$_{w'}$-, wherein G is a monosaccharide, j is an integer in the range of 0-10, S is a sugar or a sugar derivative, GlcNAc is N-acetylglucosamine and Fuc is fucose, w is 0 or 1, w' is 0, 1 or 2 and $L^7$ is —N(H)C(O)CH$_2$—, —N(H)C(O)CF$_2$— or —CH$_2$—. Typically, $L^6$ is at least partly formed by the glycan of the antibody. All recombinant antibodies, generated in mammalian host systems, contain the conserved N-glycosylation site at the asparagine residue at or close to position 297 of the heavy chain, which is modified by a glycan of the complex type. This naturally occurring glycosylation site of antibodies is preferably used, but other glycosylation sites, including artificially introduced ones, may also be used for the connection of linker $L^6$. Thus, in a preferred embodiment, $L^6$ is connected to an amino acid of the antibody which is located at a position in the range of 250-350 of the heavy chain, preferably in the range of 280-310 of the heavy chain, more preferably in the range of 295-300 of the heavy chain, most preferably at position 297 of the heavy chain.

The -GlcNAc(Fuc)$_w$-(G)$_j$- of $L^6$ is the glycan of the antibody, or part thereof. The -GlcNAc(Fuc)$_w$-(G)$_j$- of the glycan thus typically originates from the original antibody, wherein GlcNAc is an N-acetylglucosamine moiety and Fuc is a fucose moiety. Fuc is typically bound to GlcNAc via an a-1,6-glycosidic bond. Normally, antibodies may (w=1) or may not be fucosylated (w=0). In the context of the present invention, the presence of a fucosyl moiety is irrelevant, and similar effects are obtained with fucosylated (w=1) and non-fucosylated (w=0) antibody conjugates. The GlcNAc residue may also be referred to as the core-GlcNAc residue and is the monosaccharide that is directly attached to the peptide part of the antibody.

S may be directly connected to the core-GlcNAc(Fuc)$_w$ moiety, i.e. j=0, meaning that the remainder of the glycan is removed from the core-GlcNAc(Fuc)$_w$ moiety before S is attached. Such trimming of glycans is well-known in the art and can be achieved by the action of an endoglycosidase. Alternatively, there are one or more monosaccharide residues present in between the core-GlcNAc(Fuc)$_w$ moiety and S, i.e. j is an integer in the range of 1-10, preferably j=2-5. In a preferred embodiment, (G)$_j$ is an oligosaccharide fraction comprising j monosaccharide residues G, wherein j is an integer in the range of 2-5. (G)$_j$ is connected to the GlcNAc moiety of GlcNAc(Fuc)$_w$, typically via a β-1,4 bond. In a preferred embodiment, j is 3, 4 or 5. Although any monosaccharide that may be present in a glycan may be employed as G, each G is preferably individually selected from the group consisting of galactose, glucose, N-acetylgalactosamine, N-acetylglucosamine, mannose and N-acetylneuraminic acid. More preferred options for G are galactose, N-acetylglucosamine, mannose. The inventors found that antibody-conjugates having j below 4 show no or hardly any binding to the Fc-gamma receptor, while antibody conjugates having j in the range of 4-10 do bind to the Fc-gamma receptor. Thus, by selecting a certain value for j, the desired extent of binding to the Fc-gamma receptor can be obtained. It is thus preferred that j=0, 3, 4, 5, 6, 7, 8, 9 or 10, more preferably j=0, 3, 4 or 5, most preferably the antibody is trimmed and j=0.

S is a sugar or sugar derivative. The term "sugar derivative" is herein used to indicate a derivative of a monosaccharide sugar, i.e. a monosaccharide sugar comprising substituents and/or functional groups. Suitable examples for S include glucose (Glc), galactose (Gal), mannose (Man), fucose (Fuc), amino sugars and sugar acids, e.g. glucosamine (GlcNH$_2$), galactosamine (GalNH$_2$)N-acetylglucosamine (GlcNAc), N-acetylgalactosamine (GalNAc), sialic acid (Sia) which is also referred to as N-acetylneuraminic acid (NeuNAc), and N-acetylmuramic acid (MurNAc), glucuronic acid (GlcA) and iduronic acid (IdoA). Preferably, S is selected from Glc, Gal, GlcNAc and GalNAc. In an especially preferred embodiment, S is GalNAc.

x is an integer that denotes the number of connecting groups Z (for conjugate (1)) or reactive groups F (for antibody (3)) that are attached to sugar (derivative) S. Thus, the antibody according to the invention contains a moiety S comprising x reactive moieties F. Each of these reactive moieties F are reacted with a reactive moiety Q of the compound according to general structure (2), such that x connecting groups Z are formed and x compounds according to general structure (2) are attached to a single occurrence of S. x is 1 or 2, preferably x=1.

Connecting group Z (for conjugate (1)) or reactive group F (for antibody (3)) may be attached directly to S, or there may be a linker $L^7$ present in between S and Z or F. $L^7$ is a linker that links S with Z. $L^7$ may be present (w'=1 or 2) or absent (w'=0). Typically, each moiety Z may be connected to S via a linker $L^7$, thus in one embodiment w'=0 of x. Preferably, $L^7$ is absent and each connecting moiety Z is directly attached to S. If present, $L^7$ may be selected from —N(H)C(O)CH$_2$—, —N(H)C(O)CF$_2$— or —CH$_2$—. In a preferred embodiment, x=1 and w'=0 or 1, most preferably x=1 and w'=0. [0089]$_y$ is an integer that denotes the number of sugar(s) (derivative(s)) S, each having x reactive groups F or connected to x connecting groups Z, that are connected to the antibody. y is 1, 2, 3 or 4, preferably y=2 or 4, most preferably y=2. Thus, the antibody contains y moieties S, each of which comprises x reactive moieties F. Each of these reactive moieties F are reacted with reactive moiety Q of the compound according to general structure (2), such that x+y connecting groups Z are formed and x+y compounds according to general structure (2) are attached to a single antibody. Each compound according to general structure (2) may contain multiple payloads, e.g. by virtue of branching nitrogen atom N* in L. It is preferred that each compound according to general structure (2) contains 1 or 2 occurrences of D, most preferably 2 occurrences of D. In an especially preferred embodiment, linker $L^1$ contains a branching nitrogen atom N* to which a second occurrence of D is connected.

The amount of payload (D) molecules attached to a single antibody is known in the art as the DAR (drug-antibody ratio). In the context of the present invention, it is preferred that DAR is an integer in the range 1-8, more preferably 2 or 4, most preferably DAR=4. Alternatively worded, the DAR is preferably an integer in the range (x+y) to [(x+y)×2], most preferably DAR=[(x+y)×2]. With preferred values for x of 1 and y of 2, the DAR is preferably 4. It will be appreciated that these are theoretical DAR values, and in practice the DAR may slightly deviate from this value, by virtue of incomplete conjugation. Typically, the conjugates are obtained as a stochastic mixture of antibody-drug conjugates, with DAR values varying between individual conjugates, and depending on the conjugation technique used the DAR may have a broad distribution (e.g. DAR=0-10) or a narrow distribution (e.g. DAR=3-4). In case of such mixture, DAR often refers to the average DAR of the mixture. This is well-known in the art of bioconjugation. However, in case the conjugation occurs via the glycan (i.e. b=1 and $L^6$ is present), the antibody-conjugates according to the invention have a close-to-theoretical DAR. For example, when the theoretical DAR is 4, DAR values above 3.6 or even above 3.8 are readily obtained, indicating that most antibodies in the reaction mixture have reacted completely and have a DAR of 4.

Connecting Group Z

Z is a connecting group, which covalently connects both parts of the conjugate according to the invention. The term "connecting group" herein refers to the structural element, resulting from the reaction between Q and F, connecting one part of the conjugate with another part of the same conjugate. As will be understood by the person skilled in the art, the nature of a connecting group depends on the type of reaction with which the connection between the parts of said compound is obtained. As an example, when the carboxyl group of R—C(O)—OH is reacted with the amino group of H$_2$N—R' to form R—C(O)—N(H)—R', R is connected to R' via connecting group Z, and Z may be represented by the group —C(O)—N(H)—. Since connecting group Z originates from the reaction between Q and F, it can take any form.

Since more than one reactive moiety F can be present or introduced in an antibody, the antibody-conjugate according to the present invention may contain per biomolecule more than one payload D, such as 1-8 payloads D, preferably 1, 2, 3 or 4 payloads D, more preferably 2 or 4 payloads D. The number of payloads is typically an even integer, in view of the symmetric nature of antibodies. In other words, when one side of the antibody is functionalized with F, the symmetrical counterpart will also be functionalized. Alternatively, in case naturally occurring thiol groups of the cysteine residues of a protein are used as F, the value of m can be anything and may vary between individual conjugates.

In a compound according to structure (1), connecting group Z connects D via linker L to AB, optionally via $L^6$. Numerous reactions are known in the art for the attachment of a reactive group Q to a reactive group F. Consequently, a wide variety of connecting groups Z may be present in the conjugate according to the invention. In one embodiment, the reactive group Q is selected from the options described above, preferably as depicted in FIG. 1, and complementary reactive groups F and the thus obtained connecting groups Z are known to a person skilled in the art. Several examples of suitable combinations of F and Q, and of connecting group $Z^3$ that will be present in a bioconjugate when a linker-conjugate comprising Q is conjugated to a biomolecule comprising a complementary reactive group F, are shown in FIG. 1.

For example, when F comprises or is a thiol group, complementary groups Q include N-maleimidyl groups and alkenyl groups, and the corresponding connecting groups Z are as shown in FIG. 1. When F comprises or is a thiol group, complementary groups Q also include allenamide groups.

For example, when F comprises or is an amino group, complementary groups Q include ketone groups and activated ester groups, and the corresponding connecting groups Z are as shown in FIG. 1.

For example, when F comprises or is a ketone group, complementary groups Q include (O-alkyl)hydroxylamino groups and hydrazine groups, and the corresponding connecting groups Z are as shown in FIG. 1.

For example, when F comprises or is an alkynyl group, complementary groups Q include azido groups, and the corresponding connecting group Z is as shown in FIG. 1.

For example, when F comprises or is an azido group, complementary groups Q include alkynyl groups, and the corresponding connecting group Z is as shown in FIG. 1.

For example, when F comprises or is a cyclopropenyl group, a trans-cyclooctene group or a cyclooctyne group, complementary groups Q include tetrazinyl groups, and the corresponding connecting group Z is as shown in FIG. 1. In these particular cases, Z is only an intermediate structure and will expel N2, thereby generating a dihydropyridazine (from the reaction with alkene) or pyridazine (from the reaction with alkyne).

Additional suitable combinations of F and Q, and the nature of resulting connecting group Z3 are known to a person skilled in the art, and are e.g. described in G. T. Hermanson, "Bioconjugate Techniques", Elsevier, 3rd Ed. 2013 (ISBN:978-0-12-382239-0), in particular in Chapter 3, pages 229-258, incorporated by reference. A list of complementary reactive groups suitable for bioconjugation processes is disclosed in Table 3.1, pages 230-232 of Chapter 3 of G. T. Hermanson, "Bioconjugate Techniques", Elsevier, 3rd Ed. 2013 (ISBN:978-0-12-382239-0), and the content of this Table is expressly incorporated by reference herein.

In a preferred embodiment, connecting group Z is obtained by a cycloaddition or a nucleophilic reaction, preferably wherein the cycloaddition is a [4+2]cycloaddition or a 1,3-dipolar cycloaddition or the nucleophilic reaction is a Michael addition or a nucleophilic substitution. Such a cycloaddition or nucleophilic reaction occurs via a reactive group F, connected to S, and reactive group Q, connected to D via L. Conjugation reactions via cycloadditions or nucleophilic reactions are known to the skilled person, and the skilled person is capable of selecting appropriate reaction partners F and Q, and will understand the nature of the resulting connecting group Z.

In a first preferred embodiment, Z is formed by a cycloaddition. Preferred cycloadditions are a (4+2)-cycloaddition (e.g. a Diels-Alder reaction) or a (3+2)-cycloaddition (e.g. a 1,3-dipolar cycloaddition). Preferably, the conjugation is the Diels-Alder reaction or the 1,3-dipolar cycloaddition. The preferred Diels-Alder reaction is the inverse-electron demand Diels-Alder cycloaddition. In another preferred embodiment, the 1,3-dipolar cycloaddition is used, more preferably the alkyne-azide cycloaddition, and most preferably wherein Q is or comprises an alkyne group and F is an azido group. Cycloadditions, such as Diels-Alder reactions and 1,3-dipolar cycloadditions are known in the art, and the skilled person knowns how to perform them.

Preferably, Z contains a moiety selected from the group consisting of a triazole, a cyclohexene, a cyclohexadiene, a [2.2.2]-bicyclooctadiene, a [2.2.2]-bicyclooctene, an isoxazoline, an isoxazolidine, a pyrazoline, a piperazine, a thioether, an amide or an imide group. Triazole moieties are especially preferred to be present in Z. In one embodiment, Z comprises a (hetero)cycloalkene moiety, i.e. formed from Q comprising a (hetero)cycloalkyne moiety. In an alternative embodiment, Z comprises a (hetero)cycloalkane moiety, i.e. formed from Q comprising a (hetero)cycloalkene moiety. In a preferred embodiment, Z has the structure (Z1):

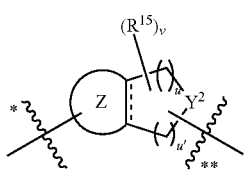

(Z1)

Herein, the bond depicted as --- is a single bond or a double bond. Furthermore:
  ring Z is obtained by a cycloaddition, preferably ring Z is selected from (Za)-(Zj) defined below, wherein the carbon atoms labelled with ** correspond to the two carbon atoms of the bond depicted as --- of (Z1) to which ring Z is fused;
  $R^{15}$ is independently selected from the group consisting of hydrogen, halogen, —$OR^{16}$, —$NO_2$, —CN, —S(O)$_2R^{16}$, —S(O)$_3^{(-)}$, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups and wherein the alkyl groups, (hetero)aryl groups, alkyl(hetero)aryl groups and (hetero)arylalkyl groups are optionally substituted, wherein two substituents $R^{15}$ may be linked together to form an optionally substituted annulated cycloalkyl or an optionally substituted annulated (hetero)arene substituent, and wherein $R^{16}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups;
  $Y^2$ is $C(R^{31})_2$, O, S, $S^{(+)}R^{31}$, $S(O)R^{31}$, $S(O)$=$NR^{31}$ or $NR^{31}$, wherein $S^{(+)}$ is a cationic sulphur atom counterbalanced by $B^{(-)}$, wherein $B^{(+)}$ is an anion, and wherein each $R^{31}$ individually is $R^{15}$ or a connection with D, connected via L;
  u is 0, 1, 2, 3, 4 or 5;
  u' is 0, 1, 2, 3, 4 or 5, wherein u+u'=0, 1, 2, 3, 4, 5, 6, 7 or 8;
  v=an integer in the range 8-16;
  Ring A is formed by the cycloaddition, and is preferably selected from (Za)-(Zj).

In case the bond depicted as --- is a double bond, it is preferred that u+u'=4, 5, 6, 7 or 8. Preferably, the wavy bond labelled with * is connected to S and the wavy bond labelled with ** is connected to L.

It is especially preferred that Z comprises a (hetero)cycloalkene moiety, i.e. the bond depicted as --- is a double bond. In a preferred embodiment, Z is selected from the structures (Z2)-(Z20), depicted here below:

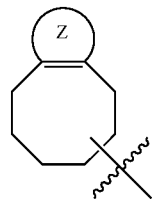

(Z2)

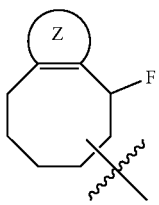

(Z3)

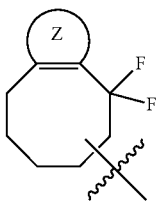

(Z4)

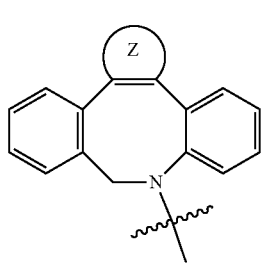

(Z5)

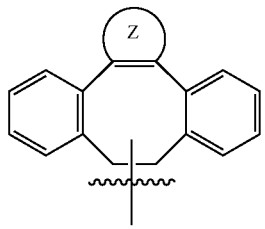

(Z6)

(Z7)
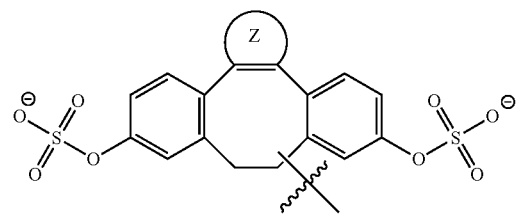
(Z8)
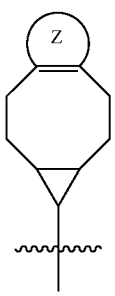
(Z9)
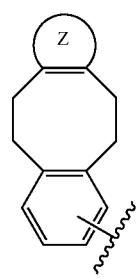
(Z10)
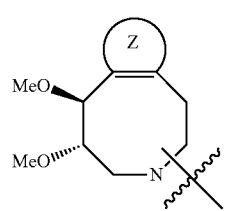
(Z11)
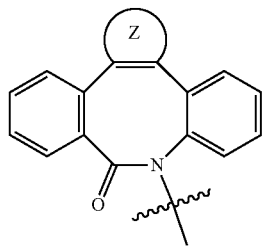
(Z12)
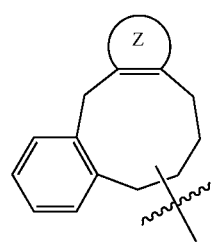
(Z13)
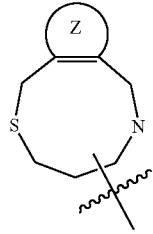
(Z14)
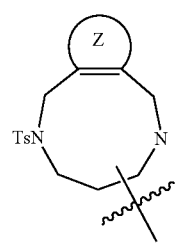
(Z15)
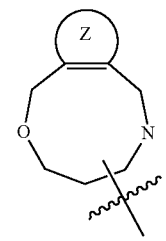
(Z16)
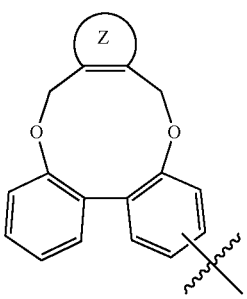
(Z17)
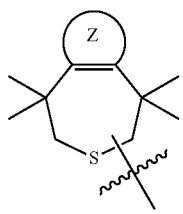
(Z18)
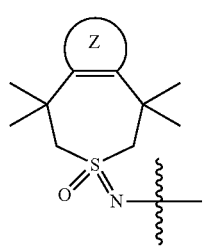

(Z19)

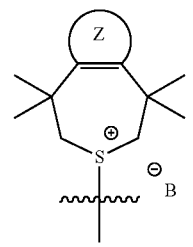

(Z20)

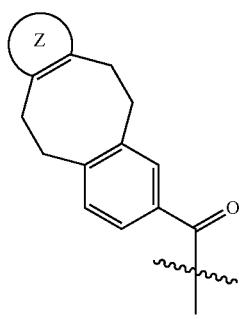

Herein, the connection to L is depicted with the wavy bond. B$^{(-)}$ is an anion, preferably a pharmaceutically acceptable anion. Ring Z is formed by the cycloaddition reaction, and preferably is a triazole, a cyclohexene, a cyclohexadiene, a [2.2.2]-bicyclooctadiene, a [2.2.2]-bicyclooctene, an isoxazoline, an isoxazolidine, a pyrazoline or a piperazine. Most preferably, ring Z is a triazole ring. Ring Z may have the structure selected from (Za)-(Zm) depicted below, wherein the carbon atoms labelled with ** correspond to the two carbon atoms of the (hetero)cycloalkane ring of (Z2)-(Z20) to which ring Z is fused. Preferred rings Z are selected from (Za)-(Zj), more preferably from (Za), (Zd) and (Zh), most preferably ring Z has structure (Za). Since the connecting group Z is formed by reaction ⚌ with a (hetero)cycloalkyne in the context of the present embodiment, the bound depicted above as ⚌ is a double bond.

(Za)

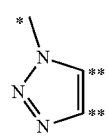

(Zb)

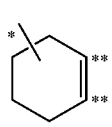

(Zc)

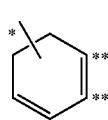

(Zd)

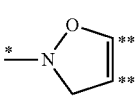

(Ze)

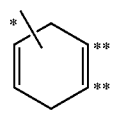

(Zf)

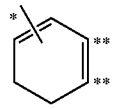

(Zg)

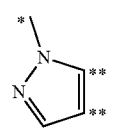

(Zh)

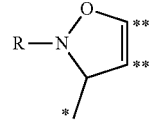

(Zi)

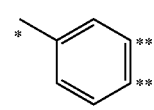

(Zj)

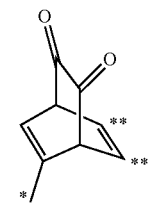

(Zk)

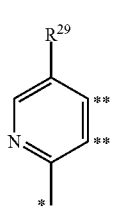

(Zl)

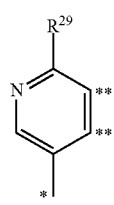

(Zm)

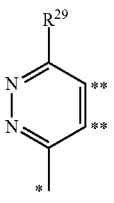

In a further preferred embodiment, Z is selected from the structures (Z21)-(Z38) and (Z38a), depicted here below:

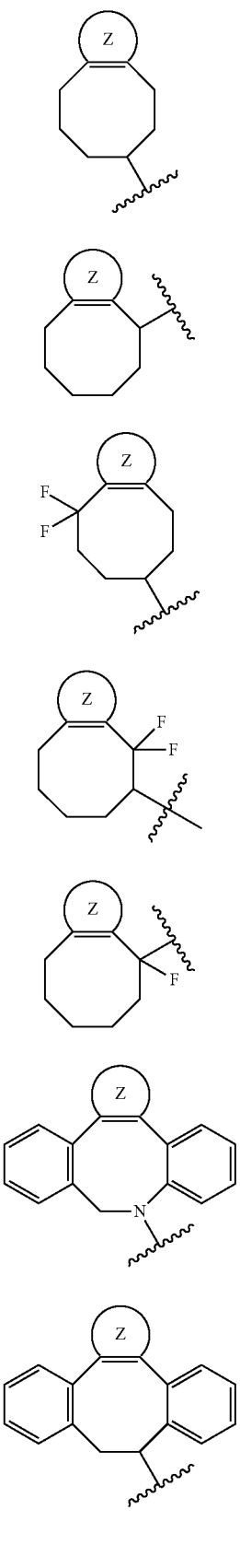
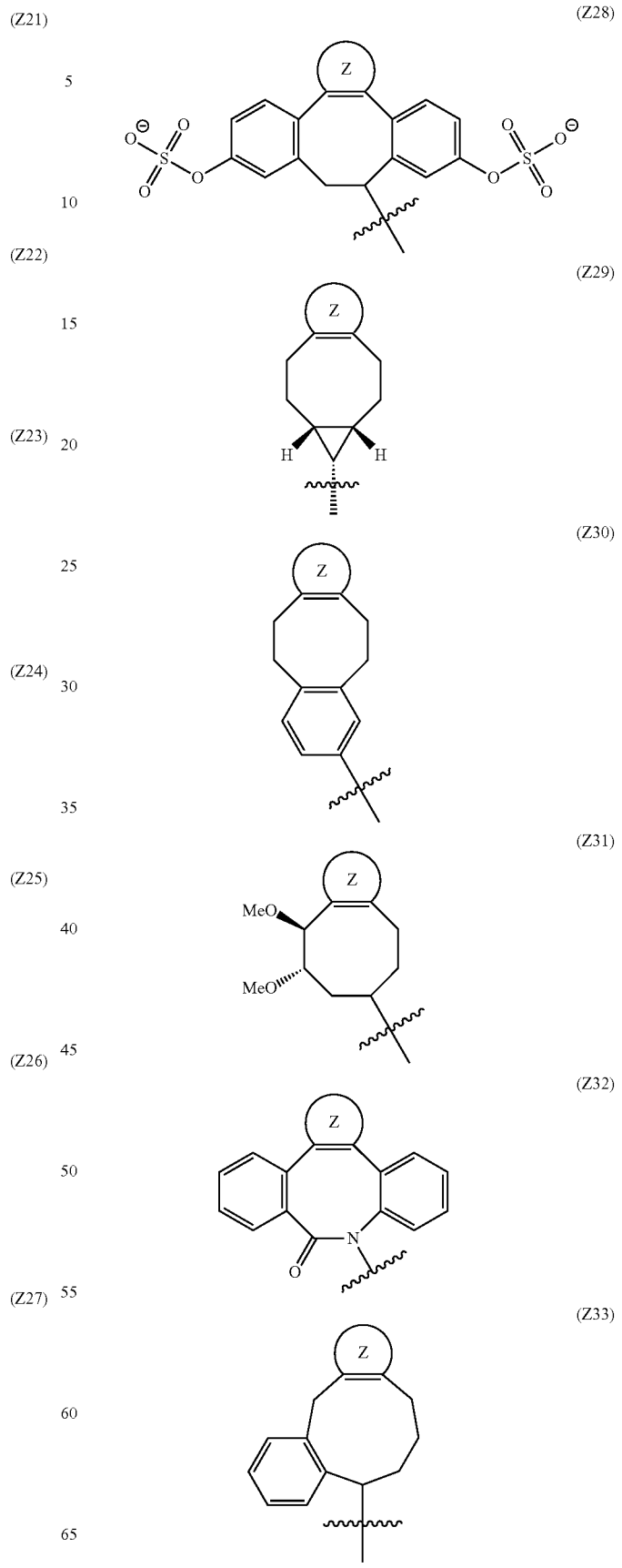

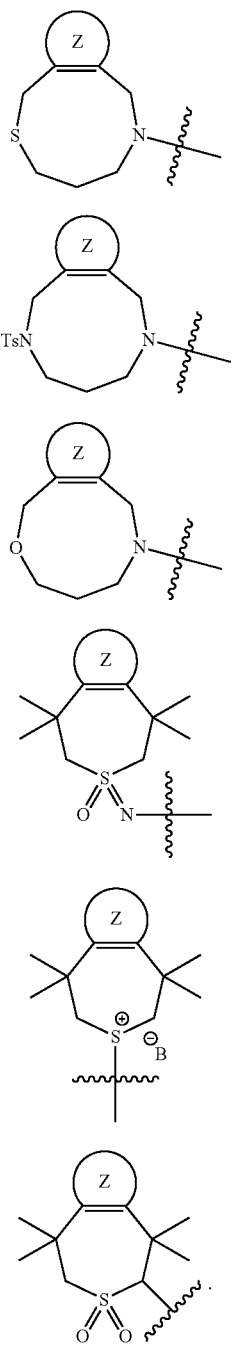

(Z34)

(Z35)

(Z36)

(Z37)

(Z38)

(Z39)

Herein, the connection to L is depicted with the wavy bond. In structure (Z38), $B^{(-)}$ is an anion, preferably a pharmaceutically acceptable anion. Ring Z is selected from structures (Za)-(Zm), preferably from structures (Za)-(Zj), as defined above.

In a preferred embodiment, Z comprises a (hetero)cyclooctene moiety or a (hetero)cycloheptene moiety, preferably according to structure (Z8), (Z26), (Z27), (Z28) or (Z37) or (Z38a), more preferably according to structure (Z8), (Z26), (Z27), (Z28) or (Z37), which are optionally substituted. Each of these preferred options for Z are further defined here below.

Thus, in a preferred embodiment, Z comprises a heterocycloheptene moiety according to structure (Z37), which is optionally substituted. Preferably, the heterocycloheptyne moiety according to structure (Z37) is not substituted.

In a preferred embodiment, Z comprises a (hetero)cyclooctene moiety according to structure (Z8), more preferably according to (Z29), which is optionally substituted. Preferably, the cyclooctene moiety according to structure (Z8) or (Z29) is not substituted. In the context of the present embodiment, Z preferably comprises a (hetero)cyclooctene moiety according to structure (Z39) as shown below, wherein V is $(CH_2)_I$ and I is an integer in the range of 0 to 10, preferably in the range of 0 to 6. More preferably, I is 0, 1, 2, 3 or 4, more preferably I is 0, 1 or 2 and most preferably I is 0 or 1. In the context of group (Z39), I is most preferably 1. Most preferably, Z is according to structure (Z42), defined further below.

In an alternative preferred embodiment, Z comprises a (hetero)cyclooctene moiety according to structure (Z26), (Z27) or (Z28), which are optionally substituted. In the context of the present embodiment, Z preferably comprises a (hetero)cyclooctene moiety according to structure (Z40) or (Z41) as shown below, wherein $Y^1$ is O or $NR^{11}$, wherein $R^{11}$ is independently selected from the group consisting of hydrogen, a linear or branched $C_1$-$C_{12}$ alkyl group or a $C_4$-$C_{12}$ (hetero)aryl group. The aromatic rings in (Z40) are optionally O-sulfonylated at one or more positions, whereas the rings of (Z41) may be halogenated at one or more positions. Preferably, the (hetero)cyclooctene moiety according to structure (Z40) or (Z41) is not further substituted. Most preferably, Z is according to structure (Z43), defined further below.

In an alternative preferred embodiment, Z comprises a heterocycloheptenyl group and is according to structure (Z37).

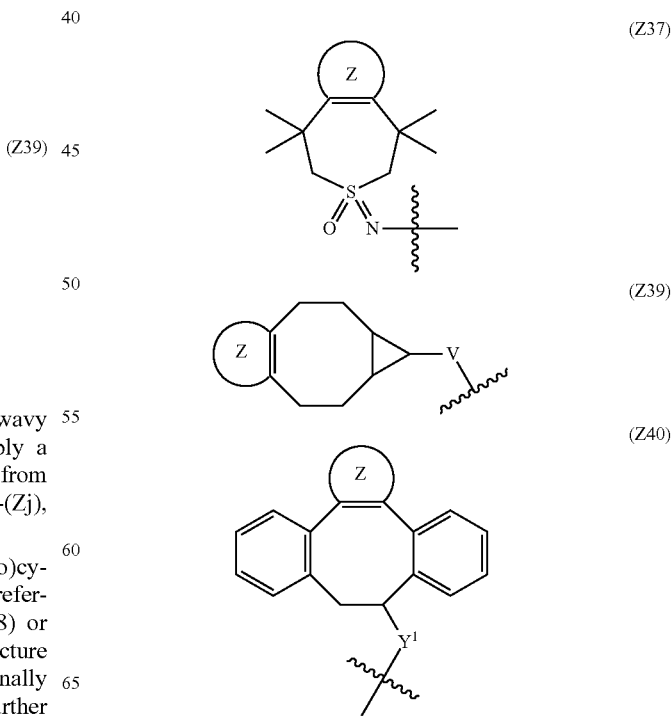

(Z37)

(Z39)

(Z40)

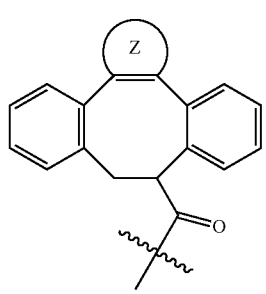

(Z41)

In an especially preferred embodiment, Z comprises a cyclooctenyl group and is according to structure (Z42):

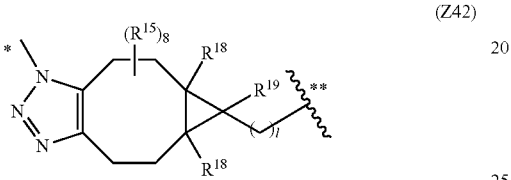

(Z42)

Herein:
the bond labelled with * is connected to S and the wavy bond labelled with ** is connected to L;
$R^{15}$ is independently selected from the group consisting of hydrogen, halogen, $-OR^{16}$, $-NO_2$, $-CN$, $-S(O)_2R^{16}$, $-S(O)_3^{(-)}$, $C_1-C_{24}$ alkyl groups, $C_5-C_{24}$ (hetero)aryl groups, $C_7-C_{24}$ alkyl(hetero)aryl groups and $C_7-C_{24}$ (hetero)arylalkyl groups and wherein the alkyl groups, (hetero)aryl groups, alkyl(hetero)aryl groups and (hetero)arylalkyl groups are optionally substituted, wherein two substituents $R^{15}$ may be linked together to form an optionally substituted annulated cycloalkyl or an optionally substituted annulated (hetero)arene substituent, and wherein $R^{16}$ is independently selected from the group consisting of hydrogen, halogen, $C_1-C_{24}$ alkyl groups, $C_6-C_{24}$ (hetero)aryl groups, $C_7-C_{24}$ alkyl(hetero)aryl groups and $C_7-C_{24}$ (hetero)arylalkyl groups;
$R^{18}$ is independently selected from the group consisting of hydrogen, halogen, $C_1-C_{24}$ alkyl groups, $C_6-C_{24}$ (hetero)aryl groups, $C_7-C_{24}$ alkyl(hetero)aryl groups and $C_7-C_{24}$ (hetero)arylalkyl groups;
$R^{19}$ is selected from the group consisting of hydrogen, halogen, $C_1-C_{24}$ alkyl groups, $C_6-C_{24}$ (hetero)aryl groups, $C_7-C_{24}$ alkyl(hetero)aryl groups and $C_7-C_{24}$ (hetero)arylalkyl groups, the alkyl groups optionally being interrupted by one of more hetero-atoms selected from the group consisting of O, N and S, wherein the alkyl groups, (hetero)aryl groups, alkyl(hetero)aryl groups and (hetero)arylalkyl groups are independently optionally substituted, or $R^{19}$ is a second occurrence of Z (or Q) or D connected via a spacer moiety; and
l is an integer in the range 0 to 10.
In a preferred embodiment of the group according to structure (Z42), $R^{15}$ is independently selected from the group consisting of hydrogen, halogen, $-OR^{16}$, $C_1-C_6$ alkyl groups, $C_5-C_6$ (hetero)aryl groups, wherein $R^{16}$ is hydrogen or $C_1-C_6$ alkyl, more preferably $R^{15}$ is independently selected from the group consisting of hydrogen and $C_1-C_6$ alkyl, most preferably all $R^{15}$ are H. In a preferred embodiment of the group according to structure (Z42), $R^{18}$ is independently selected from the group consisting of hydrogen, $C_1-C_6$ alkyl groups, most preferably both $R^{18}$ are H. In a preferred embodiment of the group according to structure (Z42), $R^{19}$ is H. In a preferred embodiment of the group according to structure (Z42), l is 0 or 1, more preferably l is 1.

In an especially preferred embodiment, Z comprises a (hetero)cyclooctynyl group and is according to structure (Z43):

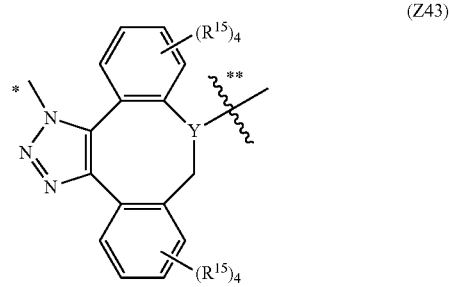

(Z43)

Herein:
the bond labelled with * is connected to S and the wavy bond labelled with ** is connected to L;
$R^{15}$ is independently selected from the group consisting of hydrogen, halogen, $-OR^{16}$, $-NO_2$, $-CN$, $-S(O)_2R^{16}$, $-S(O)_3^{(+)}$, $C_1-C_{24}$ alkyl groups, $C_5-C_{24}$ (hetero)aryl groups, $C_7-C_{24}$ alkyl(hetero)aryl groups and $C_7-C_{24}$ (hetero)arylalkyl groups and wherein the alkyl groups, (hetero)aryl groups, alkyl(hetero)aryl groups and (hetero)arylalkyl groups are optionally substituted, wherein two substituents $R^{15}$ may be linked together to form an optionally substituted annulated cycloalkyl or an optionally substituted annulated (hetero)arene substituent, and wherein $R^{16}$ is independently selected from the group consisting of hydrogen, halogen, $C_1-C_{24}$ alkyl groups, $C_6-C_{24}$ (hetero)aryl groups, $C_7-C_{24}$ alkyl(hetero)aryl groups and $C_7-C_{24}$ (hetero)arylalkyl groups;
Y is N or $CR^{15}$.
In a preferred embodiment of the group according to structure (Z43), $R^{15}$ is independently selected from the group consisting of hydrogen, halogen, $-OR^{16}$, $-S(O)_3^{(-)}$, $C_1-C_6$ alkyl groups, $C_5-C_6$ (hetero)aryl groups, wherein $R^{16}$ is hydrogen or $C_1-C_6$ alkyl, more preferably $R^{15}$ is independently selected from the group consisting of hydrogen and $-S(O)_3^{(-)}$. In a preferred embodiment of the group according to structure (Z43), Y is N or CH, more preferably Y=N.

In an especially preferred embodiment, Z comprises a heterocycloheptynyl group and is according to structure (Z37) or (Z38a), preferably according to structure (Z37), wherein ring Z is a triazole:

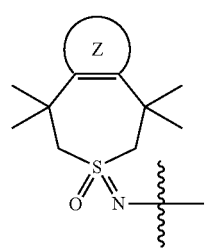

(Z37)

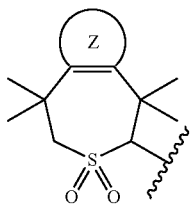
(Z38a)

In an alternative preferred embodiment, Z comprises a (hetero)cycloalkane moiety, i.e. the bond depicted as --- is a single bond. The (hetero)cycloalkane group may also be referred to as a heterocycloalkanyl group or a cycloalkanyl group, preferably a cycloalkanyl group, wherein the (hetero)cycloalkanyl group is optionally substituted. Preferably, the (hetero)cycloalkanyl group is a (hetero)cyclopropanyl group, a (hetero)cyclobutanyl group, a norbornane group, a norbornene group, a (hetero)cycloheptanyl group, a (hetero)cyclooctanyl group, a (hetero)cyclononnyl group or a (hetero)cyclodecanyl group, which may all optionally be substituted. Especially preferred are (hetero)cyclopropanyl groups, (hetero)cycloheptanyl group or (hetero)cyclooctanyl groups, wherein the (hetero)cyclopropanyl group, the trans-(hetero)cycloheptanyl group or the (hetero)cyclooctanyl group is optionally substituted. Preferably, Z comprises a cyclopropanyl moiety according to structure (Z44), a hetereocyclobutane moiety according to structure (Z45), a norbornane or norbornene group according to structure (Z46), a (hetero)cycloheptanyl moiety according to structure (Z47) or a (hetero)cyclooctanyl moiety according to structure (Z48). Herein, $Y^3$ is selected from $C(R^{23})_2$, $NR^{23}$ or O, wherein each $R^{23}$ is individually hydrogen, $C_1$-$C_6$ alkyl or is connected to L, optionally via a spacer, and the bond labelled --- is a single or double bond. In a further preferred embodiment, the cyclopropanyl group is according to structure (Z49). In another preferred embodiment, the (hetero)cycloheptane group is according to structure (Z50) or (Z51). In another preferred embodiment, the (hetero)cyclooctane group is according to structure (Z52), (Z53), (Z54), (Z55) or (Z56).

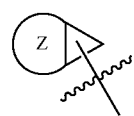
(Z44)

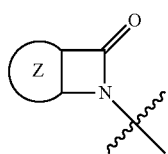
(Z45)

(Z46)

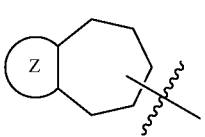
(Z47)

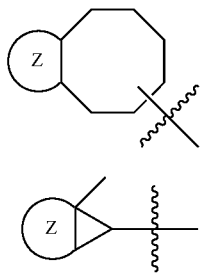
(Z48)

(49)

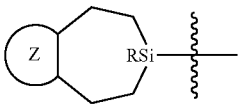
(Z50)

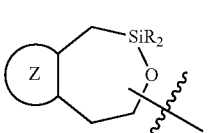
(Z51)

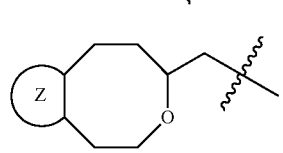
(Z52)

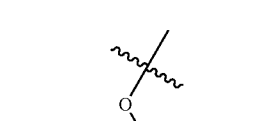
(Z53)

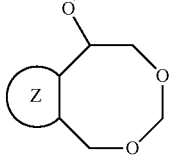
(Z54)

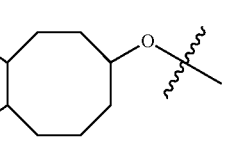
(Z55)

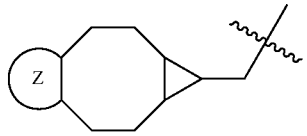
(Z56)

Herein, the R group(s) on Si in (Z50) and (Z51) are typically alkyl or aryl, preferably $C_1$-$C_6$ alkyl. Ring Z is typically selected from structures (Zn)-(Zu), wherein the carbon atoms labelled with ** correspond to the two carbon atoms of the (hetero)cycloalkane ring of (Z44)-(Z56) to which ring Z is fused, and the carbon a carbon labelled with * is directly connected to the peptide chain of the antibody. Preferred rings Z are selected from (Zo)-(Zr). Since the connecting group Z is formed by reaction with a (hetero)cycloalkene in the context of the present embodiment, the bound depicted above as --- is a single bond.

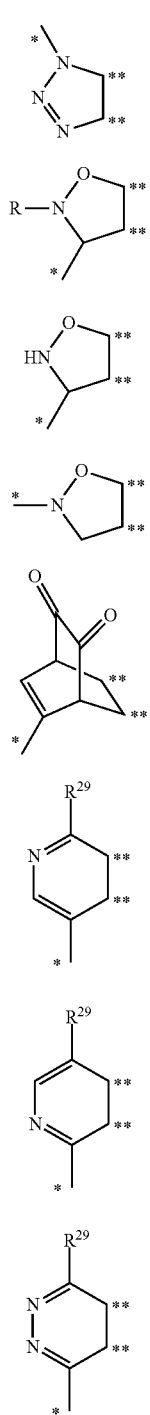
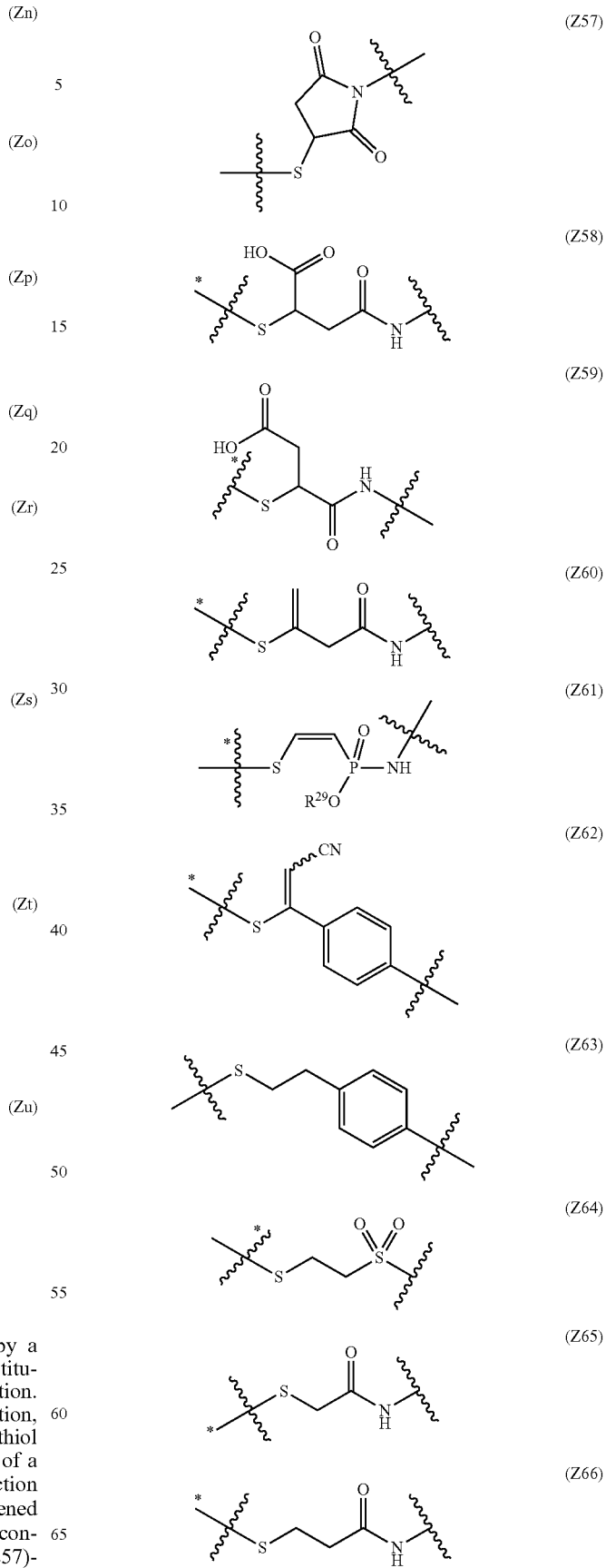

In a second preferred embodiment, Z is formed by a nucleophilic reaction, preferably by a nucleophilic substitution or a Michael addition, preferably by a Michael addition. A preferred Michael reaction is the thiol-maleimide ligation, most preferably wherein Q is maleimide and F is a thiol group. Preferably, the thiol is present in the sidechain of a cysteine residue. In a preferred embodiment, connection group Z comprises a succinimidyl ring or its ring-opened succinic acid amide derivative. Preferred options for connection group Z comprise a moiety selected from (Z57)-(Z71) depicted here below.

(Z67)
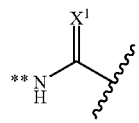

(Z68)
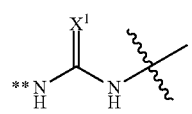

(Z69)
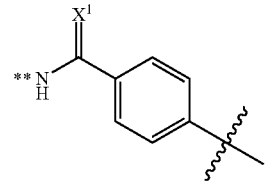

(Z70)
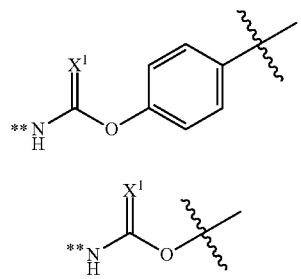

(Z71)
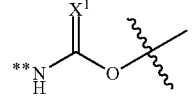

Herein, the wavy bond(s) labelled with an * is connected to the antibody Ab, optionally via a linker, and the wavy bond without label to the payload, optionally via a linker. In addition, $R^{29}$ is $C_{1-12}$ alkyl, preferably $C_{1-4}$ alkyl, most preferably ethyl, and $X^1$ is O or S, preferably $X^1$=O. The nitrogen atom labelled with ** in (Z67)-(Z71) corresponds to the nitrogen atom of the side chain of a lysine residue of the antibody. The carbon atoms of the phenyl group of (Z69) and (Z70) are optionally substituted, preferably optionally fluorinated.

In a preferred embodiment, connection group Z comprise a moiety selected from (Z1)-(Z71).

Linker L

Linker L connects payload D with connecting group Z (in the conjugate according to structure (1)) or connects payload D with reactive group Q (in the compound according to structure (2)). Linkers are known in the art and may be cleavable or non-cleavable. Linker L preferably contains a self-immolative group or cleavable linker, comprising a peptide spacer and a para-aminobenzyloxycarbonyl (PABC) moiety or derivative thereof.

In a preferred embodiment, linker L as the structure -$(L^1)_n$-$(L^2)_o$-$(L^3)_p$-$(L^4)_q$-, wherein $(L^4)_q$ is connect to payload D and $(L^1)_n$ is connected to Z or Q. Herein $L^1$, $L^2$, $L^3$ and $L^4$ are linkers or linking units and each of n, o, p and q are individually 0 or 1, wherein n+o+p+q is at least 1. In a preferred embodiment, at least linkers $L^1$ and $L^2$ are present (i.e. n=1; o=1; p=0 or 1; q=0 or 1), more preferably linkers $L^1$, $L^2$ and $L^3$ are present and $L^4$ is either present or not (i.e. n=1; o=1; p=1; q=0 or 1). In one embodiment, linkers $L^1$, $L^2$, $L^3$ and $L^4$ are present (i.e. n=1; o=1; p=1; q=1). In one embodiment, linkers $L^1$, $L^2$ and $L^3$ are present and $L^4$ is not (i.e. n=1; o=1; p=1; q=0).

A linker, especially linker $L^1$, may contain one or more branch-points for attachment of multiple payloads to a single connecting group. In a preferred embodiment, the linker of the conjugate according to the invention contains a branching moiety. A "branching moiety" in the context of the present invention refers to a moiety that is embedded in a linker connecting three moieties. In other words, the branching moiety comprises at least three bonds to other moieties, typically one bond connecting to Z or Q, one bond to the payload D and one bond to a second payload D. The branching moiety, if present, is preferably embedded in linker $L^1$, more preferably part of $Sp^2$ or as the nitrogen atom of $NR^{13}$. Any moiety that contains at least three bonds to other moieties is suitable as branching moiety in the context of the present invention. In a preferred embodiment, the branching moiety is selected from a carbon atom, a nitrogen atom, a phosphorus atom, a (hetero)aromatic ring, a (hetero)cycle or a polycyclic moiety. Most preferably, the branching moiety is a nitrogen atom.

Linker $L^1$

Linker $L^1$ is either absent (n=0) or present (n=1). Preferably, linker $L^1$ is present and n=1. $L^1$ may for example be selected from the group consisting of linear or branched $C_1$-$C_{200}$ alkylene groups, $C_2$-$C_{200}$ alkenylene groups, $C_2$-$C_{200}$ alkynylene groups, $C_3$-$C_{200}$ cycloalkylene groups, $C_5$-$C_{200}$ cycloalkenylene groups, $C_8$-$C_{200}$ cycloalkynylene groups, $C_7$-$C_{200}$ alkylarylene groups, $C_7$-$C_{200}$ arylalkylene groups, $C_8$-$C_{200}$ arylalkenylene groups, $C_9$-$C_{200}$ arylalkynylene groups. Optionally the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups may be substituted, and optionally said groups may be interrupted by one or more heteroatoms, preferably 1 to 100 heteroatoms, said heteroatoms preferably being selected from the group consisting of O, S(O)$_{y'}$ and $NR^{21}$, wherein y' is 0, 1 or 2, preferably y'=2, and $R^{21}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups.

In a preferred embodiment, linker $L^1$ contains a polar group. Such a polar group may be selected from (poly)ethylene glycoldiamines (e.g. 1,8-diamino-3,6-dioxaoctane or equivalents comprising longer ethylene glycol chains), (poly)ethylene glycol or (poly)ethylene oxide chains, (poly)propylene glycol or (poly)propylene oxide chains and 1,z'-diaminoalkanes (wherein z' is the number of carbon atoms in the alkane, preferably z'=1-10), —(O)$_a$—C(O)—NH—S(O)$_2$—NR$^{13}$— (as further defined below, see structure (23)), —C(S(O)$_3^{(-)}$)—, —C(C(O)$_2^{(-)}$)—, —S(O)$_2$—, —P(O)$_2^{(-)}$—, —O(CH$_2$CH$_2$O)$_r$—, —NR$^{30}$(CH$_2$CH$_2$NR$^{30}$)$_r$—, and the following two structures:

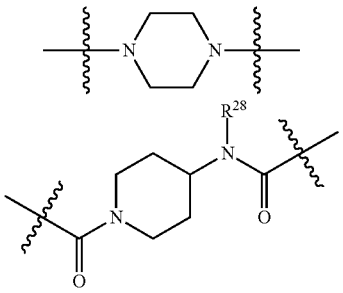

The polar group may also contain an amino acid, preferably selected from Arg, Glu, Asp, Ser and Thr. Herein, a and $R^{13}$ are further defined below for structure (23). t is an integer in the range of integer in the range of 0-15, preferably 1-10, more preferably 2-5, most preferably t=2 or 4. Each $R^{30}$ is individually H, $C_{1-12}$ alkyl, $C_{1-12}$ aryl, $C_{1-12}$ alkaryl or $C_{1-12}$ aralkyl. Linker $L^1$ may contain more than one such polar group, such as at least two polar groups. The polar group may also be present in a branch of linker $L^1$, which branches off a branching moiety as defined elsewhere. Preferable, a nitrogen or carbon atom is used as branching moiety. It is especially preferred to have a —O(CH$_2$CH$_2$O)$_t$— polar group present in a branch.

In a preferred embodiment, Linker $L^1$ is or comprises a sulfamide group, preferably a sulfamide group according to structure (23):

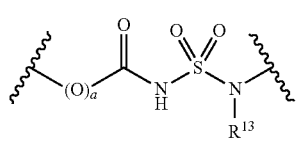

(23)

The wavy lines represent the connection to the remainder of the compound, typically to Q and $L^2$, $L^3$, $L^4$ or D, preferably to Q and $L^2$. Preferably, the (O)$_a$C(O) moiety is connected to Q and the NR$^{13}$ moiety to $L^2$, $L^3$, $L^4$ or D, preferably to $L^2$.

In structure (23), a=0 or 1, preferably a=1, and $R^{13}$ is selected from the group consisting of hydrogen, $C_1$-$C_{24}$ alkyl groups, $C_3$-$C_{24}$ cycloalkyl groups, $C_2$-$C_{24}$ (hetero)aryl groups, $C_3$-$C_{24}$ alkyl(hetero)aryl groups and $C_3$-$C_{24}$ (hetero)arylalkyl groups, the $C_1$-$C_{24}$ alkyl groups, $C_3$-$C_{24}$ cycloalkyl groups, $C_2$-$C_{24}$ (hetero)aryl groups, $C_3$-$C_{24}$ alkyl(hetero)aryl groups and $C_3$-$C_{24}$ (hetero)arylalkyl groups optionally substituted and optionally interrupted by one or more heteroatoms selected from O, S and NR$^{14}$ wherein R$^{14}$ is independently selected from the group consisting of hydrogen and $C_1$-$C_4$ alkyl groups, or $R^{13}$ is D connected to N via a spacer moiety, preferably Sp$^2$ as defined below, in one embodiment D is connected to N via —(B)$_e$-(A)$_f$-(B)$_g$—C(O)—.

In a preferred embodiment, $R^{13}$ is hydrogen or a $C_1$-$C_{20}$ alkyl group, more preferably $R^{13}$ is hydrogen or a $C_1$-$C_{16}$ alkyl group, even more preferably $R^{13}$ is hydrogen or a $C_1$-$C_{10}$ alkyl group, wherein the alkyl group is optionally substituted and optionally interrupted by one or more heteroatoms selected from O, S and NR$^{14}$, preferably O, wherein R$^{14}$ is independently selected from the group consisting of hydrogen and $C_1$-$C_4$ alkyl groups. In a preferred embodiment, $R^{13}$ is hydrogen. In another preferred embodiment, $R^{13}$ is a $C_1$-$C_{20}$ alkyl group, more preferably a $C_1$-$C_{16}$ alkyl group, even more preferably a $C_1$-$C_{10}$ alkyl group, wherein the alkyl group is optionally interrupted by one or more 0-atoms, and wherein the alkyl group is optionally substituted with an —OH group, preferably a terminal —OH group. In this embodiment it is further preferred that $R^{13}$ is a (poly)ethylene glycol chain comprising a terminal —OH group. In another preferred embodiment, $R^{13}$ is selected from the group consisting of hydrogen, methyl, ethyl, n-propyl, i-propyl, n-butyl, s-butyl and t-butyl, more preferably from the group consisting of hydrogen, methyl, ethyl, n-propyl and i-propyl, and even more preferably from the group consisting of hydrogen, methyl and ethyl. Yet even more preferably, $R^{13}$ is hydrogen or methyl, and most preferably $R^{13}$ is hydrogen.

In a preferred embodiment, $L^1$ is according to structure (24):

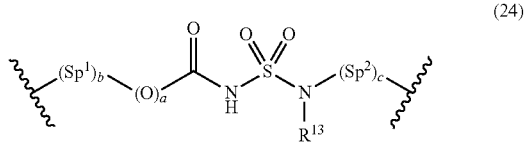

(24)

Herein, a and $R^{13}$ are as defined above, Sp$^1$ and Sp$^2$ are independently spacer moieties and b and c are independently 0 or 1. Preferably, b=0 or 1 and c=1, more preferably b=0 and c=1. In one embodiment, spacers Sp$^1$ and Sp$^2$ are independently selected from the group consisting of linear or branched $C_1$-$C_{200}$ alkylene groups, $C_2$-$C_{200}$ alkenylene groups, $C_2$-$C_{200}$ alkynylene groups, $C_3$-$C_{200}$ cycloalkylene groups, $C_5$-$C_{200}$ cycloalkenylene groups, $C_8$-$C_{200}$ cycloalkynylene groups, $C_7$-$C_{200}$ alkylarylene groups, $C_7$-$C_{200}$ arylalkylene groups, $C_8$-$C_{200}$ arylalkenylene groups and $C_9$-$C_{200}$ arylalkynylene groups, the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups being optionally substituted and optionally interrupted by one or more heteroatoms selected from the group of O, S and NR$^{16}$, wherein R$^{16}$ is independently selected from the group consisting of hydrogen, $C_1$-$C_{24}$ alkyl groups, $C_2$-$C_{24}$ alkenyl groups, $C_2$-$C_{24}$ alkynyl groups and $C_3$-$C_{24}$ cycloalkyl groups, the alkyl groups, alkenyl groups, alkynyl groups and cycloalkyl groups being optionally substituted. When the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups are interrupted by one or more heteroatoms as defined above, it is preferred that said groups are interrupted by one or more O-atoms, and/or by one or more S—S groups.

More preferably, spacer moieties Sp$^1$ and Sp$^2$, if present, are independently selected from the group consisting of linear or branched $C_1$-$C_{10}$ alkylene groups, $C_2$-$C_{100}$ alkenylene groups, $C_2$-$C_{100}$ alkynylene groups, $C_3$-$C_{100}$ cycloalkylene groups, $C_5$-$C_{100}$ cycloalkenylene groups, $C_8$-$C_{100}$ cycloalkynylene groups, $C_7$-$C_{100}$ alkylarylene groups, $C_7$-$C_{100}$ arylalkylene groups, $C_8$-$C_{100}$ arylalkenylene groups and $C_9$-$C_{100}$ arylalkynylene groups, the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups being optionally substituted and optionally interrupted by one or more heteroatoms selected from the group of O, S and NR$^{16}$, wherein R$^{16}$ is independently selected from the group consisting of hydrogen, $C_1$-$C_{24}$ alkyl groups, $C_2$-$C_{24}$ alkenyl groups, $C_2$-$C_{24}$ alkynyl groups and $C_3$-$C_{24}$ cycloalkyl groups, the alkyl groups, alkenyl groups, alkynyl groups and cycloalkyl groups being optionally substituted.

Even more preferably, spacer moieties Sp$^1$ and Sp$^2$, if present, are independently selected from the group consisting of linear or branched $C_1$-$C_{50}$ alkylene groups, $C_2$-$C_{50}$ alkenylene groups, $C_2$-$C_{50}$ alkynylene groups, $C_3$-$C_{50}$ cycloalkylene groups, $C_2$-$C_{50}$ cycloalkenylene groups, $C_8$-$C_{50}$ cycloalkynylene groups, $C_7$-$C_{50}$ alkylarylene groups, $C_7$-$C_{50}$ arylalkylene groups, $C_8$-$C_{50}$ arylalkenylene groups and $C_9$-$C_{50}$ arylalkynylene groups, the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups being optionally substituted and optionally interrupted by one or more heteroatoms selected from the group of O, S and $NR^{16}$, wherein $R^{16}$ is independently selected from the group consisting of hydrogen, $C_1$-$C_{24}$ alkyl groups, $C_2$-$C_{24}$ alkenyl groups, $C_2$-$C_{24}$ alkynyl groups and $C_3$-$C_{24}$ cycloalkyl groups, the alkyl groups, alkenyl groups, alkynyl groups and cycloalkyl groups being optionally substituted.

Yet even more preferably, spacer moieties $Sp^1$ and $Sp^2$, if present, are independently selected from the group consisting of linear or branched $C_1$-$C_{20}$ alkylene groups, $C_2$-$C_{20}$ alkenylene groups, $C_2$-$C_{20}$ alkynylene groups, $C_3$-$C_{20}$ cycloalkylene groups, $C_5$-$C_{20}$ cycloalkenylene groups, $C_8$-$C_{20}$ cycloalkynylene groups, $C_7$-$C_{20}$ alkylarylene groups, $C_7$-$C_{20}$ arylalkylene groups, $C_8$-$C_{20}$ arylalkenylene groups and $C_9$-$C_{20}$ arylalkynylene groups, the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups being optionally substituted and optionally interrupted by one or more heteroatoms selected from the group of O, S and $NR^{16}$, wherein $R^{16}$ is independently selected from the group consisting of hydrogen, $C_1$-$C_{24}$ alkyl groups, $C_2$-$C_{24}$ alkenyl groups, $C_2$-$C_{24}$ alkynyl groups and $C_3$-$C_{24}$ cycloalkyl groups, the alkyl groups, alkenyl groups, alkynyl groups and cycloalkyl groups being optionally substituted.

In these preferred embodiments it is further preferred that the alkylene groups, alkenylene groups, alkynylene groups, cycloalkylene groups, cycloalkenylene groups, cycloalkynylene groups, alkylarylene groups, arylalkylene groups, arylalkenylene groups and arylalkynylene groups are unsubstituted and optionally interrupted by one or more heteroatoms selected from the group of O, S and $NR^{16}$, preferably O, wherein $R^{16}$ is independently selected from the group consisting of hydrogen and $C_1$-$C_4$ alkyl groups, preferably hydrogen or methyl.

Most preferably, spacer moieties $Sp^1$ and $Sp^2$, if present, are independently selected from the group consisting of linear or branched $C_1$-$C_{20}$ alkylene groups, the alkylene groups being optionally substituted and optionally interrupted by one or more heteroatoms selected from the group of O, S and $NR^{16}$, wherein $R^{16}$ is independently selected from the group consisting of hydrogen, $C_1$-$C_{24}$ alkyl groups, $C_2$-$C_{24}$ alkenyl groups, $C_2$-$C_{24}$ alkynyl groups and $C_3$-$C_{24}$ cycloalkyl groups, the alkyl groups, alkenyl groups, alkynyl groups and cycloalkyl groups being optionally substituted. In this embodiment, it is further preferred that the alkylene groups are unsubstituted and optionally interrupted by one or more heteroatoms selected from the group of O, S and $NR^{16}$, preferably O and/or S—S, wherein $R^{16}$ is independently selected from the group consisting of hydrogen and $C_1$-$C_4$ alkyl groups, preferably hydrogen or methyl.

Preferred spacer moieties $Sp^1$ and $Sp^2$ thus include —$(CH_2)_r$—, —$(CH_2CH_2)_r$—, —$(CH_2CH_2O)_r$—, —$(OCH_2CH_2)_r$—, —$(CH_2CH_2O)_rCH_2CH_2$—, —$CH_2CH_2(OCH_2CH_2)_r$—, —$(CH_2CH_2CH_2O)_r$—, —$(OCH_2CH_2CH_2)_r$—, —$(CH_2CH_2CH_2O)_rCH_2CH_2CH_2$— and —$CH_2CH_2CH_2(OCH_2CH_2CH_2)_r$—, wherein r is an integer in the range of 1 to 50, preferably in the range of 1 to 40, more preferably in the range of 1 to 30, even more preferably in the range of 1 to 20 and yet even more preferably in the range of 1 to 15. More preferably n is 1, 2, 3, 4, 5, 6, 7, 8, 9 or 10, more preferably 1, 2, 3, 4, 5, 6, 7 or 8, even more preferably 1, 2, 3, 4, 5 or 6, yet even more preferably 1, 2, 3 or 4.

Alternatively, preferred linkers $L^1$ may be represented by —$(W)_k$-$(A)_d$-$(B)_e$-$(A)_f$-$(C(O))_g$—, wherein:
d=0 or 1, preferably d=1;
e=an integer in the range 0-10, preferably e=0, 1, 2, 3, 4, 5 or 6, preferably an integer in the range 1-10, most preferably e=1, 2, 3 or 4;
f=0 or 1, preferably f=0;
wherein d+e+f is at least 1, preferably in the range 1-5; and preferably wherein d+f is at least 1, preferably d+f=1.
g=0 or 1, preferably g=1;
k=0 or 1, preferably k=1;
A is a sulfamide group according to structure (23);
B is a —$CH_2$—$CH_2$—O— or a —O—$CH_2$—$CH_2$— moiety, or $(B)_e$ is a —$(CH_2$—$CH_2$—O$)_{e1}$—$CH_2$—$CH_2$— or a —$(CH_2$—$CH_2$—O$)_{e1}$—$CH_2$— moiety, wherein e1 is defined the same way as e;
W is —OC(O)—, —C(O)O—, —C(O)NH—, —NHC(O)—, —OC(O)NH—, —NHC(O)O—, —C(O)$(CH_2)_m$C(O)—, —C(O)$(CH_2)_m$C(O)NH— or -(4-Ph)$CH_2$NHC(O)$(CH_2)_m$C(O)NH—, preferably wherein W is —OC(O)NH—, —C(O)$(CH_2)_m$C(O)NH— or —C(O)NH—, and wherein m is an integer in the range 0-10, preferably m=0, 1, 2, 3, 4, 5 or 6, most preferably m=2 or 3;
preferably wherein $L^1$ is connected to Q via $(W)_k$ and to $L^2$, $L^3$, $L^4$ or D, preferably to $L^2$, via $(C(O))_g$, preferably via C(O).

In the context of the present embodiment, the wavy lines in structure (23) represent the connection to the adjacent groups such as $(W)_k$, $(B)_e$ and $(C(O))_g$. It is preferred that A is according to structure (23), wherein a=1 and $R^{13}$=H or a $C_1$-$C_{20}$ alkyl group, more preferably $R^{13}$=H or methyl, most preferably $R^{13}$=H.

Preferred linkers $L^1$ have structure —$(W)_k$-$(A)_d$-$(B)_e$-$(A)_r$-$(C(O))_g$—, wherein:
(a) k=0; d=1; g=1; f=0; B=—$CH_2$—$CH_2$—O—; e=1, 2, 3 or 4, preferably e=2.
(b) k=1; W=—C(O)$(CH_2)_m$C(O)NH—; m=2; d=0; $(B)_e$=—$(CH_2$—$CH_2$—O$)_{e1}$—$CH_2$—$CH_2$—; f=0; g=1; e1=1, 2, 3 or 4, preferably e=1.
(c) k=1; W=—OC(O)NH—; d=0; B=—$CH_2$—$CH_2$—O—; g=1; f=0; e=1, 2, 3 or 4, preferably e=2.
(d) k=1; W=—C(O)$(CH_2)_m$C(O)NH—; m=2; d=0; $(B)_e$=—$(CH_2$—$CH_2$—O$)_{e1}$—$CH_2$—$CH_2$—; f=0; g=1; e1=1, 2, 3 or 4, preferably e1=4.
(e) k=1; W=—OC(O)NH—; d=0; $(B)_e$=—$(CH_2$—$CH_2$—O$)_{e1}$—$CH_2$—$CH_2$—; g=1; f=0; e1=1, 2, 3 or 4, preferably e1=4.
(f) k=1; W=—(4-Ph)$CH_2$NHC(O)$(CH_2)_m$C(O)NH—, m=3; d=0; $(B)_e$=—$(CH_2$—$CH_2$—O$)_{e1}$—$CH_2$—$CH_2$—; g=1; f=0; e1=1, 2, 3 or 4, preferably e1=4.
(g) k=0; d=0; g=1; f=0; B=—$CH_2$—$CH_2$—O—; e=1, 2, 3 or 4, preferably e=2.
(h) k=1; W=—C(O)NH—; d=0; g=1; f=0; B=—$CH_2$—$CH_2$—O—; e=1, 2, 3 or 4, preferably e=2.

In a preferred embodiment, linker $L^1$ comprises a branching nitrogen atom, which is located in the backbone between Q or Z and $(L^2)_o$ and which contains a further moiety D as substituent, which is preferably linked to the branching nitrogen atom via a linker. An example of a branching nitrogen atom is the nitrogen atom $NR^{13}$ in structure (23), wherein $R^{13}$ is connected to a second occurrence of D via a spacer moiety. Alternatively, a branching nitrogen atoms may be located within $L^1$ according to structure —$(W)_k$-$(A)_d$-$(B)_e$-$(A)_f$-$(C(O))_g$—. In one embodiment, $L^1$ is represented by —$(W)_k$-$(A)_d$-$(B)_e$-$(A)_f$-$(C(O))_g$—N*[-$(A)_{d'}$-$(B)_{e'}$-$(A)_{f'}$-$(C(O))_{g'}$-]2, wherein A, B, W, d, e, f, g and k are as defined above and individually selected for each occurrence, and N* is the branching nitrogen atoms, to which two instances of -$(A)_{d'}$-$(B)_{e'}$-$(A)_{f'}$-$(C(O))_{g'}$— are connected. Herein, both $(C(O))_g$ moieties are connected to -$(L^2)_o$-$(L^3)_p$-$(L^4)_q$-D, wherein $L^2$, $L^3$, $L^4$, o, p, q and D are as defined above and are each selected individually. In a preferred embodiment, each of $L^2$, $L^3$, $L^4$, o, p, q and D are the same for both moieties connected to $(C(O))_g$.

Preferred linkers $L^1$ comprising a branching nitrogen atom have structure —$(W)_k$-$(A)_d$-$(B)_e$-$(A)_f$-$(C(O))_g$—N*[-$(A')_{d'}$—$(B')_e$-$(A')_{f'}$—$(C(O))_{g'}$-]2 wherein:

(i) k=d=g=e'=1; f=d'=g'=0; W=—C(O)—; B=B'=—CH$_2$—CH$_2$—O—; A is according to structure (23) with a=0 and $R^{13}$=H; e=1, 2, 3 or 4, preferably e=2.

(j) k=d=g=e'=g'=1; f=d'=0; W=—C(O)—; B=B'=—CH$_2$—CH$_2$—O—; A is according to structure (23) with a=0 and $R^{13}$=H; e=1, 2, 3 or 4, preferably e=2.

Linker $L^2$

Linker $L^2$ is either absent (o=0) or present (o=1). Preferably, linker $L^2$ is present and o=1. Linker $L^2$ is a peptide spacer The peptide spacer is preferably defined by (NH—$CR^{17}$—CO)$_n$, wherein $R^{17}$ represents an amino acid side chain as known in the art. Herein, the amino acid may be a natural or a synthetic amino acid. Preferably, the amino acid(s) are all in their L-configuration. n is an integer in the range of 1-5, preferably in the range of 2-5. Thus, the peptide spacer preferably contains 1-5 amino acids. Preferably, the peptide is a dipeptide (n=2), tripeptide (n=3) ortetrapeptide (n=4), most preferably the peptide spacer is a dipeptide. Although any peptide spacer may be used, preferably the peptide spacer is selected from Val-Cit, Val-Ala, Val-Lys, Val-Arg, AcLys-Val-Cit, AcLys-Val-Ala, Glu-Val-Ala, Asp-Val-Ala, iGlu-Val-Ala, Glu-Val-Cit, Asp-Val-Cit, iGlu-Val-Cit, Phe-Cit, Phe-Ala, Phe-Lys, Phe-Arg, Ala-Lys, Leu-Cit, Ile-Cit, Trp-Cit, Ala-Ala-Asn, Ala-Asn, Gly-Gly-Phe-Gly and Lys, more preferably Val-Cit, Val-Ala, Glu-Val-Ala, Val-Lys, Phe-Cit, Phe-Ala, Phe-Lys, Ala-Ala-Asn, more preferably Val-Cit, Val-Ala, Ala-Ala-Asn, most preferably Val-Cit or Val-Ala. Herein, AcLys is acetyllysine and iGlu is isoglutamate. In one embodiment, $L^2$=Val-Cit. In one embodiment, $L^2$=Val-Ala.

$R^{17}$ represents the amino acid side chain, preferably selected from the side chains of alanine, cysteine, aspartic acid, glutamic acid, phenylalanine, glycine, histidine, isoleucine, lysine, acetyllysine, leucine, methionine, asparagine, pyrrolysine, proline, glutamine, arginine, serine, threonine, selenocysteine, valine, tryptophan, tyrosine and citrulline. Preferred amino acid side chains are those of Val, Cit, Ala, Lys, Arg, AcLys, Phe, Leu, Ile, Trp, Glu, Asp and Asn, more preferably from the side chains of Val, Cit, Ala, Glu and Lys. Alternatively worded, $R^{17}$ is preferably selected from CH$_3$ (Ala), CH$_2$CH(CH$_3$)$_2$ (Leu), CH$_2$CH$_2$CH$_2$NHC(O)NH$_2$ (Cit), CH$_2$CH$_2$CH$_2$CH$_2$NH$_2$ (Lys), CH$_2$CH$_2$CH$_2$NHC(O)CH$_3$ (AcLys), CH$_2$CH$_2$CH$_2$NHC(=NH)NH$_2$ (Arg), CH$_2$Ph (Phe), CH(CH$_3$)$_2$ (Val), CH(CH$_3$)CH$_2$CH$_3$ (Ile), CH$_2$C(O)NH$_2$ (Asn), CH$_2$CH$_2$C(O)OH (Glu), CH$_2$C(O)OH (Asp) and CH$_2$(1H-indol-3-yl) (Trp). Especially preferred embodiments of $R^{17}$ are CH$_3$ (Ala), CH$_2$CH$_2$CH$_2$NHC(O)NH$_2$ (Cit), CH$_2$CH$_2$CH$_2$CH$_2$NH$_2$ (Lys), CH$_2$CH$_2$C(O)OH (Glu) and CH(CH$_3$)$_2$ (Val). Most preferably, $R^{17}$ is CH$_3$ (Ala), CH$_2$CH$_2$CH$_2$NHC(O)NH$_2$ (Cit), CH$_2$CH$_2$CH$_2$CH$_2$NH$_2$ (Lys), or CH(CH$_3$)$_2$ (Val).

In an especially preferred embodiment, the peptide spacer may be represented by general structure (L3):

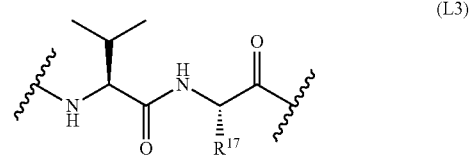

(L3)

Herein, $R^{17}$ is as defined above, preferably $R^{17}$ is CH$_3$ (Val) or CH$_2$CH$_2$CH$_2$NHC(O)NH$_2$ (Cit). The wavy lines indicate the connection to $(L^1)_n$ and $(L^3)_p$, preferably $L^2$ according to structure (L3) is connected to $(L^1)_n$ via NH and to $(L^3)_p$ via C(O).

Linker $L^3$

Linker $L^3$ is either absent (p=0) or present (p=1). Preferably, linker $L^3$ is present and p=1. Linker $L^3$ is a self-cleavable spacer, also referred to as self-immolative spacer. Preferably, $L^3$ is para-aminobenzyloxycarbonyl (PABC) derivative, more preferably a PABC derivative according to structure (L4):

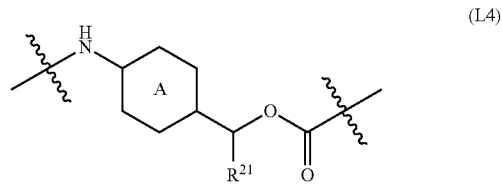

(L4)

Herein, the wavy lines indicate the connection to Q or Z, $L^1$ or $L^2$, and to $L^4$ or D. Typically, the PABC derivative is connected via NH to Q, Z, $L^1$ or $L^2$, preferably to $L^2$, and via O to $L^4$ or D.

A is a 5- or 6-membered aromatic or heteroaromatic ring, preferably a 6-membered aromatic or heteroaromatic ring. Suitable 5-membered rings are oxazole, thiazole and furan. Suitable 6-membered rings are phenyl and pyridyl. In a preferred embodiment, A is 1,4-phenyl, 2,5-pyridyl or 3,6-pyridyl. Most preferably, A is 1,4-phenyl.

$R^{21}$ is selected from H, $R^{26}$, C(O)OH and C(O)$R^{26}$, wherein $R^{26}$ is C$_1$-C$_{24}$ (hetero)alkyl groups, C$_3$-C$_{10}$ (hetero)cycloalkyl groups, C$_2$-C$_{10}$ (hetero)aryl groups, C$_3$-C$_{10}$ alkyl (hetero)aryl groups and C$_3$-C$_{10}$ (hetero)arylalkyl groups, which are optionally substituted and optionally interrupted by one or more heteroatoms selected from O, S and N$R^{28}$ wherein $R^{28}$ is independently selected from the group consisting of hydrogen and C$_1$-C$_4$ alkyl groups. Preferably, $R^{26}$ is C$_3$-C$_{10}$ (hetero)cycloalkyl or polyalkylene glycol. The polyalkylene glycol is preferably a polyethylene glycol or a polypropylene glycol, more preferably —(CH$_2$CH$_2$O)$_s$H or —(CH$_2$CH$_2$CH$_2$O)$_s$H. The polyalkylene glycol is most preferably a polyethylene glycol, preferably —(CH$_2$CH$_2$O)$_s$H, wherein s is an integer in the range 1-10, preferably 1-5, most preferably s=1, 2, 3 or 4. More preferably, $R^{21}$ is H or C(O)$R^{26}$, wherein $R^{26}$=4-methyl-piperazine or morpholine. Most preferably, $R^{21}$ is H.

Linker $L^4$

Linker $L^4$ is either absent (q=0) or present (q=1). Preferably, linker $L^4$ is present and q=1. Linker $L^4$ is selected from:

an aminoalkanoic acid spacer according to the structure —N$R^{22}$—(C$_z$-alkylene)-C(O)—, wherein z is an integer in the range 1-20 and $R^{22}$ is H or C$_1$-C$_4$ alkyl;

an ethyleneglycol spacer according to the structure —NR$^{22}$—(CH$_2$—CH$_2$—O)$_{e6}$—(CH$_2$)$_{e7}$—C(O)—, wherein e6 is an integer in the range 1-10, e7 is an integer in the range 1-3 and R$^{22}$ is H or C$_1$-C$_4$ alky; and an diamine spacer according to the structure —NR$^{22}$—(C$_z$-alkylene)-NR$^{22}$—(C(O))$_h$—, wherein h is 0 or 1, z is an integer in the range 1-20 and R$^{22}$ is H or C$_1$-C$_4$ alkyl.

Linker L$^4$ may be an aminoalkanoic acid spacer, i.e. —NR$^{22}$—(C$_z$-alkylene)-C(O)—, wherein z is an integer in the range 1 to 20, preferably 1-10, most preferably 1-6. Herein, the aminoalkanoic acid spacer is typically connected to L$^3$ via the nitrogen atom and to D via the carbonyl moiety. Preferred linkers L$^4$ are selected from 6-aminohexanoic acid (Ahx, z=5), β-alanine (z=2) and glycine (Gly, z=1), even more preferably 6-aminohexanoic acid or glycine. In one embodiment, L$^4$=6-aminohexanoic acid. In one embodiment, L$^4$=glycine. Herein, R$^{22}$ is H or C$_1$-C$_4$alkyl, preferably R$^{22}$ is H or methyl, most preferably R$^{22}$ is H.

Alternatively, linker L$^4$ may be an ethyleneglycol spacer according to the structure —NR$^{22}$—(CH$_2$—CH$_2$—O)$_{e6}$—(CH$_2$)$_{e7}$—(C(O))—, wherein e6 is an integer in the range 1-10, preferably e6 is in the range 2-6, and e7 is an integer in the range 1-3, preferably e7 is 2. Herein, R$^{22}$ is H or C$_1$-C$_4$ alkyl, preferably R$^{22}$ is H or methyl, most preferably R$^{22}$ is H.

Alternatively, linker L$^4$ may be a diamine spacer according to the structure —NR$^{22}$—(C$_z$-alkylene)-NR$^{22}$—(C(O))$_h$—, wherein h is 0 or 1, z is an integer in the range 1-20, preferably an integer in the range 2-6, even more preferably z=2 or 5, most preferably z=2. R$^{22}$ is H or C$_1$-C$_4$ alkyl. Herein, R$^{22}$ is H or C$_1$-C$_4$ alkyl, preferably R$^{22}$ is H or methyl, most preferably R$^{22}$ is methyl. Herein, h is preferably 1, in which case linker L$^4$ is especially suited for conjugation via a phenolic hydroxyl group present on payload D.

Payload D

D represents the target molecule D that is or is to be connected to the antibody, which is also referred to in the art as the payload. D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof. Alternatively, D is defined as a pharmaceutically active substance, such as an anti-cancer agent, preferably a cytotoxin. Preferably, D is selected from the group consisting of anthracyclines, camptothecins, maytansinoids, enediynes, amanitins, auristatins and pyrrolobenzodiazepine dimers, more preferably D is selected from the group consisting of enediynes, auristatins and camptothecins. In one embodiment, D is an enediyne. In one embodiment, D is an auristatin. In one embodiment, D is a camptothecin. Most preferably, D is a camptothecin.

Figure 6:
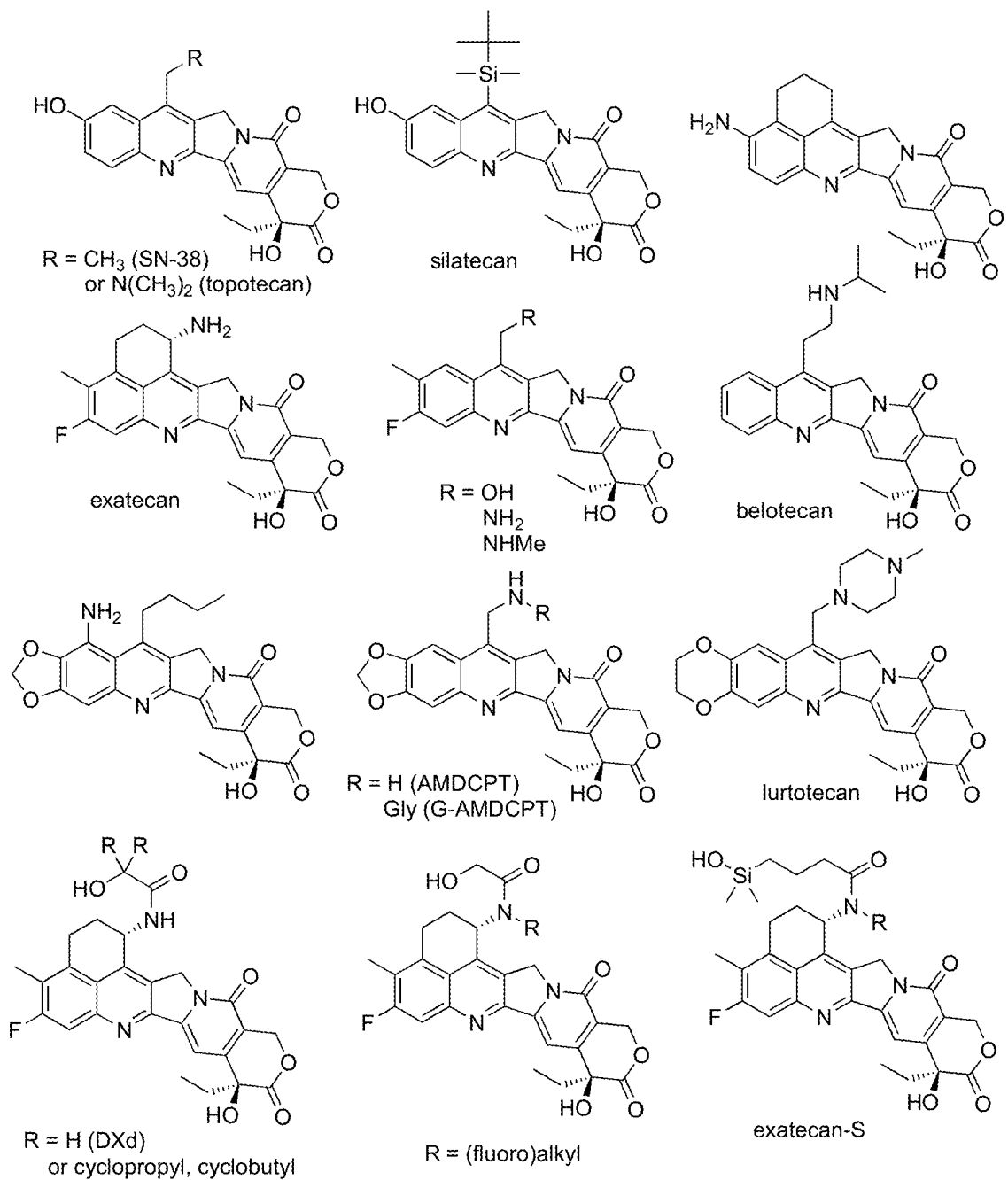
FIG. 6 shows the structures of various camptothecins, which are preferred payloads in the context of the present invention.
Figure 7:
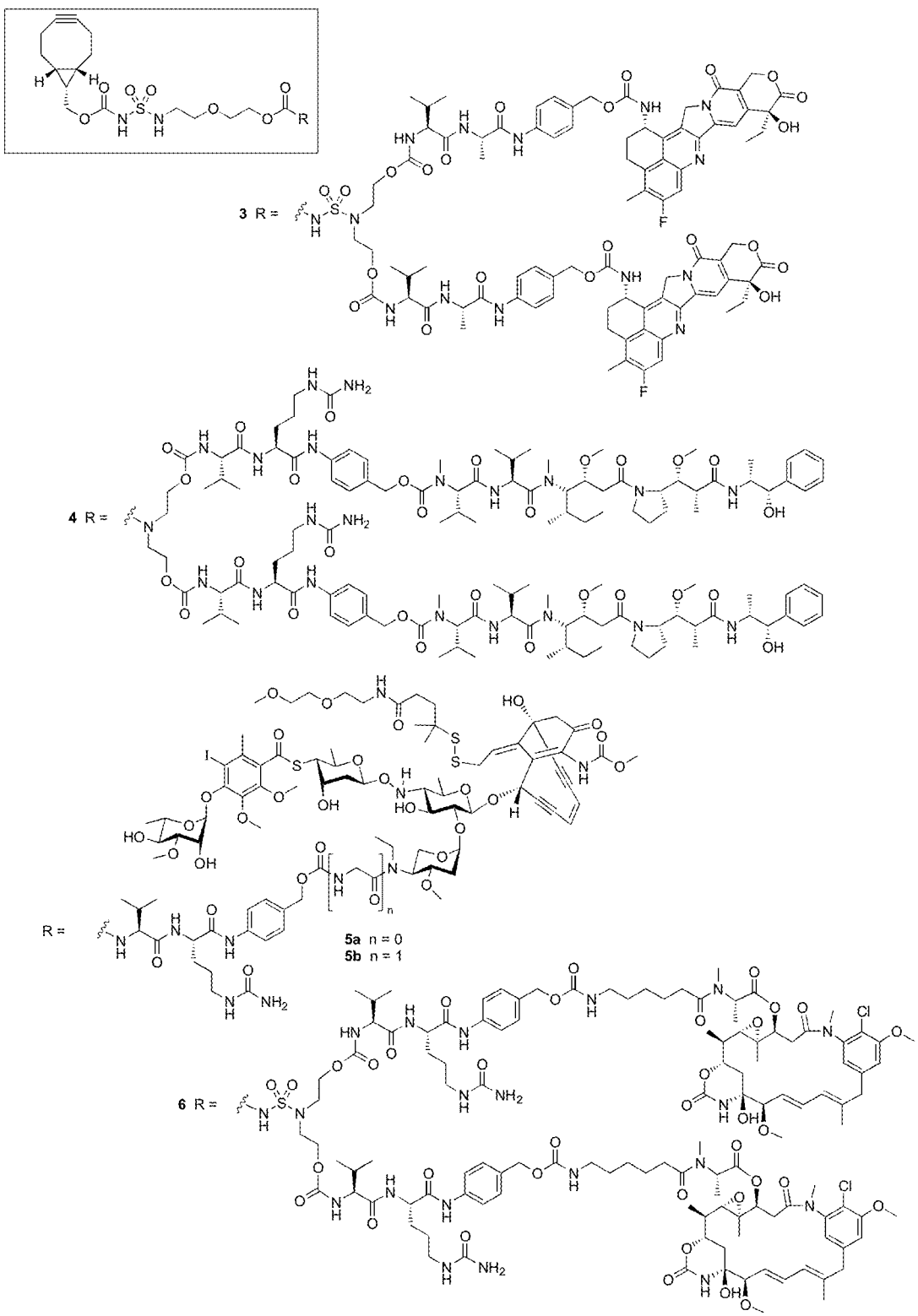
FIG. 7 depicts the structures of the BCN-linker drugs used to prepare ADCs via click chemistry to the azido-sugar remodeled antibody, with the following payloads (3=exatecan, 4=MMAE, 5a=calicheamicin $g_1^I$, 5b=glycine-calicheamicin $g_1^I$, 6=6-aminohexanoyl-maytansinoid).
Figure 8:
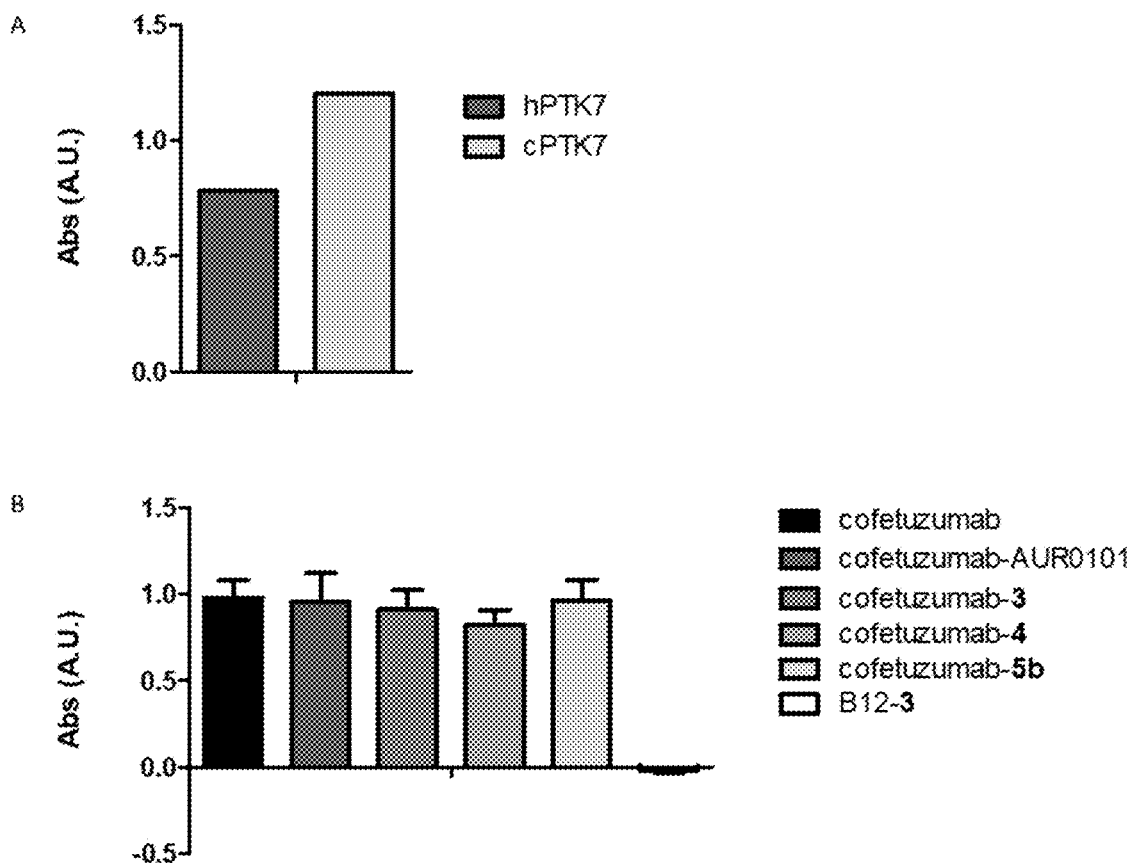
FIG. 8 shows: (A) the binding of cofetuzumab to hPTK7 and cPTK7 corrected for background and (B) shows binding of all cofetuzumab-based ADCs to hPTK7, comparable to the corresponding mAb.

In a preferred embodiment, the enediyne is selected from the group consisting of calicheamicins, esperamicins, shishijimicins and namenamicins, more preferably calicheamicin. In another preferred embodiment, the auristatin is selected from the group consisting of MMAD, MMAE, MMAF or PF-06380101, more preferably MMAE or PF-06380101. In another preferred embodiment, the camptothecin is selected from the compounds depicted in FIG. 6, preferably from the group consisting of topotecan, silatecan, cositecan, exatecan, exatecan-S, DXd, SN-38, lurtotecan, gimatecan, belotecan, rubitecan, AMDCPT and G-AMDCPT, more preferably exatecan or DXd, most preferably exatecan.

In an especially preferred embodiment, D is selected from the group consisting of calicheamicin, MMAE, PF-06380101, exatecan and DXd, more preferably from the group consisting of calicheamicin, MMAE, and exatecan, most preferably D is exatecan.

The compound according to general structure (2) may comprise more than one moiety D. When more than one cytotoxin D is present the cytotoxins D may be the same or different, typically they are the same. In a preferred embodiment, the compound according to general structure (2) contains 1 or 2 occurrences of D, most preferably 2 occurrence of D. Typically, the second occurrence of D is present within linker L, which may contain a branching moiety, typically a branching nitrogen atom, that is connected to the second occurrence of D. Preferably, both occurrences of D are connected to the branching moiety via the same linker. Likewise, the antibody-conjugate according to structure (1) may contain more than one moiety D per connecting group Z.

Preferred Antibody-Conjugates

Preferred antibody-conjugates according to the first aspect are selected from the group consisting of compounds (I)-(III), more preferably (II) or (III), most preferably (II). More preferred antibody-conjugates are selected from (X)-(XIII). In one especially preferred embodiment, the antibody-conjugates is selected from (Xa), (XIb), (XIIg), (XIIh) and (XIIIe). In an even more preferred embodiment, the antibody-conjugates is selected from (XI) and (XIII), more preferably (XIb) or (XIIIe), more preferably the antibody-conjugates is according to (XIII), most preferably according to (XIIIe). The structures of these antibody-conjugates are defined here below.

Antibody-conjugate (1) has the following structure:

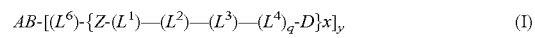

$$AB\text{-}[(L^6)\text{-}\{Z\text{-}(L^1)\text{---}(L^2)\text{---}(L^3)\text{---}(L^4)_q\text{-}D\}x]_y \quad (I)$$

wherein:
AB, L$^6$, Z, D, x and y are as defined above;
L$^1$ is a linker represented by -(A)$_d$-(B)$_e$-(A)$_r$-(C(O))$_g$—, as defined above;
L$^2$ is Val-Cit or Val-Ala;
L$^3$ is the PABC derivative according to structure (L4);
L$^4$ is —N—(C$_z$-alkylene)-C(O)— or —NR$^{22}$—(C$_z$-alkylene)-NR$^{22}$—, wherein z and R$^{22}$ are as defined above;
q=0 or 1.

In the context of antibody-conjugate (I), it is preferred that for L$^1$, d=1 (A according to structure (23), it is preferred that a=1 and R$^{13}$=H), e=2, f=0 and g=1. In the context of antibody-conjugate (I), it is preferred that L$^2$=Val-Cit. In the context of antibody-conjugate (I), it is preferred that for L$^3$, R$^{21}$=H. In the context of antibody-conjugate (I), it is preferred that in case q=1, then z=1 or 5.

In a particularly preferred embodiment, the antibody-conjugate according to structure (1) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

Antibody-conjugate (II) has the following structure:

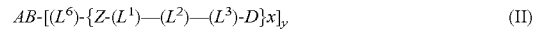

$$AB\text{-}[(L^6)\text{-}\{Z\text{-}(L^1)\text{---}(L^2)\text{---}(L^3)\text{-}D\}x]_y \quad (II)$$

wherein:
AB, L$^6$, Z, D, x and y are as defined above;
L$^1$ is a linker represented by -(A)-(B)$_e$—(C(O))—, as defined above;
L$^2$ is Val-Cit or Val-Ala;

L³ is the PABC derivative according to structure (L⁴), wherein R²¹=H.

In the context of antibody-conjugate (II), it is preferred that for L¹, e=2, A according to structure (23), it is preferred that a=1 and R¹³=H. In the context of antibody-conjugate (II), it is preferred that L²=Val-Cit.

In a particularly preferred embodiment, the antibody-conjugate according to structure (II) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

Antibody-conjugate (III) has the following structure:

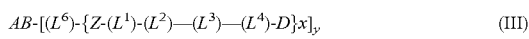

$$AB\text{-}[(L^6)\text{-}\{Z\text{-}(L^1)\text{-}(L^2)\text{---}(L^3)\text{---}(L^4)\text{-}D\}x]_y \quad (III)$$

wherein:
  AB, L⁶, Z, D, x and y are as defined above;
  L¹ is a linker represented by -(A)-(B)$_e$—(C(O))—, as defined above;
  L² is Val-Cit or Val-Ala;
  L³ is the PABC derivative according to structure (L⁴), wherein R²¹=H;
  L⁴ is —NR²²—(C$_z$-alkylene)-NR²²—, wherein R²² is as defined above and z is an integer in the range 1 to 6.

In the context of antibody-conjugate (III), it is preferred that for L¹, e=2, and with a=1 and R¹³=H. In the context of antibody-conjugate (III), it is preferred that L²=Val-Cit. In the context of antibody-conjugate (III), it is preferred that z=2.

In a particularly preferred embodiment, the antibody-conjugate according to structure (III) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

Antibody-conjugate (X) has a linker-payload moiety according to the following structure:

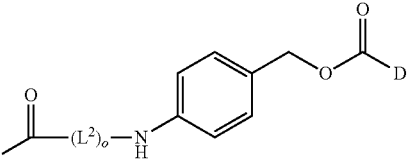

wherein:
  the wavy line indicates the connection to Z;
  L², o and D are as defined above.
  L² may be present of absent, preferably L² is present and o=1. For preferred antibody-conjugate (Xa), L² is according to structure (L³) and R¹⁷ is CH₃. For preferred antibody-conjugate (Xb), L² is according to structure (L³) and R¹⁷ is CH₂CH₂CH₂NHC(O)NH₂. The antibody-conjugate (X) preferably has structure (Xa).

In a particularly preferred embodiment, the antibody-conjugate according to structure (X) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

Antibody-conjugate (XI) has a linker-payload moiety according to the following structure:

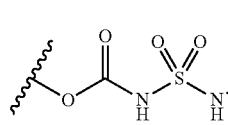

wherein:
  the wavy line indicates the connection to Z;
  L², o and D are as defined above.
  L² may be present of absent, preferably L² is present and o=1. For preferred antibody-conjugate (XIa), L² is according to structure (L³) and R¹⁷ is CH₃. For preferred antibody-conjugate (XIb), L² is according to structure (L³) and R¹⁷ is CH₂CH₂CH₂NHC(O)NH₂. The antibody-conjugate (XI) preferably has structure (XIb).

In a particularly preferred embodiment, the antibody-conjugate according to structure (XI) contains a payload D selected from the group consisting of calicheamicin, MMAE, PF-06380101, exatecan and DXd, more preferably a payload D selected from the group consisting of calicheamicin, MMAE, and exatecan, most preferably with calicheamicin as payload D.

Antibody-conjugate (XII) has a linker-payload moiety according to the following structure:

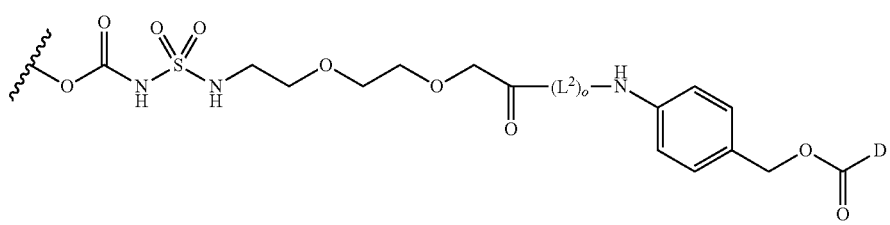

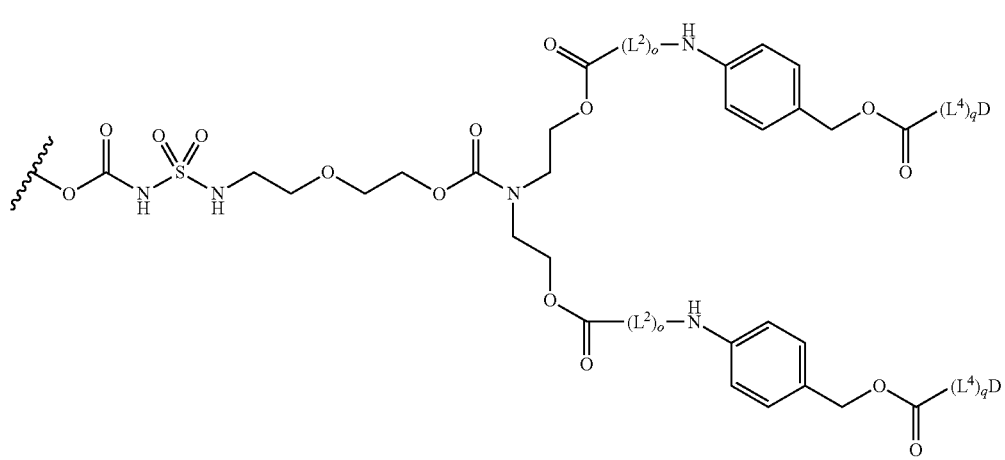

(XII)

wherein:
the wavy line indicates the connection to Z;
$L^2$, $L^4$, o, q and D are as defined above.

$L^2$ may be present of absent, preferably $L^2$ is present and o=1. For preferred antibody-conjugate (XIIa), $L^2$ is according to structure ($L^3$) and $R^{17}$ is $CH_3$. For preferred antibody-conjugate (XIIb), $L^2$ is according to structure ($L^3$) and $R^{17}$ is $CH_2CH_2CH_2NHC(O)NH_2$. Preferably, $R^{17}=CH_2CH_2CH_2NHC(O)NH_2$.

$L^4$ may be present of absent. For preferred antibody-conjugate (XIIc), q=0 and $L^4$ is absent. For preferred antibody-conjugate (XId), q=1 and $L^4$ is a diamine spacer according to the structure —$NR^{22}$—($C_z$-alkylene)-$NR^{22}$—, wherein z is an integer in the range 1-20, and $R^{22}$ is H or $C_1$-$C_4$ alkyl.

For preferred antibody-conjugate (XIIe), $L^2$ is according to structure ($L^3$), $R^{17}$ is $CH_3$, q=0 and $L^4$ is absent. For preferred antibody-conjugate (XIIf), $L^2$ is according to structure ($L^3$), $R^{17}$ is $CH_3$, q=1 and $L^4$ is a diamine spacer according to the structure —$NR^{22}$—($C_z$-alkylene)-$NR^{22}$—, wherein z is an integer in the range 1-10, preferably wherein z=2, and $R^{22}$ is H or $C_1$-$C_4$ alkyl.

For preferred antibody-conjugate (XIIg), $L^2$ is according to structure ($L^3$), $R^{17}$ is $CH_2CH_2CH_2NHC(O)NH_2$, q=0 and $L^4$ is absent. For preferred antibody-conjugate (XIIh), $L^2$ is according to structure ($L^3$), $R^{17}$ is $CH_2CH_2CH_2NHC(O)NH_2$, q=1 and $L^4$ is a diamine spacer according to the structure —$NR^{22}$—($C_z$-alkylene)-$NR^{22}$—, wherein z is an integer in the range 1-20, and $R^{22}$ is H or $C_1$-$C_4$ alkyl.

In the context of antibody-conjugate (XII), it is preferred that z is an integer in the range of 1-10, more preferably z=2-6, most preferably z=2. In the context of antibody-conjugate (XII), it is further preferred that $R^{22}$ is H or $CH_3$.

In the context of antibody-conjugate (XII), structures (XIIg) and (XIIh) are most preferred.

In a particularly preferred embodiment, the antibody-conjugate according to structure (XII) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

Antibody-conjugate (XIII) has a linker-payload moiety according to the following structure:

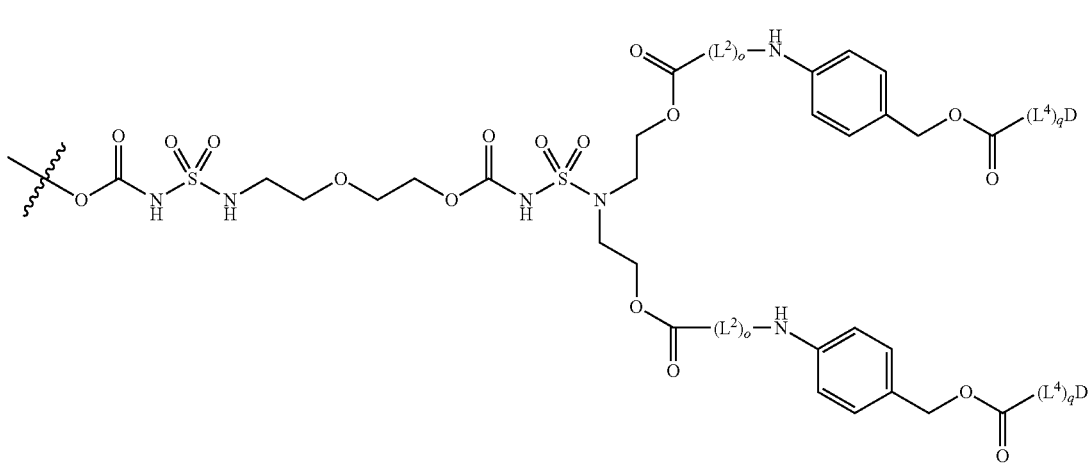

(XIII)

wherein:
the wavy line indicates the connection to Z;
$L^2$, $L^4$, o, q and D are as defined above.

$L^2$ may be present of absent, preferably $L^2$ is present and o=1. For preferred antibody-conjugate (XIIIa), $L^2$ is according to structure ($L^3$) and $R^{17}$ is $CH_3$. For preferred antibody-conjugate (XIIIb), $L^2$ is according to structure ($L^3$) and $R^{17}$ is $CH_2CH_2CH_2NHC(O)NH_2$. Preferably, $R^{17}=CH_3$.

$L^4$ may be present of absent. For preferred antibody-conjugate (XIIIc), q=0 and $L^4$ is absent. For preferred antibody-conjugate (XIIId), q=1 and $L^4$ is a diamine spacer according to the structure $-NR^{22}-(C_z\text{-alkylene})-NR^{22}-$, wherein z is an integer in the range 1-20, and $R^{22}$ is H or $C_1$-$C_4$ alkyl.

For preferred antibody-conjugate (XIIIe), $L^2$ is according to structure ($L^3$), $R^{17}$ is $CH_3$, q=0 and $L^4$ is absent. For preferred antibody-conjugate (XIIIf), $L^2$ is according to structure ($L^3$), $R^{17}$ is $CH_3$, q=1 and $L^4$ is a diamine spacer according to the structure $-NR^{22}-(C_z\text{-alkylene})-NR^{22}-$, wherein z is an integer in the range 1-10, preferably wherein z=2, and $R^{22}$ is H or $C_1$-$C_4$ alkyl.

For preferred antibody-conjugate (XIIIg), $L^2$ is according to structure ($L^3$), $R^{17}$ is $CH_2CH_2CH_2NHC(O)NH_2$, q=0 and $L^4$ is absent. For preferred antibody-conjugate (XIIIh), $L^2$ is according to structure ($L^3$), $R^{17}$ is $CH_2CH_2CH_2NHC(O)NH_2$, q=1 and $L^4$ is a diamine spacer according to the structure $-NR^{22}-(C_z\text{-alkylene})-NR^{22}-$, wherein z is an integer in the range 1-20, and $R^{22}$ is H or $C_1$-$C_4$ alkyl.

In the context of antibody-conjugate (XIII), it is preferred that z is an integer in the range of 1-10, more preferably z=2-6, most preferably z=2. In the context of antibody-conjugate (XIII), it is further preferred that $R^{22}$ is H or $CH_3$.

In the context of antibody-conjugate (XIII), structure (XIIIe) is most preferred.

In a particularly preferred embodiment, the antibody-conjugate according to structure (XIII) contains a payload D selected from the group consisting of calicheamicin, MMAE, PF-06380101, exatecan and DXd, more preferably a payload D selected from the group consisting of calicheamicin, MMAE, and exatecan, most preferably with exatecan as payload D.

In one particularly preferred embodiment, antibody-conjugate according to the invention is according to structure (XIb) as defined above, and the antibody is cofetuzumab as defined above as defined above, and the payload is calicheamicin.

In one particularly preferred embodiment, antibody-conjugate according to the invention is according to structure (XIIIe) as defined above, and the antibody is cofetuzumab as defined above, and the payload is exatecan.

It is further preferred that these preferred antibody-conjugates are conjugated through the glycan, i.e. b=1, more preferably a trimmed glycan, i.e. j=0. Herein, it is further preferred that S=GalNAc and w'=0. Herein, it is further preferred that connecting group Z is formed by an azide-alkyne cycloaddition, preferably connecting group Z=(Z39), wherein ring Z=(Za) and V=$CH_2$. Herein, it is further preferred that x=1. Herein, it is further preferred that y=2, more preferably that x=1 and y=2.

In a most preferred embodiment, the antibody-conjugate according to the invention is according to structure (XIIIe) as defined above, and the antibody is enfortumab YTE as defined above and the payload is exatecan, wherein b=1, e=0, S=GalNAc, w'=0, connecting group Z=(Z39), wherein ring Z=(Za) and V=$CH_2$, x=1 and y=2.

Compound According to General Structure (2)

The compound has general structure (2):

$$Q\text{-}L\text{-}D \quad (2)$$

wherein:
Q is a reactive moiety;
L is a linker that links Z to D;
D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof;

The compound of general structure (2) may also be referred to as a "linker-drug construct", for containing linker L and payload D of the final conjugate. Compounds according to general formula (2) can be prepared by the skilled person using standard organic synthesis techniques, and as exemplified in the examples. Linker L and payload D are defined above in the context of the conjugate according to structure (1).

Reactive Moiety Q

The compound according to general structure (2) comprises a reactive moiety Q. In the context of the present invention, the term "reactive moiety" may refer to a chemical moiety that comprises a reactive group, but also to a reactive group itself. For example, a cyclooctynyl group is a reactive group comprising a reactive group, namely a C—C triple bond. Similarly, an N-maleimidyl group is a reactive group, comprising a C—C double bond as a reactive group. However, a reactive group, for example an azido reactive group, a thiol reactive group or an alkynyl reactive group, may herein also be referred to as a reactive moiety.

Q serves as chemical handle for the connection to $S(F)_x$. In other words, Q is reactive towards and complementary to F. Herein, a reactive group is denoted as "complementary" to a reactive group when said reactive group reacts with said reactive group selectively, optionally in the presence of other functional groups. Complementary reactive and functional groups are known to a person skilled in the art, and are described in more detail below. As such, the compound according to general structure (2) is conveniently used in a conjugation reaction, wherein a chemical reaction between Q and F takes place, thereby forming an antibody-conjugate comprising a covalent connection between payload D and the antibody.

The exact nature of Q, and F, depends on the type of conjugation reaction that is employed. The skilled person will be able to select the appropriate combination of Q and F. Preferably, Q, and thus also F, is reactive in a cycloaddition or a nucleophilic reaction. Thus, Q preferably comprises a click probe, a thiol, a thiol-reactive moiety, an amine or an amine-reactive moiety, more preferably Q is a click probe, a thiol-reactive moiety or an amine-reactive moiety, most preferably Q is a click probe. The click probe is reactive in a cycloaddition (click reaction) and is preferably selected from an azide, a tetrazine, a triazine, a nitrone, a nitrile oxide, a nitrile imine, a diazo compound, an ortho-quinone, a dioxothiophene, a sydnone, an alkene moiety and an alkyne moiety. Preferably, the click probe comprises or is an alkene moiety or an alkyne moiety, more preferably wherein the alkene is a (hetero)cycloalkene and/or the alkyne is a terminal alkyne or a (hetero)cycloalkyne. Typical thiol-reactive moieties are selected from maleimide moiety, a haloacetamide moiety, an allenamide moiety, a phosphonamidite moiety, a cyanoethynyl moiety, a vinylsulfone, a vinylpyridine moiety or a methylsulfonylphenyloxadiazole moiety. Most preferably, the thiol-reactive moiety comprises or is a maleimide moiety. Typical amine-reactive moieties are selected from N-hydroxysuccinimidyl esters and other activated esters, p-nitrophenyl carbonates and other activated carbonates, isocyanates, isothiocyanates, haloacetamides and benzyl halides. In a preferred embodiment, Q is selected from an alkene moiety, an alkyne moiety, a thiol-reactive moiety or an amine-reactive moiety, more preferably an alkene moiety or an alkyne moiety, even more preferably an alkyne moiety. Herein, the alkene is preferably a (hetero)cycloalkene and the alkyne is preferably a terminal alkyne or a (hetero)cycloalkyne. Most preferably, Q is a cyclic (hetero)alkyne moiety. Each of these moieties are further defined here below.

Thus, in an especially preferred embodiment, Q comprises a cyclic (hetero)alkyne moiety. The alkynyl group may also be referred to as a (hetero)cycloalkynyl group, i.e. a heterocycloalkynyl group or a cycloalkynyl group, wherein the (hetero)cycloalkynyl group is optionally substituted. Preferably, the (hetero)cycloalkynyl group is a (hetero)cycloheptynyl group, a (hetero)cyclooctynyl group, a (hetero)cyclononynyl group or a (hetero)cyclodecynyl group. Herein, the (hetero)cycloalkynes may optionally be substituted. Preferably, the (hetero)cycloalkynyl group is an optionally substituted (hetero)cycloheptynyl group or an optionally substituted (hetero)cyclooctynyl group. Most preferably, the (hetero)cycloalkynyl group is a (hetero)cyclooctynyl group, wherein the (hetero)cyclooctynyl group is optionally substituted.

In an especially preferred embodiment, Q comprises a (hetero)cycloalkynyl or (hetero)cycloalkenyl group and is according to structure (Q1):

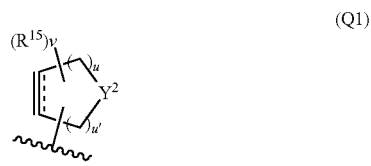

(Q1)

Herein:
the bond depicted as $\equiv\equiv\equiv$ is a double bond or a triple bond;
$R^{15}$ is independently selected from the group consisting of hydrogen, halogen, $-OR^{16}$, $-NO_2$, $-CN$, $-S(O)_2R^{16}$, $-S(O)_3^{(-)}$, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups and wherein the alkyl groups, (hetero)aryl groups, alkyl(hetero)aryl groups and (hetero)arylalkyl groups are optionally substituted, wherein two substituents $R^{15}$ may be linked together to form an optionally substituted annulated cycloalkyl or an optionally substituted annulated (hetero)arene substituent, and wherein $R^{16}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups;
$Y^2$ is $C(R^{31})_2$, O, S, $S^{(+)}R^{31}$, $S(O)R^{31}$, $S(O)=NR^{31}$ or $NR^{31}$, wherein $S^{(+)}$ is a cationic sulphur atom counterbalanced by $B^{(-)}$, wherein $B^{(-)}$ is an anion, and wherein each $R^{31}$ individually is $R^{15}$ or a connection with D, connected via L;
u is 0, 1, 2, 3, 4 or 5;
u' is 0, 1, 2, 3, 4 or 5, wherein u+u'=0, 1, 2, 3, 4, 5, 6, 7 or 8;
v=an integer in the range 0-16;

Typically, v=(u+u')×2 (when the connection to L, depicted by the wavy bond, is via $Y^2$) or [(u+u')×2]−1 (when the connection to L, depicted by the wavy bond, is via one of the carbon atoms).

In a preferred embodiment of structure (Q1), reactive group Q comprises a (hetero)cycloalkynyl group and is according to structure (Q1a):

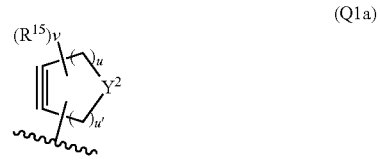

(Q1a)

Herein,
$R^{15}$ and $Y^2$ are as defined above
u is 0, 1, 2, 3, 4 or 5;
u' is 0, 1, 2, 3, 4 or 5, wherein u+u'=4, 5, 6, 7 or 8;
v=an integer in the range 8-16.

In a preferred embodiment, u+u'=4, 5 or 6, more preferably u+u'=5. In a preferred embodiment, v=8, 9 or 10, more preferably v=9 or 10, most preferably v=10.

In a preferred embodiment, Q is a (hetero)cycloalkynyl group selected from the group consisting of (Q2)-(Q20) and (Q20a) depicted here below.

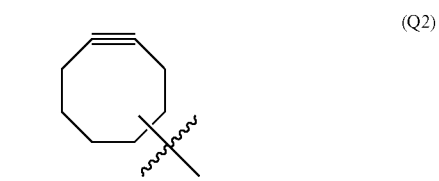

(Q2)

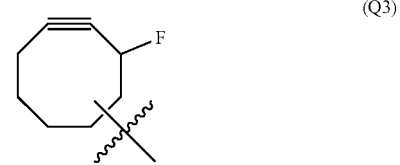

(Q3)

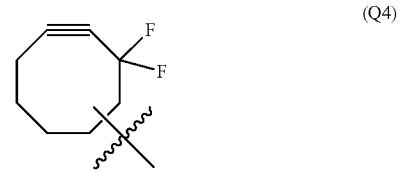

(Q4)

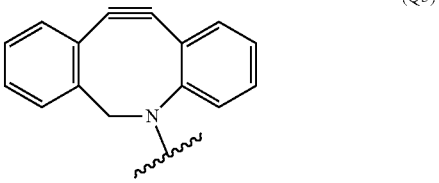

(Q5)

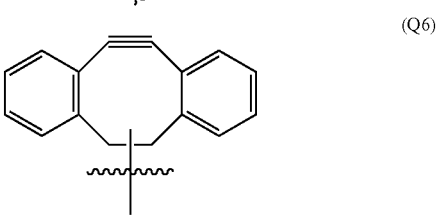

(Q6)

-continued (Q7)
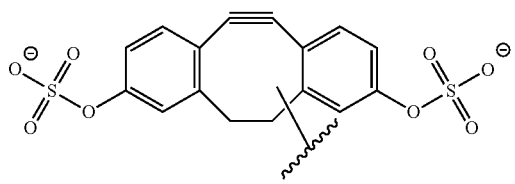

(Q8)
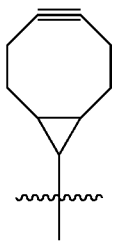

(Q9)
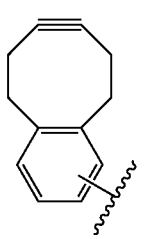

(Q10)
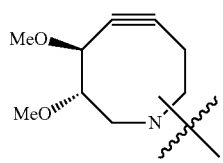

(Q11)
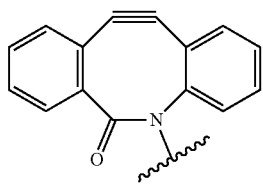

(Q12)
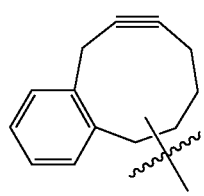

(Q13)
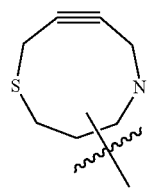

(Q14)
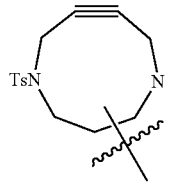

-continued (Q15)
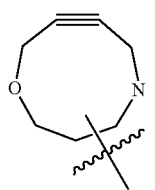

(Q16)
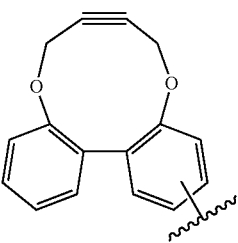

(Q17)
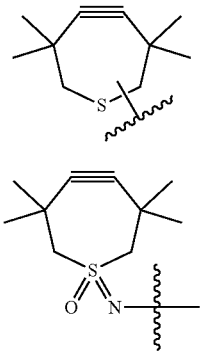

(Q18)
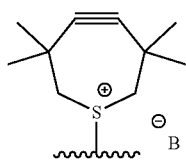

(Q19)
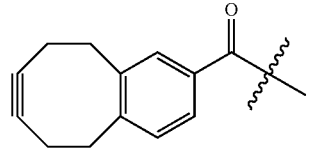

(Q20)
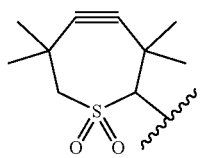

(Q20a)

Herein, the connection to L, depicted with the wavy bond, may be to any available carbon or nitrogen atom of Q. The nitrogen atom of (Q10), (Q13), (Q14) and (Q15) may bear the connection to L, or may contain a hydrogen atom or be optionally functionalized. $B^{(-)}$ is an anion, which is preferably selected from $^{(-)}OTf$, $Cl^{(-)}$, $Br^{(-)}$ or $I^{(-)}$, most preferably $B^{(-)}$ is $^{(-)}OTf$. In the conjugation reaction, $B^{(-)}$ does not need to be a pharmaceutically acceptable anion, since $B^{(-)}$ will exchange with the anions present in the reaction mixture anyway. In case (Q19) is used for Q, the negatively charged counter-ion is preferably pharmaceutically acceptable upon isolation of the conjugate according to the invention, such that the conjugate is readily useable as medicament.

In a further preferred embodiment, Q is a (hetero)cycloalkynyl group selected from the group consisting of (Q21)-(Q38) and (Q38a) depicted here below.
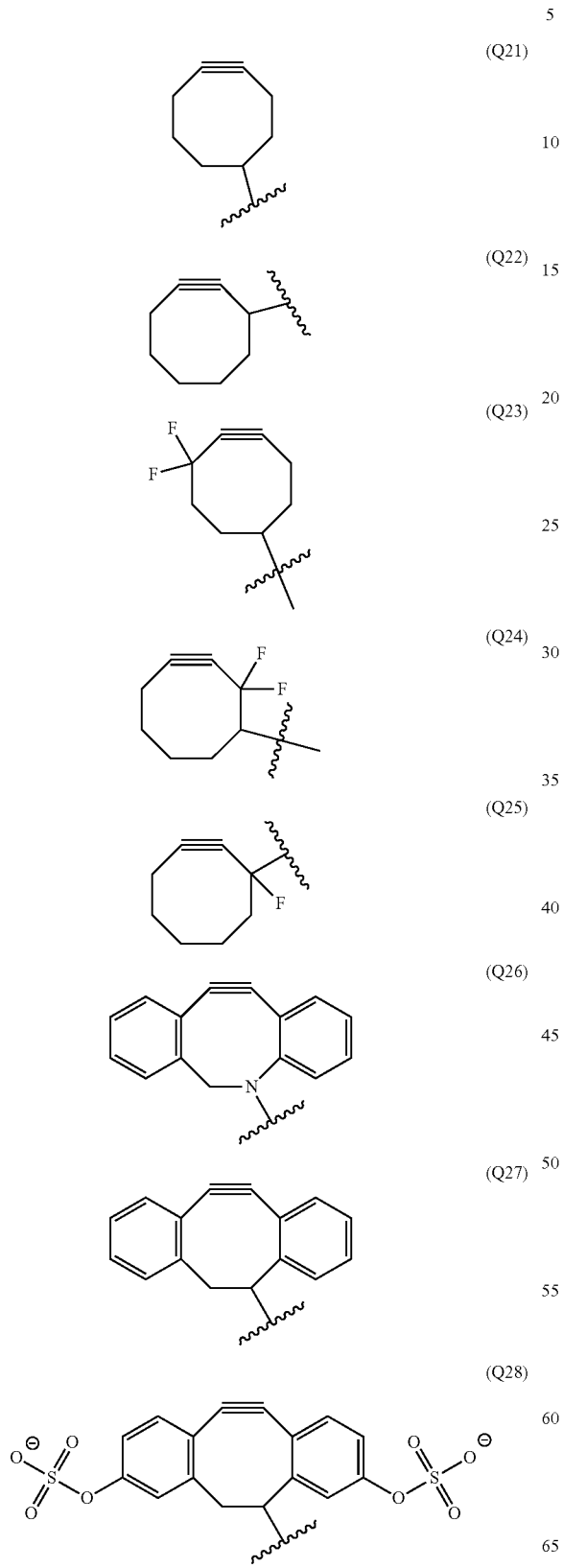
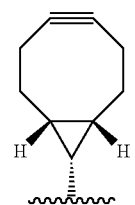
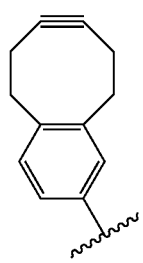
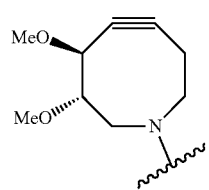
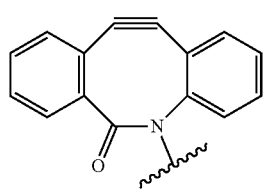
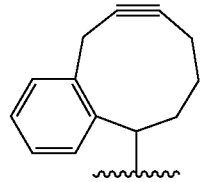
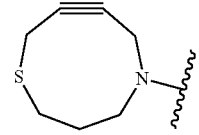
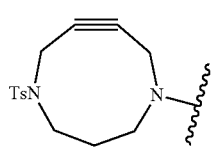
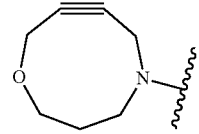

-continued

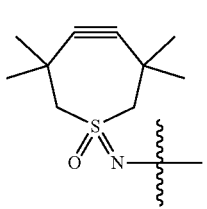
(Q37)

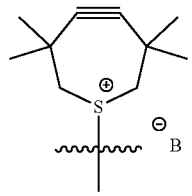
(Q38)

In structure (Q38), B$^{(-)}$H is an anion, which is preferably selected from $^{(-)}$OTf, Cl$^{(-)}$, Br$^{(-)}$ or I$^{(-)}$, most preferably B$^{(-)}$ is $^{(-)}$OTf.

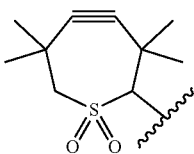
(Q38a)

In a preferred embodiment, Q comprises a (hetero)cyclooctyne moiety or a (hetero)cycloheptyne moiety, preferably according to structure (Q8), (Q26), (Q27), (Q28), (Q37) or (Q38a), more preferably according to structure (Q8), (Q26), (Q27), (Q28) or (Q37), which are optionally substituted. Each of these preferred options for Q are further defined here below.

Thus, in a preferred embodiment, Q comprises a heterocycloheptyne moiety according to structure (Q37), also referred to as a TMTHSI, which is optionally substituted. Preferably, the heterocycloheptyne moiety according to structure (Q37) is not substituted.

In an alternative preferred embodiment, Q comprises a cyclooctyne moiety according to structure (Q8), more preferably according to (Q29), also referred to as a bicyclo[6.1.0]non-4-yn-9-yl]group (BCN group), which is optionally substituted. Preferably, the cyclooctyne moiety according to structure (Q8) or (Q29) is not substituted. In the context of the present embodiment, Q preferably is a (hetero)cyclooctyne moiety according to structure (Q39) as shown below, wherein V is (CH$_2$)$_l$ and I is an integer in the range of 0 to 10, preferably in the range of 0 to 6. More preferably, I is 0, 1, 2, 3 or 4, more preferably I is 0, 1 or 2 and most preferably I is 0 or 1. In the context of group (Q39), I is most preferably 1. Most preferably, Q is according to structure (Q42), defined further below.

In an alternative preferred embodiment, Q comprises a (hetero)cyclooctyne moiety according to structure (Q26), (Q27) or (Q28), also referred to as a DIBO, DIBAC, DBCO or ADIBO group, which are optionally substituted. In the context of the present embodiment, Q preferably is a (hetero)cyclooctyne moiety according to structure (Q40) or (Q41) as shown below, wherein Y$^1$ is O or NR$^{11}$, wherein R$^{11}$ is independently selected from the group consisting of hydrogen, a linear or branched C$_1$-C$_{12}$ alkyl group or a C$_4$-C$_{12}$ (hetero)aryl group. The aromatic rings in (Q40) are optionally O— sulfonylated at one or more positions, whereas the rings of (Q41) may be halogenated at one or more positions. Preferably, the (hetero)cyclooctyne moiety according to structure (Q40) or (Q41) is not further substituted. Most preferably, Q is according to structure (Q43), defined further below.

In an alternative preferred embodiment, Q comprises a heterocycloheptynyl group and is according to structure (Q37).

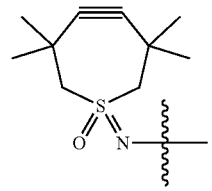
(Q37)

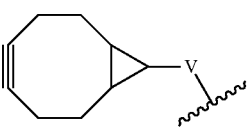
(Q39)

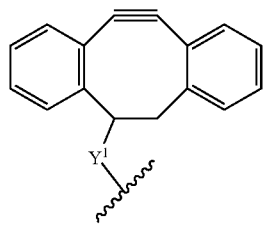
(Q40)

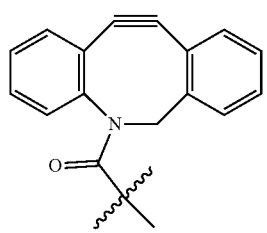
(Q41)

In an especially preferred embodiment, Q comprises a cyclooctynyl group and is according to structure (Q42):

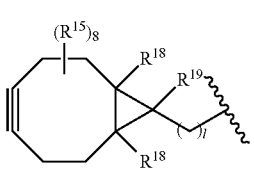
(Q42)

Herein:

R$^{15}$ is independently selected from the group consisting of hydrogen, halogen, —OR$^{16}$, —NO$_2$, —CN, —S(O)$_2$R$^{16}$, —S(O)$_3{}^{(-)}$, C$_1$-C$_{24}$ alkyl groups, C$_5$-C$_{24}$ (hetero)aryl groups, C$_7$-C$_{24}$ alkyl(hetero)aryl groups and C$_7$-C$_{24}$ (hetero)arylalkyl groups and wherein the alkyl groups, (hetero)aryl groups, alkyl(hetero)aryl groups and (hetero)arylalkyl groups are optionally substituted, wherein two substituents R$^{15}$ may be linked together to form an optionally substituted annulated cycloalkyl or an optionally substituted annulated (hetero)arene substituent, and wherein R$^{16}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups;

$R^{18}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups;

$R^{19}$ is selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups, the alkyl groups optionally being interrupted by one of more hetero-atoms selected from the group consisting of O, N and S, wherein the alkyl groups, (hetero)aryl groups, alkyl(hetero)aryl groups and (hetero)arylalkyl groups are independently optionally substituted, or $R^{19}$ is a second occurrence of Q or D connected via a spacer moiety; and l is an integer in the range 0 to 10.

In a preferred embodiment of the reactive group according to structure (Q42), $R^{15}$ is independently selected from the group consisting of hydrogen, halogen, —$OR^{16}$, $C_1$-$C_6$ alkyl groups, $C_5$-$C_6$ (hetero)aryl groups, wherein $R^{16}$ is hydrogen or $C_1$-$C_6$ alkyl, more preferably $R^{15}$ is independently selected from the group consisting of hydrogen and $C_1$-$C_6$ alkyl, most preferably all $R^{15}$ are H. In a preferred embodiment of the reactive group according to structure (Q42), $R^{18}$ is independently selected from the group consisting of hydrogen, $C_1$-$C_6$ alkyl groups, most preferably both $R^{18}$ are H. In a preferred embodiment of the reactive group according to structure (Q42), $R^{19}$ is H. In a preferred embodiment of the reactive group according to structure (Q42), l is 0 or 1, more preferably l is 1.

In an especially preferred embodiment, Q comprises a (hetero)cyclooctynyl group and is according to structure (Q43):

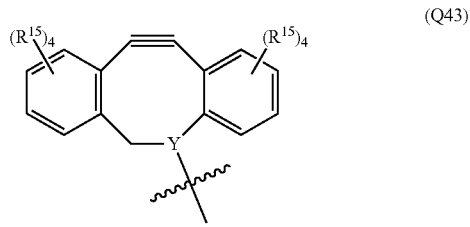

(Q43)

Herein:

$R^{15}$ is independently selected from the group consisting of hydrogen, halogen, —$OR^{16}$, —$NO_2$, —CN, —$S(O)_2R^{16}$, —$S(O)_3^{(-)}$, $C_1$-$C_{24}$ alkyl groups, $C_5$-$C_{24}$ (hetero)aryl groups, $C_7$-$C_{24}$ alkyl(hetero)aryl groups and $C_7$-$C_{24}$ (hetero)arylalkyl groups and wherein the alkyl groups, (hetero)aryl groups, alkyl(hetero)aryl groups and (hetero)arylalkyl groups are optionally substituted, wherein two substituents $R^{15}$ may be linked together to form an optionally substituted annulated cycloalkyl or an optionally substituted annulated (hetero)arene substituent, and wherein $R^{16}$ is independently selected from the group consisting of hydrogen, halogen, $C_1$-$C_{24}$ alkyl groups, $C_6$-$C_{24}$ (hetero)aryl groups, $C_7$-$C_{24}$ alkyl(hetero)aryl groups and $C_7$-$C_{24}$ (hetero)arylalkyl groups;

Y is N or $CR^{15}$.

In a preferred embodiment of the reactive group according to structure (Q43), $R^{15}$ is independently selected from the group consisting of hydrogen, halogen, —$OR^{16}$, —$S(O)_3^{(-)}$, $C_1$-$C_6$ alkyl groups, $C_5$-$C_6$ (hetero)aryl groups, wherein $R^{16}$ is hydrogen or $C_1$-$C_6$ alkyl, more preferably $R^{15}$ is independently selected from the group consisting of hydrogen and —$S(O)_3^{(-)}$. In a preferred embodiment of the reactive group according to structure (Q43), Y is N or CH, more preferably Y=N.

In an especially preferred embodiment, Q comprises a heterocycloheptynyl group and is according to structure (Q37) or (Q38a), preferably according to structure (Q37)

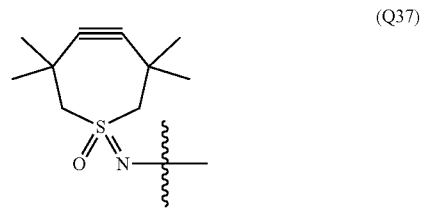

(Q37)

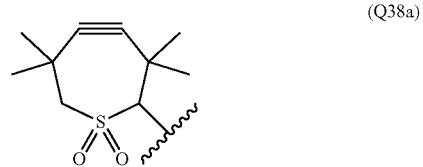

(Q38a)

In an alternative preferred embodiment, Q comprises a cyclic alkene moiety. The alkenyl group Q may also be referred to as a (hetero)cycloalkenyl group, i.e. a heterocycloalkenyl group or a cycloalkenyl group, preferably a cycloalkenyl group, wherein the (hetero)cycloalkenyl group is optionally substituted. Preferably, the (hetero)cycloalkenyl group is a (hetero)cyclopropenyl group, a (hetero)cyclobutenyl group, a norbornene group, a norbornadiene group, a trans-(hetero)cycloheptenyl group, a trans-(hetero)cyclooctenyl group, a trans-(hetero)cyclononenyl group or a trans-(hetero)cyclodecenyl group, which may all optionally be substituted. Especially preferred are (hetero)cyclopropenyl groups, trans-(hetero)cycloheptenyl group or trans-(hetero)cyclooctenyl groups, wherein the (hetero)cyclopropenyl group, the trans-(hetero)cycloheptenyl group or the trans-(hetero)cyclooctenyl group is optionally substituted. Preferably, Q comprises a cyclopropenyl moiety according to structure (Q44), a hetereocyclobutene moiety according to structure (Q45), a norbornene or norbornadiene group according to structure (Q46), a trans-(hetero)cycloheptenyl moiety according to structure (Q47) or a trans-(hetero)cyclooctenyl moiety according to structure (Q48). Herein, $Y^3$ is selected from $C(R^{23})_2$, $NR^{23}$ or O, wherein each $R^{23}$ is individually hydrogen, $C_1$-$C_6$ alkyl or is connected to L, optionally via a spacer, and the bond labelled --- is a single or double bond. In a --- further preferred embodiment, the cyclopropenyl group is according to structure (Q49). In another preferred embodiment, the trans-(hetero)cycloheptene group is according to structure (Q50) or (Q51). In another preferred embodiment, the trans-(hetero)cyclooctene group is according to structure (Q52), (Q53), (Q54), (Q55) or (Q56).

(Q44)

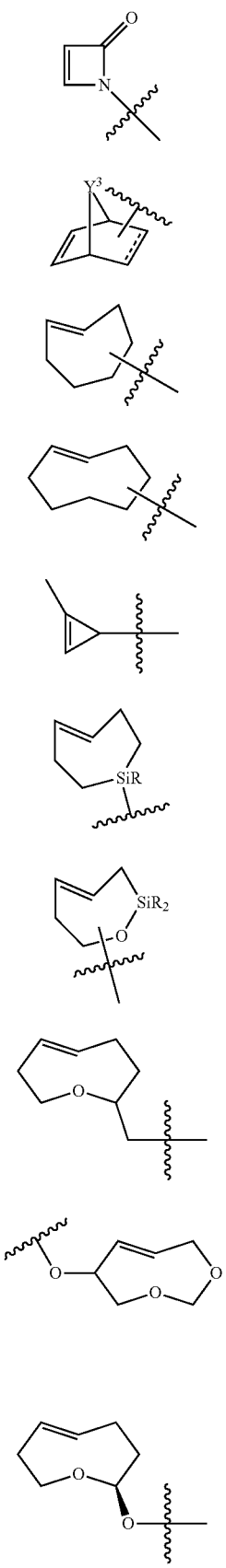

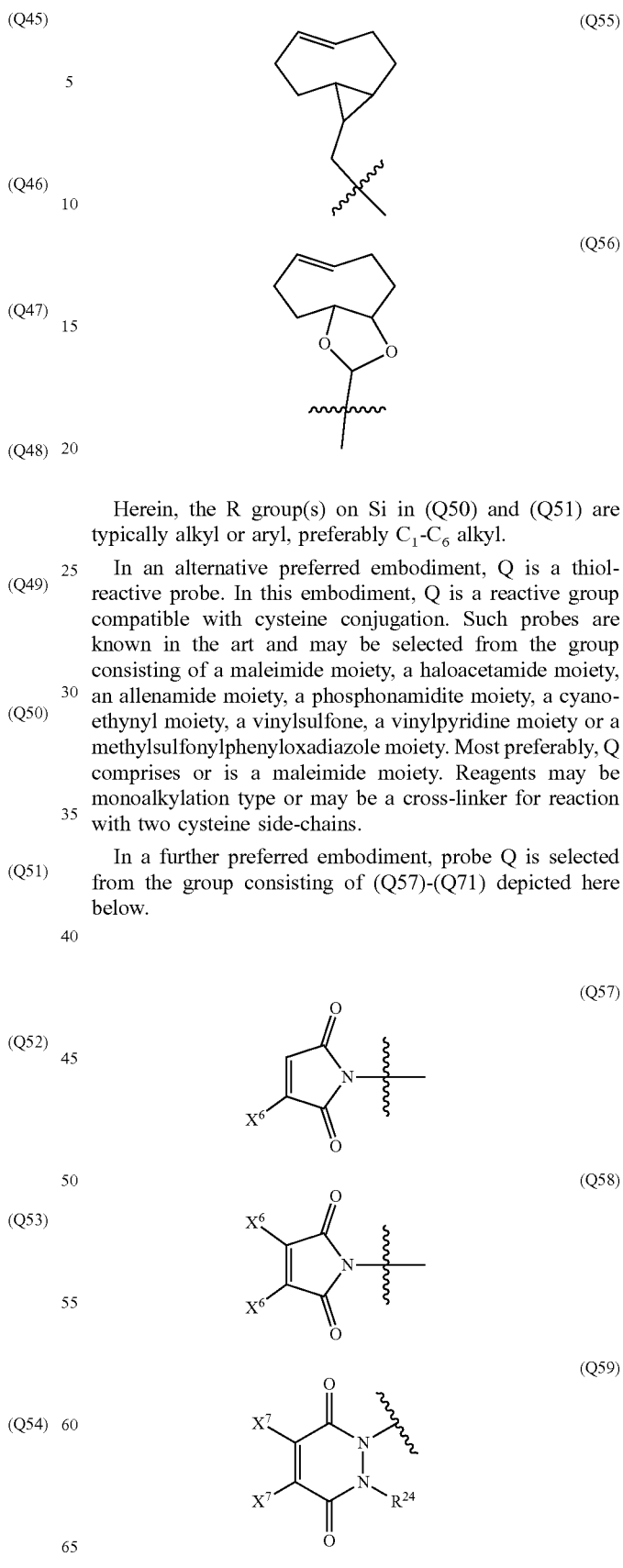

Herein, the R group(s) on Si in (Q50) and (Q51) are typically alkyl or aryl, preferably $C_1$-$C_6$ alkyl.

In an alternative preferred embodiment, Q is a thiol-reactive probe. In this embodiment, Q is a reactive group compatible with cysteine conjugation. Such probes are known in the art and may be selected from the group consisting of a maleimide moiety, a haloacetamide moiety, an allenamide moiety, a phosphonamidite moiety, a cyanoethynyl moiety, a vinylsulfone, a vinylpyridine moiety or a methylsulfonylphenyloxadiazole moiety. Most preferably, Q comprises or is a maleimide moiety. Reagents may be monoalkylation type or may be a cross-linker for reaction with two cysteine side-chains.

In a further preferred embodiment, probe Q is selected from the group consisting of (Q57)-(Q71) depicted here below.

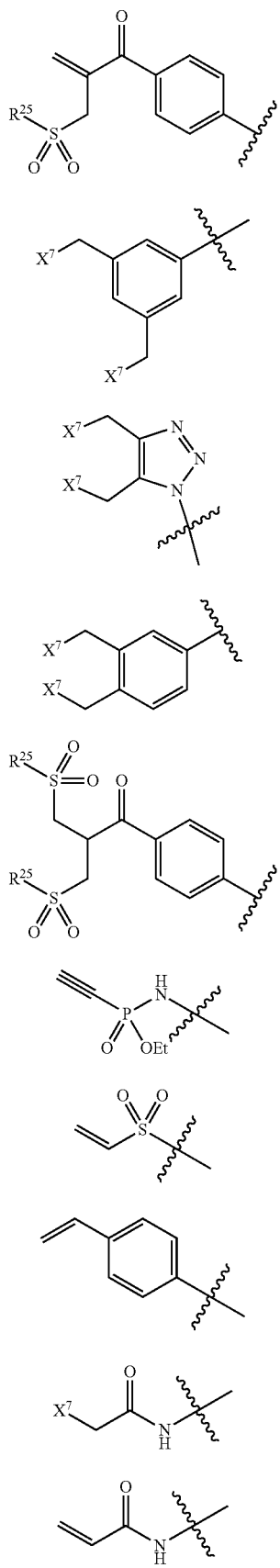

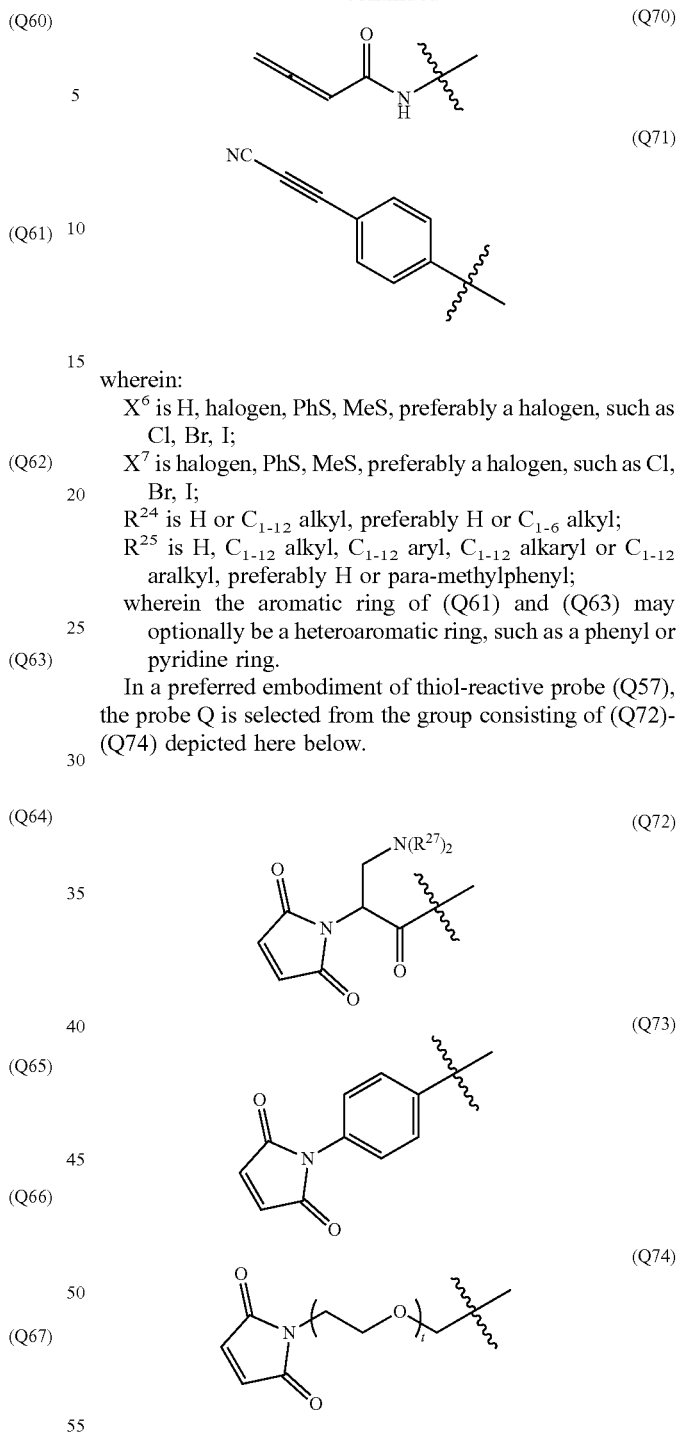

wherein:
X⁶ is H, halogen, PhS, MeS, preferably a halogen, such as Cl, Br, I;
X⁷ is halogen, PhS, MeS, preferably a halogen, such as Cl, Br, I;
$R^{24}$ is H or $C_{1-12}$ alkyl, preferably H or $C_{1-6}$ alkyl;
$R^{25}$ is H, $C_{1-12}$ alkyl, $C_{1-12}$ aryl, $C_{1-12}$ alkaryl or $C_{1-12}$ aralkyl, preferably H or para-methylphenyl;
wherein the aromatic ring of (Q61) and (Q63) may optionally be a heteroaromatic ring, such as a phenyl or pyridine ring.

In a preferred embodiment of thiol-reactive probe (Q57), the probe Q is selected from the group consisting of (Q72)-(Q74) depicted here below.

wherein:
$R^{27}$ is $C_{1-12}$ alkyl, $C_{1-12}$ aryl, $C_{1-12}$ alkaryl or $C_{1-12}$ aralkyl;
t is an integer in the range of 0-15, preferably 1-10.

In an alternative preferred embodiment, Q is an amine-reactive probe. In this embodiment, Q is a reactive group compatible with lysine conjugation. Such probes are known in the art and may be selected from the group consisting of N-hydroxysuccinimidyl groups, isocyanate groups, isothiocyanate groups and benzoyl halide groups. Most preferably, Q comprises or is an N-hydroxysuccinimidyl esters or a p-nitrophenyl carbonate moiety.

In a further preferred embodiment, probe Q is selected from the group consisting of (Q75)-(Q79) depicted here below.

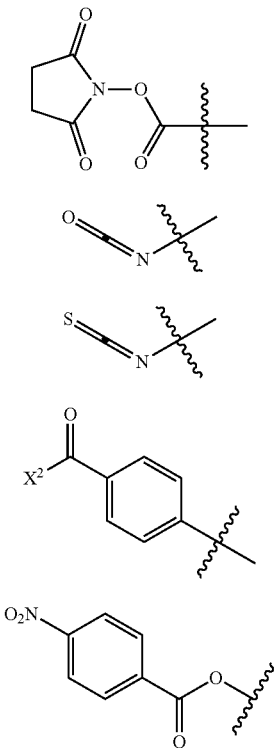

(Q75)
(Q76)
(Q77)
(Q78)
(Q79)

Herein, $X^2$ is halogen, preferably F.

In a preferred embodiment, Q is selected from the group consisting of (Q1)-(Q79).

Antibody according to general structure (3)

The antibody has general structure (3):

$$AB\text{-}[(L^6)_b\text{-}\{F\}_x]_y \quad (3)$$

wherein:
- AB is an antibody capable of targeting PTK7-expressing tumours;
- b is 0 or 1;
- $L^6$ is -GlcNAc(Fuc)$_{w'}$-(G)$_j$-S-(L$^7$)$_{w'}$-, wherein G is a monosaccharide, j is an integer in the range of 0-10, S is a sugar or a sugar derivative, GlcNAc is N-acetylglucosamine and Fuc is fucose, w is 0 or 1, w' is 0, 1 or 2 and $L^7$ is —N(H)C(O)CH$_2$—, —N(H)C(O)CF$_2$— or —CH$_2$—;
- F is a reactive moiety;
- x is 1 or 2; and
- y is 1, 2, 3 or 4.

The antibody of general structure (3) may also be referred to as a "(modified) antibody", for being an antibody containing reactive groups F, wherein the reactive groups F are naturally present or the antibody is modified to incorporate the reactive groups F. The (modified) antibody according to general formula (2) can be prepared by the skilled person using standard organic and/or enzymatic synthesis techniques, and as exemplified in the examples. Antibody AB, linker $L^6$, b, x and y are defined above in the context of the conjugate according to structure (1).

Reactive Moiety F

F is reactive towards Q in the conjugation reaction defined below, preferably wherein the conjugation reaction is a cycloaddition or a nucleophilic reaction. As the skilled person will understand, the options for F are the same as those for Q, provided that F and Q are reactive towards each other. Thus, F preferably comprises a click probe, a thiol, a thiol-reactive moiety, an amine or an amine-reactive moiety, more preferably F is a click probe, a thiol or an amine, most preferably F is a click probe. The click probe is reactive in a cycloaddition (click reaction) and is preferably selected from an azide, a tetrazine, a triazine, a nitrone, a nitrile oxide, a nitrile imine, a diazo compound, an ortho-quinone, a dioxothiophene, a sydnone, an alkene moiety and an alkyne moiety. Preferably, the click probe comprises or is an azide, a tetrazine, a triazine, a nitrone, a nitrile oxide, a nitrile imine, a diazo compound, an ortho-quinone, a dioxothiophene or a sydnone, most preferably an azide. Typical thiol-reactive moieties are selected from maleimide moiety, a haloacetamide moiety, an allenamide moiety, a phosphonamidite moiety, a cyanoethynyl moiety, an ortho-quinone moiety, a vinylsulfone, a vinylpyridine moiety or a methylsulfonylphenyloxadiazole moiety. Most preferably, the thiol-reactive moiety comprises or is a maleimide moiety. Typical amine-reactive moieties are selected from N-hydroxysuccinimidyl esters, isocyanates, isothiocyanates and benzyl halides. In a preferred embodiment, F is a click probe or a thiol, more preferably F is an azide or a thiol, most preferably F is an azide.

More than one reactive group F may be present in the antibody. The reactive group F in the antibody may be naturally present or may be placed in the antibody by a specific technique, for example a (bio)chemical or a genetic technique. The reactive group that is placed in the antibody is prepared by chemical synthesis, for example an azide or a terminal alkyne. Methods of preparing modified antibodies are known in the art, e.g. from WO 2014/065661, WO 2016/170186 and WO 2016/053107, which are incorporated herein by reference. From the same documents, the conjugation reaction between the modified antibody and a linker-drug construct is known to the skilled person.

Preferably, F is a click probe reactive towards a (hetero)cycloalkene and/or a (hetero)cycloalkyne, and is typically selected from the group consisting of azide, tetrazine, triazine, nitrone, nitrile oxide, nitrile imine, diazo compound, ortho-quinone, dioxothiophene and sydnone. Preferred structures for the reactive group are structures (F1)-(F10) depicted here below.

(F1)

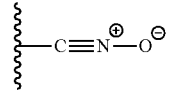

(F2)

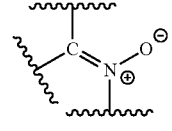

(F3)

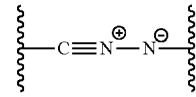

(F4)

-continued

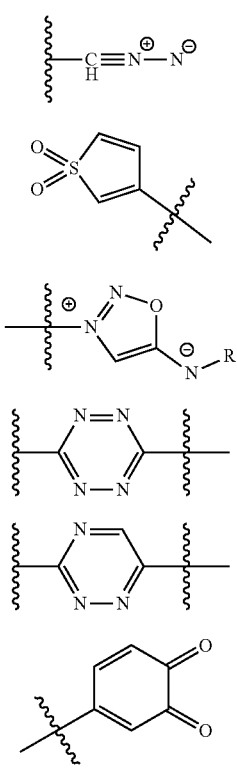

(F5)

(P6)

(F7)

(F8)

(F9)

(F10)

Herein, the wavy bond represents the connection to the payload. For (F3), (F4), (F8) and (F9), the payload can be connected to any one of the wavy bonds. The other wavy bond may then be connected to an R group selected from hydrogen, $C_1$-$C_{24}$ alkyl groups, $C_2$-$C_{24}$ acyl groups, $C_3$-$C_{24}$ cycloalkyl groups, $C_2$-$C_{24}$ (hetero)aryl groups, $C_3$-$C_{24}$ alkyl (hetero)aryl groups, $C_3$-$C_{24}$ (hetero)arylalkyl groups and $C_1$-$C_{24}$ sulfonyl groups, each of which (except hydrogen) may optionally be substituted and optionally interrupted by one or more heteroatoms selected from O, S and $NR^{32}$ wherein $R^{32}$ is independently selected from the group consisting of hydrogen and $C_1$-$C_4$ alkyl groups. The skilled person understands which R groups may be applied for each of the groups F. For example, the R group connected to the nitrogen atom of (F3) may be selected from alkyl and aryl, and the R group connected to the carbon atom of (F3) may be selected from hydrogen, alkyl, aryl, acyl and sulfonyl. Preferably, the reactive moiety F is selected from azides or tetrazines. Most preferably, the reactive moiety F is an azide.

In a second preferred embodiment, F is a thiol or precursor thereof. Thiol or precursor thereof F is used in the conjugation reaction to connect the linker-drug construct to the (modified) antibody. F is reactive towards thiol-reactive probe Q in a thiol ligation. The thiol preferably the thiol of the side chain of a cysteine amino acid, which are naturally present within the antibody AB, in which case linker $L^6$ is not present (b=0), although it may also be synthetically introduced, optionally via a linker $L^6$. Thiol precursors in the context of bioconjugation are known in the art, and include disulfides, which may be naturally occurring disulfide bridges present in the antibody or synthetically introduced disulfides, which are reduced as known in the art. Preferably, F is a thiol group of a cysteine side chain.

In a third preferred embodiment, F is an amine or precursor thereof, preferably an amine. Amine or precursor thereof F is used in the conjugation reaction to connect the linker-drug construct to the (modified) antibody. F is reactive towards amine-reactive probe Q in nucleophilic substitution. The amine is typically a primary amine, preferably the amine of the side chain of a lysine amino acid, which are naturally present within the antibody AB, in which case linker $L^6$ is not present (b=0), although it may also be synthetically introduced, optionally via a linker $L^6$. Preferably, F is a primary amine group of a lysine side chain.

Process for Synthesising the Antibody-Conjugate According to General Structure (1)

In a further aspect, the present invention relates to a process for the preparation of the antibody-conjugate according to the invention, the process comprising the step of reacting Q of the compound according to the invention with a reactive group F of an antibody. The compound according to general structure (2), and preferred embodiments thereof, are described in more detail above. The present process occurs under conditions such that Q is reacted with F to covalently link the antibody AB (3) to the payload D. In the process according to the invention, Q reacts with F, forming a covalent connection between the antibody and the compound according to the invention. Complementary reactive groups Q and reactive groups F are known to the skilled person and are described in more detail below.

Any conjugation technique known in the art can be employed to prepare the multifunctional antibody constructs according to the invention. Suitable conjugation techniques include thiol ligation, lysine ligation, cycloadditions (e.g. copper-catalysed click reaction, strain-promoted azide-alkyne cycloaddition, strain-promoted quinone-alkyne cycloaddition). Preferred conjugation techniques used in the context of the present invention include nucleophilic reactions and cycloadditions, preferably wherein the cycloaddition is a [4+2]cycloaddition or a [3+2]cycloaddition and the nucleophilic reaction is a Michael addition or a nucleophilic substitution. Suitable conjugation techniques are for example disclosed in G. T. Hermanson, "Bioconjugate Techniques", Elsevier, 3rd Ed. 2013 (ISBN:978-0-12-382239-0), WO 2014/065661, van Geel et al., *Bioconj. Chem.* 2015, 26, 2233-2242, PCT/EP2021/050594, PCT/EP2021/050598 and NL 2026947.

Thus, in a preferred embodiment of the conjugation process according to the invention, conjugation is accomplished via a nucleophilic reaction, such as a nucleophilic substitution or a Michael reaction. A preferred nucleophilic reaction is the acylation of a primary amino group with an activated ester. A preferred Michael reaction is the maleimide-thiol reaction, which is widely employed in bioconjugation.

Thus, in a preferred embodiment of the conjugation process according to the invention, conjugation is accomplished via a cycloaddition. Preferred cycloadditions are a (4+2)-cycloaddition (e.g. a Diels-Alder reaction) or a (3+2)-cycloaddition (e.g. a 1,3-dipolar cycloaddition). Preferably, the conjugation reaction is the Diels-Alder reaction or the 1,3-dipolar cycloaddition. The preferred Diels-Alder reaction is the inverse-electron demand Diels-Alder cycloaddition. In another preferred embodiment, the 1,3-dipolar cycloaddition is used, more preferably the alkyne-azide cycloaddition, and most preferably wherein Q is or comprises an alkyne group and F is an azido group. Cycloadditions, such as Diels-Alder reactions and 1,3-dipolar cycloadditions are known in the art, and the skilled person knowns how to perform them.

The process according to the present aspect preferably concerns a click reaction, more preferably a 1,3-dipolar cycloaddition, most preferably an alkyne/azide cycloaddition. Most preferably, Q is or comprises an alkyne group and F is an azido group. Click reactions, such as 1,3-dipolar cycloadditions, are known in the art, and the skilled person knows how to perform them.

Thus, the process for preparing the antibody-conjugate according to the invention according to this aspect comprises reacting the modified antibody of structure (3) with a compound according to structure (2), to obtain the antibody-conjugate of structure (1).

In a preferred embodiment, the process for preparing the antibody-conjugate according to the invention comprises:
(i) contacting an antibody comprising y core N-acetylglucosamine (GlcNAc) moieties, wherein y=1, 2, 3 or 4, with a compound of the formula $S(F)_x$—P in the presence of a catalyst, wherein $S(F)_x$ is a sugar derivative comprising x reactive groups F capable of reacting with a reactive group Q, x is 1 or 2 and P is a nucleoside mono- or diphosphate, and wherein the catalyst is capable of transferring the $S(F)_x$ moiety to the core-GlcNAc moiety, to obtain a modified antibody according to Formula (26):

$$AB\text{-}[GlcNAc(Fuc)_w\text{-}S\{F\}_x]_y \qquad (26)$$

wherein
AB is an antibody capable of targeting PTK7-expressing tumours;
Fuc is fucose;
w is 0 or 1; and
(ii) reacting the modified antibody with a compound according to structure (2):

$$Q\text{-}L\text{-}D \qquad (2)$$

wherein:
Q is a reactive moiety;
L is a linker that links Z to D;
D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof;
to obtain the antibody-conjugate according to structure (1).

Step (i)

In step (i), an antibody comprising 1, 2, 3 or 4 core N-acetylglucosamine moieties is contacted with a compound of the formula $S(F)_x$—P in the presence of a catalyst, wherein $S(F)_x$ is a sugar derivative comprising x reactive groups F capable of reacting with a reactive group Q, x is 1 or 2 and P is a nucleoside mono- or diphosphate, and wherein the catalyst is capable of transferring the $S(F)_x$ moiety to the core-GlcNAc moiety. Herein, the antibody is typically an antibody that has been trimmed to a core-GlcNAc residue as described further below. Step (i) affords a modified antibody according to Formula (26).

The starting material, i.e. the antibody comprising a core-GlcNAc substituent, is known in the art and can be prepared by methods known by the skilled person. In one embodiment, the process according to the invention further comprises the deglycosylation of an antibody glycan having a core N-acetylglucosamine, in the presence of an endoglycosidase, in order to obtain an antibody comprising a core N-acetylglucosamine substituent, wherein said core N-acetylglucosamine and said core N-acetylglucosamine substituent are optionally fucosylated. Depending on the nature of the glycan, a suitable endoglycosidase may be selected. The endoglycosidase is preferably selected from the group consisting of EndoS, EndoA, EndoE, EfEndoI8A, EndoF, EndoM, EndoD, EndoH, EndoT and EndoSH and/or a combination thereof, the selection of which depends on the nature of the glycan. EndoSH is described in PCT/EP2017/052792, see Examples 1-3, and SEQ. ID No: 1, which is incorporated by reference herein.

Structural features S and x are defined above for the antibody-conjugate according to the invention, which equally applies to the present aspect. Compounds of the formula $S(F)_x$—P, wherein a nucleoside monophosphate or a nucleoside diphosphate P is linked to a sugar derivative $S(F)_x$, are known in the art. For example Wang et al., *Chem. Eur. J.* 2010, 16, 13343-13345, Piller et al., *ACS Chem. Biol.* 2012, 7, 753, Piller et al., *Bioorg. Med. Chem. Lett.* 2005, 15, 5459-5462 and WO 2009/102820, all incorporated by reference herein, disclose a number of compounds $S(F)_x$—P and their syntheses. In a preferred embodiment nucleoside mono- or diphosphate P in $S(F)_x$—P is selected from the group consisting of uridine diphosphate (UDP), guanosine diphosphate (GDP), thymidine diphosphate (TDP), cytidine diphosphate (CDP) and cytidine monophosphate (CMP), more preferably P is selected from the group consisting of uridine diphosphate (UDP), guanosine diphosphate (GDP) and cytidine diphosphate (CDP), most preferably P=UDP. Preferably, $S(F)_x$—P is selected from the group consisting of GalNAz-UDP, $F_2$-GalNAz-UDP (N-(azidodifluoro)acetylgalactosamine), 6-AzGal-UDP, 6-AzGalNAc-UDP (6-azido-6-deoxy-N-acetylgalactosamine-UDP), 4-AzGalNAz-UDP, 6-AzGalNAz-UDP, GlcNAz-UDP, 6-AzGlc-UDP, 6-AzGlcNAz-UDP and 2-(but-3-yonic acid amido)-2-deoxy-galactose-UDP. Most preferably, $S(F)_x$—P is GalNAz-UDP or 6-AzGalNAc-UDP.

Suitable catalyst that are capable of transferring the $S(F)_x$ moiety to the core-GlcNAc moiety are known in the art. A suitable catalyst is a catalyst wherefore the specific sugar derivative nucleotide $S(F)_x$—P in that specific process is a substrate. More specifically, the catalyst catalyses the formation of a β(1,4)-glycosidic bond. Preferably, the catalyst is selected from the group of galactosyltransferases and N-acetylgalactosaminyltransferases, more preferably from the group of β(1,4)—N-acetylgalactosaminyltransferases (GalNAcT) and β(1,4)-galactosyltransferases (GalT), most preferably from the group of 3(1,4)—N-acetylgalactosaminyltransferases having a mutant catalytic domain. Suitable catalysts and mutants thereof are disclosed in WO 2014/065661, WO 2016/022027 and WO 2016/170186, all incorporated herein by reference. In one embodiment, the catalyst is a wild-type galactosyltransferase or N-acetylgalactosaminyltransferase, preferably an N-acetylgalactosaminyl-transferase. In an alternative embodiment, the catalyst is a mutant galactosyltransferase or N-acetylgalactosaminyltransferases, preferably a mutant N-acetylgalactosaminyltransferase. Mutant enzymes described in WO 2016/022027 and WO 2016/170186 are especially preferred. These galactosyltransferase (mutant) enzyme catalysts are able to recognize internal sugars and sugar derivatives as an acceptor. Thus, sugar derivative $S(F)_x$ is linked to the core-GlcNAc substituent in step (i), irrespective of whether said GlcNAc is fucosylated or not.

Step (i) is preferably performed in a suitable buffer solution, such as for example phosphate, buffered saline (e.g. phosphate-buffered saline, tris-buffered saline), citrate, HEPES, tris and glycine. Suitable buffers are known in the art. Preferably, the buffer solution is phosphate-buffered saline (PBS) or tris buffer. Step (i) is preferably performed at a temperature in the range of about 4 to about 50° C., more preferably in the range of about 10 to about 45° C., even more preferably in the range of about 20 to about 40° C., and most preferably in the range of about 30 to about 37° C. Step (i) is preferably performed a pH in the range of about 5 to about 9, preferably in the range of about 5.5 to about 8.5, more preferably in the range of about 6 to about 8. Most preferably, step (i) is performed at a pH in the range of about 7 to about 8.

Step (ii)

In step (ii), the modified antibody is reacted with a compound according to general structure (2), comprising a reactive group Q capable of reacting with reactive group F and a payload D, to obtain the antibody-conjugate according to structure (1), containing connecting group Z resulting from the reaction between Q and F. Such reaction occurs under condition such that reactive group Q is reacted with the reactive group F of the biomolecule to covalently link the antibody to the compound according to general structure (2). Step (ii) may also be referred to as the conjugation reaction.

In a preferred embodiment, in step (ii) an azide on an azide-modified antibody reacts with an alkynyl group, preferably a terminal alkynyl group, or a (hetero)cycloalkynyl group of the compound according to general structure (2), via a cycloaddition reaction. This cycloaddition reaction of a molecule comprising an azide with a molecule comprising a terminal alkynyl group or a (hetero)cycloalkynyl group is one of the reactions that is known in the art as "click chemistry". In the case of a linker-conjugate comprising a terminal alkynyl group, said cycloaddition reaction needs to be performed in the presence of a suitable catalyst, preferably a Cu(I) catalyst. However, in a preferred embodiment, the linker-conjugate comprises a (hetero)cycloalkynyl group, more preferably a strained (hetero)cycloalkynyl group. When the (hetero)cycloalkynyl is a strained (hetero)cycloalkynyl group, the presence of a catalyst is not required, and said reaction may even occur spontaneously by a reaction called strain-promoted azide-alkyne cycloaddition (SPAAC). This is one of the reactions known in the art as "metal-free click chemistry".

Application

The invention further concerns a method for the treatment of a subject in need thereof, comprising the administration of the antibody-conjugate according to the invention as defined above. The subject in need thereof is typically a cancer patient. The use of antibody-conjugates, such as antibody-drug conjugates, is well-known in the field of cancer treatment, and the antibody-conjugates according to the invention are especially suited in this respect. The method as described is typically suited for the treatment of cancer. In the method according to this aspect, the antibody-conjugate is typically administered in a therapeutically effective dose. The present aspect of the invention can also be worded as an antibody-conjugate according to the invention for use in the treatment of a subject in need thereof, preferably for the treatment of cancer. In other words, this aspect concerns the use of an antibody-conjugate according to the invention for the preparation of a medicament or pharmaceutical composition for use in the treatment of a subject in need thereof, preferably for use in the treatment of cancer. In the present context, treatment of cancer is envisioned to encompass treating, imaging, diagnosing, preventing the proliferation of, containing and reducing tumours.

This aspect of the present invention may also be worded as a method for targeting PTK7-expressing cells, in particular PTK7-expressing tumour cells, comprising contacting the antibody-conjugate according to the invention with cells that may possibly be PTK7-expressing. The method according to this aspect is thus suitable to determine whether the cells are PTK7-expressing. These PTK7-expressing cells may be present in a subject, in which case the method comprises administering to a subject in need thereof the antibody-conjugate according to the invention. In a preferred embodiment, the cells that may possibly be PTK7-expressing are PTK7-expressing cells. The targeting of PTK7-expressing cells preferably includes one or more of treating, imaging, diagnosing, preventing the proliferation of, containing and reducing PTK7-expressing cells, in particular PTK7-expressing tumour cells. The method according to this embodiment may be medical or non-medical. Non-medical methods according to the present aspect may be directed to in vitro or ex vivo targeting PTK7-expressing cells, wherein the cells that may possibly be PTK7-expressing are present in a sample, e.g. taken from a patient. Such a non-medical method is typically used for the diagnosis of cancer, in particular PTK7-positive cancer.

In the context of the present invention, the subject may suffer from a disorder selected from colon cancer, lung cancer, breast cancer, ovarian cancer and esophageal cancer. Thus, the treatment of a subject in need thereof preferably refers to the treatment of colon cancer, lung cancer, breast cancer, ovarian cancer and esophageal cancer.

The inventors have surprisingly found that the antibody-conjugates according to the invention are superior to conventional PTK7-targeting antibody-conjugates in terms of safety and/or efficacy, such that the therapeutic index of the antibody-conjugate according to the invention is increased with respect to conventional PTK7-targeting antibody-conjugates.

Mode of Conjugation

In the context of the present invention, the "mode of conjugation" refers to the process that is used to conjugate a payload D to an antibody AB, as well as to the structural features of the resulting antibody-conjugate, in particular of the linker that connects the payload to the antibody, that are a direct consequence of the process of conjugation. Thus, in one embodiment, the mode of conjugation refers to a process for conjugation a payload to an antibody. In an alternative embodiment, the mode of conjugation refers to structural features of the linker and/or to the attachment point of the linker to the antibody that are a direct consequence of the process for conjugation a payload to an antibody.

In a further aspect, the invention concerns the use of a mode of conjugation for increasing the therapeutic index of an antibody-conjugate in the treatment of PTK7-expressing tumours, wherein the mode of conjugation is being used to connect antibody AB with payload D via a linker L. The mode of conjugation mode of conjugation comprises:

(i) contacting an antibody comprising y core N-acetylglucosamine (GlcNAc) moieties, wherein y=1, 2, 3 or 4, with a compound of the formula $S(F)_x$—P in the presence of a catalyst, wherein $S(F)_x$ is a sugar derivative comprising x reactive groups F capable of reacting with a reactive group Q, x is 1 or 2 and P is a nucleoside mono- or diphosphate, and wherein the catalyst is capable of transferring the $S(F)_x$ moiety to the core-GlcNAc moiety, to obtain a modified antibody according to Formula (26):

$$AB\text{-}[GlcNAc(Fuc)_w\text{-}S\{F\}_x]_y \quad (26)$$

wherein
 AB is an antibody capable of targeting PTK7-expressing tumours;
 Fuc is fucose;
 w is 0 or 1; and
(ii) reacting the modified antibody with a compound according to structure (2):

Q-L-D        (2)

wherein:
 Q is a reactive moiety;
 L is a linker that links Z to D;
 D is selected from the group consisting of anthracyclines, camptothecins, tubulysins, enediynes, amanitins, duocarmycins, maytansinoids, auristatins, eribulins, BCL-XL inhibitors, hemiasterlins, KSP inhibitors, TLR agonists, indolinobenzodiazepine dimers or pyrrolobenzodiazepine dimers (PBDs), and analogues or prodrugs thereof;
 to obtain the antibody-conjugate according to structure (1)
Preferably, increasing the therapeutic index of an antibody-conjugate is selected from:
 (a) increasing the therapeutic efficacy of the antibody-conjugate; and/or
 (b) increasing the tolerability of the antibody-conjugate.

Increase in therapeutic efficacy of the antibody-conjugates according to the invention may take the form of a reduction in tumour size and/or a prolonged period of regression, when compared to conventional PTK7-targeting ADC. Increase in tolerability of the antibody-conjugates according to the invention may take the form of a reduction in signs of toxicity, compared to administration of a PTK7-targeting ADC made with a conventional technology. The reduction in sings may also be referred to as a reduction in symptoms or side-effects of cancer treatment, and may involve one or more clinical signs such as reduced reduction in body weight, reduced reduction in mobility, reduced reduction in food intake and/or one or more toxicity parameters, such as improved blood chemistry, hematology, and/or histopathology.

EXAMPLES

General procedure for transient expression and purification of monoclonal antibodies: Various IgGs (cofetuzumab, 4D5, $7C_8$ or B12) were transiently expressed in CHO K1 cells by Evitria (Zurich, Switzerland) at 1L, 100 mL, 100 mL and 5 L scale respectively. Other IgGs (12C6 and 12C6a) were transiently expressed in ExpiCHO-S™ cells (Gibco) at 500 mL scale. The non-fucosylated $12C_6$ was transiently expressed in CHO cells using the ProBioGen's GlymaxX® technology by Evitria. The supernatant was purified using a HiTrap MabSelect sure column. The supernatant was loaded onto the column followed by washing with at least 10 column volumes of 25 mM Tris pH 7.5, 150 mM NaCl (TBS). Retained protein was eluted with 0.1 M AcOH pH 2.7. The eluted product was immediately neutralized with 2.5 M Tris-HCl pH 8.8 and dialyzed against 20 mM histidine, 150 mM NaCl, pH 7.5. Next the IgG was concentrated (>20 mg/mL) using a Vivaspin Turbo 15 ultrafiltration unit (Sartorius). The sequences of the IgGs are given here below:

```
cofetuzumab (I) light chain (SEQ ID No. 8):
EIVLTQSPATLSLSPGERATLSCRASESVDSYGKSFMHWYQQKPGQAPRLLIYRASNLESGIPARFS

GSGSGTDFTLTISSLEPEDFAVYYCQQSNEDPWTFGGGTKLEIKRTVAAPSVFIFPPSDEQLKSGTAS

VVCLLNNFYPREAKVQWKVDNALQSGNSQESVTEQDSKDSTYSLSSTLTLSKADYEKHKVYACEVT

HQGLSSPVTKSFNRGEC cofetuzumab (I) heavy chain (SEQ ID No. 7):
QVQLVQSGPEVKKPGASVKVSCKASGYTFTDYAVHWVRQAPGKRLEWIGVISTYNDYTYNNQDFKG

RVTMTRDTSASTAYMELSRLRSEDTAVYYCARGNSYFYALDYWGQGTSVTVSSASTKGPSVFPLAP

SSKSTSGGTAALGCLVKDYFPEPVTVSWNSGALTSGVHTFPAVLQSSGLYSLSSVVTVPSSSLGTQT

YICNVNHKPSNTKVDKKVEPKSCDKTHTCPPCPAPELLGGPSVFLFPPKPKDTLMISRTPEVTCVVVD

VSHEDPEVKFNWYVDGVEVHNAKTKPREEQYNSTYRVVSVLTVLHQDWLNGKEYKCKVSNKALPA

PIEKTISKAKGQPREPQVYTLPPSRDELTKNQVSLTCLVKGFYPSDIAVEWESNGQPENNYKTTPPVL

DSDGSFFLYSKLTVDKSRWQQGNVFSCSVMHEALHNHYTQKSLSLSPG

4D5 (II) light chain (SEQ ID No. 16):
EIVLTQSPDFQSVTPKEKVTITCRASQSIGSSLHWYQQKPDQSPKLLIKYASQSFSGVPSRFSGSGSG

TDFTLTINSLEAEDAAAYYCHQSSSLPITFGQGTRLEIKRTVAAPSVFIFPPSDEQLKSGTASVVCLLNN

FYPREAKVQWKVDNALQSGNSQESVTEQDSKDSTYSLSSTLTLSKADYEKHKVYACEVTHQGLSSP

VTKSFNRGEC

4D5 (II) heavy chain (SEQ ID No. 15):
QVQLVESGGGVVQPGRSLRLSCAASGFTFSSYAFHWVRQAPGKGLEWVAVISYDGSIKYYADSVKG

RFTISRDNSKNTLYLQMNSLRAEDTAVYYCARTYYFDYWGQGTLVTVSSASTKGPSVFPLAPSSKST

SGGTAALGCLVKDYFPEPVTVSWNSGALTSGVHTFPAVLQSSGLYSLSSVVTVPSSSLGTQTYICNV

NHKPSNTKVDKKVEPKSCDKTHTCPPCPAPELLGGPSVFLFPPKPKDTLMISRTPEVTCVVVDVSHE
```

```
DPEVKFNWYVDGVEVHNAKTKPREEQYNSTYRVVSVLTVLHQDWLNGKEYKCKVSNKALPAPIEKTI

SKAKGQPREPQVYTLPPSRDELTKNQVSLTCLVKGFYPSDIAVEWESNGQPENNYKTTPPVLDSDG

SFFLYSKLTVDKSRWQQGNVFSCSVMHEALHNHYTQKSLSLSPG

7C8 (III) light chain (SEQ ID No. 25):
EIVLTQSPATLSLSPGERATLSCRASQSVSIYLAWYQQKPGQAPRLLIYDASNRATGIPARFSGSGSG

TDFTLTISSLEPEDFAVYYCQQRSNWPPFTFGPGTKVDIKRTVAAPSVFIFPPSDEQLKSGTASVVCLL

NNFYPREAKVQWKVDNALQSGNSQESVTEQDSKDSTYSLSSTLTLSKADYEKHKVYACEVTHQGLS

SPVTKSFNRGEC

7C8 (III) heavy chain (SEQ ID No. 26):
QVQLVESGGGVVQPGRSLRLSCAASGFTFSSYGMHWVRQAPGKGLEWVAVIMDDGSNKYYVDSV

KGRFTISRDNSKNTLYLQMNSLRAEDTAVYYCARDDYYGSGSFNSYYGTDVWGQGTTVTVSSASTK

GPSVFPLAPSSKSTSGGTAALGCLVKDYFPEPVTVSWNSGALTSGVHTFPAVLQSSGLYSLSSVVTV

PSSSLGTQTYICNVNHKPSNTKVDKKVEPKSCDKTHTCPPCPAPELLGGPSVFLFPPKPKDTLMISRT

PEVTCVVVDVSHEDPEVKFNWYVDGVEVHNAKTKPREEQYNSTYRVVSVLTVLHQDWLNGKEYKC

KVSNKALPAPIEKTISKAKGQPREPQVYTLPPSRDELTKNQVSLTCLVKGFYPSDIAVEWESNGQPEN

NYKTTPPVLDSDGSFFLYSKLTVDKSRWQQGNVFSCSVMHEALHNHYTQKSLSLSPG

12C6 (IV) light chain (SEQ ID No. 20):
EIVLTQSPGTLSLSPGERATLSCRASQSVSSSYLAWYQQKPGQAPRLLIYGASSRATGIPDRFSGSG

SGTDFTLTISRLEPEDFAVYYCQQYGSSPMYTFGQGTKLEIKRTVAAPSVFIFPPSDEQLKSGTASVV

CLLNNFYPREAKVQWKVDNALQSGNSQESVTEQDSKDSTYSLSSTLTLSKADYEKHKVYACEVTHQ

GLSSPVTKSFNRGEC

12C6 (IV) heavy chain (SEQ ID No. 19):
VQLVQSGGGLVHPGGSLRLSCAGSGFTFSTYLMYWVRQAPGKTLEWVSAIGSGGDTYYADSVKGR

FTISRDNAKNSLYLQMNSLRAEDMAVYYCARGLGYWGQGTLVTVSS

ASTKGPSVFPLAPSSKSTSGGTAALGCLVKDYFPEPVTVSWNSGALTSGVHTFPAVLQSSGLYSLSS

VVTVPSSSLGTQTYICNVNHKPSNTKVDKKVEPKSCDKTHTCPPCPAPELLGGPSVFLFPPKPKDTL

MISRTPEVTCVVVDVSHEDPEVKFNWYVDGVEVHNAKTKPREEQYNSTYRVVSVLTVLHQDWLNGK

EYKCKVSNKALPAPIEKTISKAKGQPREPQVYTLPPSRDELTKNQVSLTCLVKGFYPSDIAVEWESNG

QPENNYKTTPPVLDSDGSFFLYSKLTVDKSRWQQGNVFSCSVMHEALHNHYTQKSLSLSPG

12C6a (V) light chain (SEQ ID No. 22):
DIQMTQSPSSLSASVGDRVTITCRASQGISSWLAWYQQKPEKAPKSLIYAASSLQSGVPSRFSGSGS

GTDFTLTISSLQPEDFATYYCQQYNSYPYTFGQGTKLEIK

RTVAAPSVFIFPPSDEQLKSGTASVVCLLNNFYPREAKVQWKVDNALQSGNSQESVTEQDSKDSTY

SLSSTLTLSKADYEKHKVYACEVTHQGLSSPVTKSFNRGEC

12C6a (V) heavy chain: see 12C6 heavy chain (SEQ ID No. 19)
B12 (VI) light chain (SEQ ID No. 28):
EIVLTQSPGTLSLSPGERATFSCRSSHSIRSRRVAWYQHKPGQAPRLIHGVSNRASGISDRFSGSG

SGTDFTLTITRVEPEDFALYYCQVYGASSYTFGQGTKLERKRTVAAPSVFIFPPSDEQLKSGTASVVC

LLNNFYPREAKVQWKVDNALQSGNSQESVTEQDSKDSTYSLSSTLTLSKADYEKHKVYACEVTHQG

LSSPVTKSFNRGEC

B12 (VI) heavy chain (SEQ ID No. 27):
QVQLVQSGAEVKKPGASVKVSCQASGYRFSNFVIHWVRQAPGQRFEWMGWINPYNGNKEFSAKF

QDRVTFTADTSANTAYMELRSLRSADTAVYYCARVGPYSWDDSPQDNYYMDVWGKGTTVIVSSAS

TKGPSVFPLAPSSKSTSGGTAALGCLVKDYFPEPVTVSWNSGALTSGVHTFPAVLQSSGLYSLSSVV
```

-continued

```
TVPSSSLGTQTYICNVNHKPSNTKVDKKVEPKSCDKTHTCPPCPAPELLGGPSVFLFPPKPKDTLMIS

RTPEVTCVVVDVSHEDPEVKFNWYVDGVEVHNAKTKPREEQYNSTYRVVSVLTVLHQDWLNGKEY

KCKVSNKALPAPIEKTISKAKGQPREPQVYTLPPSRDELTKNQVSLTCLVKGFYPSDIAVEWESNGQP

ENNYKTTPPVLDSDGSFFLYSKLTVDKSRWQQGNVFSCSVMHEALHNHYTQKSLSLSPGK
```

General procedure for analytical RP-UPLC (DTT treated samples): Prior to RP-UPLC analysis, IgG (10 µL, 1 mg/mL in PBS pH 7.4) was added to 12.5 mM DTT, 100 mM TrisHCl pH 8.0 (40 µL) and incubated for 15 minutes at 37° C. The reaction was quenched by adding 49% acetonitrile, 49% water, 2% formic acid (50 µL). RP-UPLC analysis was performed on a Waters Acquity UPLC-SQD. The sample (5 µL) was injected with 0.4 mL/min onto Bioresolve RP mAb 2.1*150 mm 2.7 µm (Waters) with a column temperature of 70° C. A linear gradient was applied in 9 minutes from 30 to 54% acetonitrile in 0.1% TFA and water. Absorbance of eluted peaks was measured at 215 nm followed by automated integration (MassLynx, Waters) to determine reaction conversion.

General procedure for mass spectral analysis of (modified) monoclonal antibodies: Prior to mass spectral analysis, IgG was treated with IdeS, which allows analysis of the Fc/2 fragment. For analysis of both light and heavy chain, a solution of 20 µg (modified) IgG was incubated for 5 minutes at 37° C. with 100 mM DTT in a total volume of 4 µL. If present, azide-functionalities are reduced to amines under these conditions. For analysis of the Fc/2 fragment, a solution of 20 µg (modified) IgG was incubated for 1 hour at 37° C. with IdeS/Fabricator™ (1.25 U/µL) in phosphate-buffered saline (PBS) pH 6.6 in a total volume of 10 µL. Samples were diluted to 80 µL followed by analysis electrospray ionization time-of-flight (ESI-TOF) on a JEOL AccuTOF. Deconvoluted spectra were obtained using Magtran software.

Figure 3:
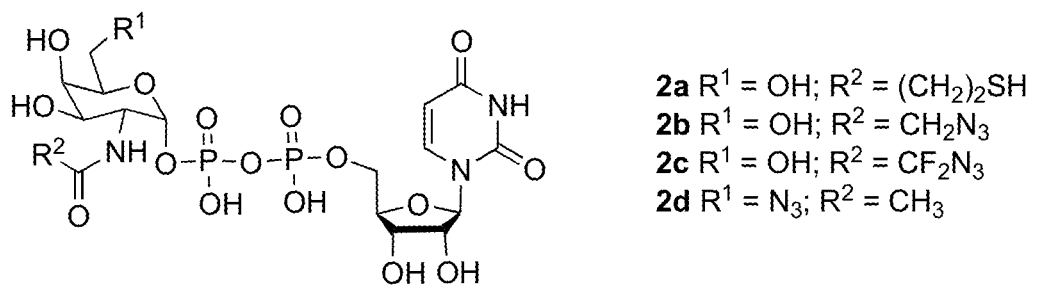
FIG. 3 shows several structures of derivatives of UDP sugars of galactosamine, which may be modified with e.g. a 3-mercaptopropionyl group (2*a*), an azidoacetyl group (2*b*), or an azidodifluoroacetyl group (2*c*) at the 2-position, or with an azido group at the 6-position of N-acetyl galactosamine (2*d*).
Figure 4:
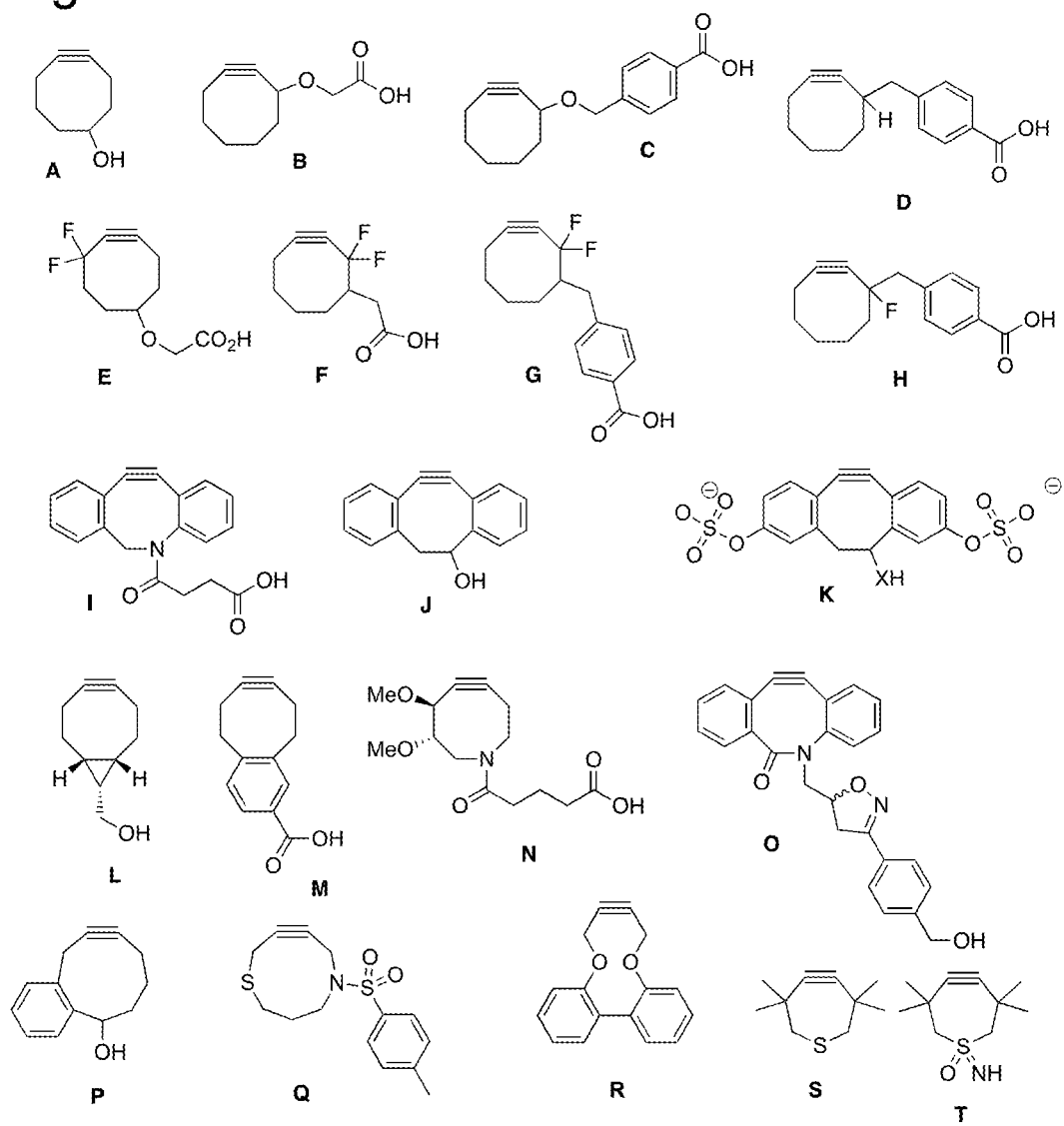
FIG. 4 shows cyclooctynes (A-T) suitable for metal-free click chemistry, which are preferred options for reactive moiety Q.
Figure 5:
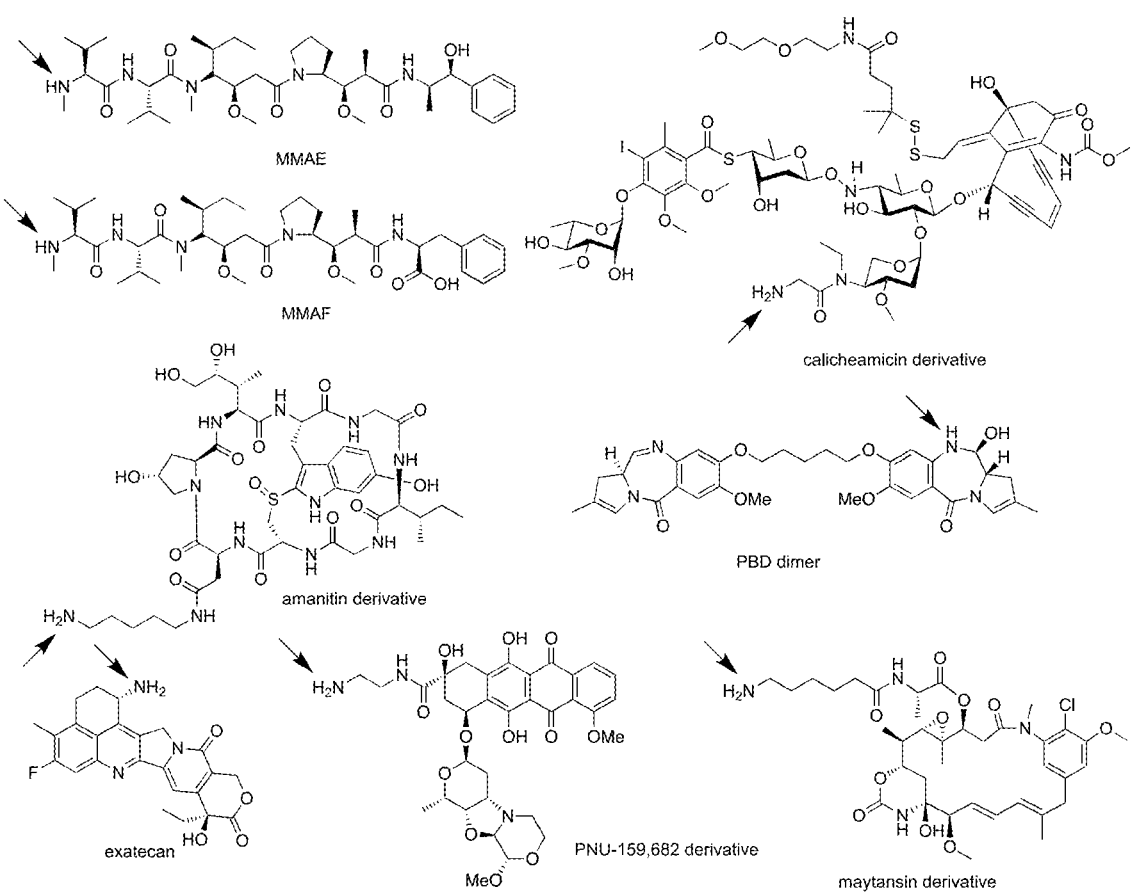
FIG. 5 shows a set of exemplary toxic payloads for conjugation to various PTK7-targeting monoclonal antibodies according to the invention. Point of attachment of a linker (to an amino group present in the payload) is indicated with an arrow. Preferred conjugates according to the present invention contain the payloads, including point of attachment, as shown in FIG. 5.

General procedure for enzymatic remodeling of IgG to mAb-(6-N$_3$-GalNAc)$_2$: IgG (15 mg/mL) was incubated with 1% w/w EndoSH (as described in PCT/EP2017/052792, see Examples 1-3, and SEQ. ID No: 1, which is incorporated by reference herein), 3% w/w His-TnGalNAcT (as described in PCT/EP2016/059194, see Examples 3 and 4, and SEQ. ID No: 49, which is incorporated by reference herein), 0.01% AP (Roche) and UDP 6-N3-GalNAc (compound 2d in FIG. 3, 25 eq compared to IgG) in 6 mM MnCl$_2$ and TBS for 16 hours at 30° C. Next, the functionalized IgG was purified using a HiTrap MabSelect sure 5 mL column. After loading of the reaction mixture the column was washed with TBS+ 0.2% triton and TBS. The IgG was eluted with 0.1 M AcOH pH 2.7 and neutralized with 2.5 M Tris-HCl pH 8.8. After three times dialysis to 20 mM histidine, 150 mM NaCl pH 7.5, the IgG was concentrated to 15-20 mg/mL using a Vivaspin Turbo 15 ultrafiltration unit (Sartorius).

Preparation of Azide-Functionalized Antibodies: Examples 1-7

Example 1: Preparation of Cofetuzumab-(6-N$_3$-GalNAc)$_2$ (I-N$_3$)

According to the general procedure for enzymatic remodeling, cofetuzumab was converted to cofetuzumab-(6-N$_3$-GalNAc)$_2$ Mass spectral analysis of a sample after IdeS treatment showed one major Fc/2 product (observed mass 24329 Da, approximately 90% of total Fc/2), corresponding to the expected product.

Example 2: Preparation of B12-(6-N$_3$-GalNAc)$_2$ (II-N$_3$)

According to the general procedure for enzymatic remodeling, B12 was converted to B12-(6-N$_3$-GalNAc)$_2$ Mass spectral analysis of a sample after IdeS treatment showed one major Fc/2 product (observed mass 24330 Da, approximately 90% of total Fc/2), corresponding to the expected product.

Example 3: Preparation of 4D5-(6-N$_3$-GalNAc)$_2$ (II-N$_3$)

According to the general procedure for enzymatic remodeling, 4D5 was converted to 4D5-(6-N$_3$-GalNAc)$_2$ Mass spectral analysis of a sample after IdeS treatment showed one major Fc/2 product (observed mass 24332 Da, approximately 90% of total Fc/2), corresponding to the expected product and one minor Fc/2 product (observed mass 24186 Da, approximately 10% of total Fc/2), corresponding to the non-fucosylated product.

Example 4: Preparation of 7C$_8$—(6-N$_3$-GalNAc)$_2$ (III-N$_3$)

According to the general procedure for enzymatic remodeling, 7C$_8$ was converted to 7C$_8$—(6-N$_3$-GalNAc)$_2$ Mass spectral analysis of a sample after IdeS treatment showed one major Fc/2 product (observed mass 24332 Da, approximately 90% of total Fc/2), corresponding to the expected product and one minor Fc/2 product (observed mass 24186 Da, approximately 10% of total Fc/2), corresponding to the non-fucosylated product.

Example 5: Preparation of 12C6-(6-N$_3$-GalNAc)$_2$ (IV-N$_3$)

According to the general procedure for enzymatic remodeling, 12C$_6$ was converted to 12C6-(6-N$_3$-GalNAc)$_2$ Mass spectral analysis of a sample after IdeS treatment showed one major Fc/2 product (observed mass 24331 Da, approximately 90% of total Fc/2), corresponding to the expected product and one minor Fc/2 product (observed mass 24186 Da, approximately 10% of total Fc/2), corresponding to the non-fucosylated product.

Example 6: Preparation of 12C6a-(6-N$_3$-GalNAc)$_2$ (V-N$_3$)

According to the general procedure for enzymatic remodeling, 12C6a was converted to 12C6a-(6-N$_3$-GalNAc)$_2$ Mass spectral analysis of a sample after IdeS treatment showed one major Fc/2 product (observed mass 24332 Da, approximately 90% of total Fc/2), corresponding to the expected product and one minor Fc/2 product (observed mass 24186 Da, approximately 10% of total Fc/2), corresponding to the non-fucosylated product.

Example 7: Preparation of aFuc-12C6-(6-N₃-GalNAc)₂ (aFuc-IV-N₃)

According to the general procedure for enzymatic remodeling, aFuc-12C$_6$ was converted to aFuc-12C6-(6-N$_3$-GalNAc)$_2$ Mass spectral analysis of a sample after IdeS treatment showed one major Fc/2 product (observed mass 24187 Da, approximately 95% of total Fc/2), corresponding to the expected product.

Examples 8-12: Synthesis of Linker Conjugates 3, 4, 5b and 9 afford 11 (155 mg, 159 μmol, 68%). LCMS (ESI+) calculated for $C_{55}H_{54}FN_6O_{10}$+(M+H)$^+$ 977.39, found 977.72. In addition to 11, free base of exatecan (82.4 mg, 189 μmol, 20%) was recovered. LCMS (ESI+) calculated for $C_{24}H_{23}FN_3O_4^+$(M+H)$^+$436.46, found 436.54.

Example 9. Preparation of Compound 3

The synthesis of BCN—HS-(va-PABC-Ex)$_2$ (3) is also described in PCT/EP2021/075401 (example 4), incorporated herein. To a solution of compound 11 (155 mg, 159 μmol) in DMF (1.6 mL) were added Et$_3$N (73 mg, 101 μL, 0.72 mmol) and a solution of compound 12 (65 mg, 72

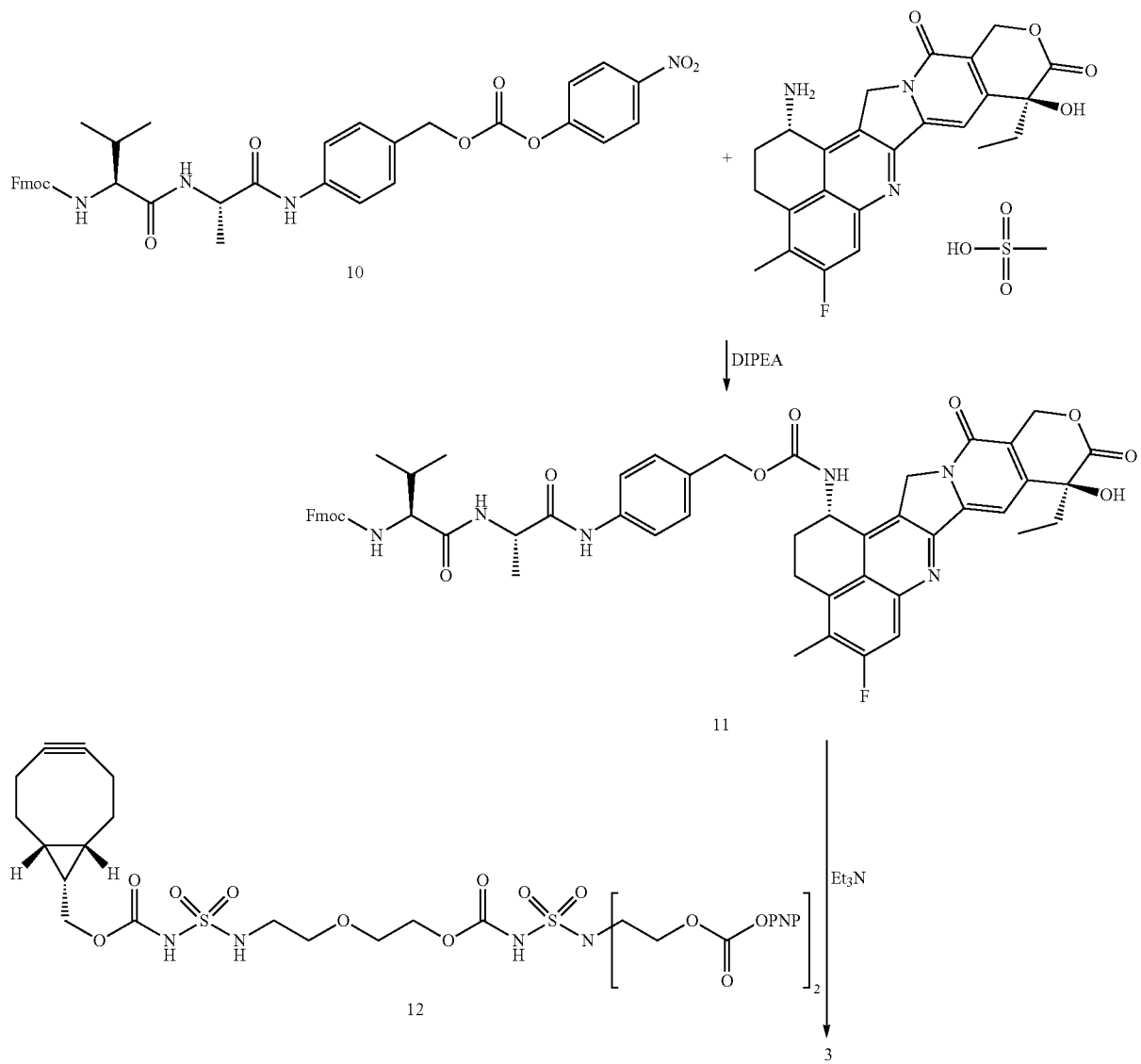

Example 8: Preparation of Compound 11

Compound 10 (163 mg, 240 μmol) was added to a mixture of exatecan mesylate (125 mg, 235 μmol) and DIPEA (61 mg, 82 μL, 0.47 mmol) in dry DMF (0.9 mL). After 20 h, the reaction mixture was diluted to 9 mL DCM and purified by gradient column chromatography (0→40% MeOH/DCM) to μmol) in DMF (1.4 mL). The reaction mixture was stirred for 18 h, diluted with DCM (20 mL) and purified by gradient column chromatography (0→40% MeOH/DCM) to afford 3 as a pale-yellow solid (94 mg, 44 μmol, 28%). LCMS (ESI+) calculated for $C_{102}H_{118}F2N_{16}O_{29}S_2$ $^{2+}$ (M/2+H)$^+$ 1066.88, found 1067.12.

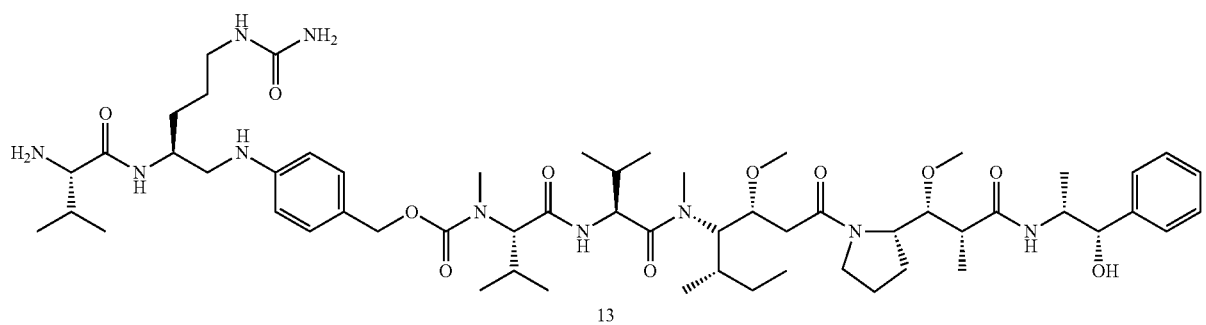

13

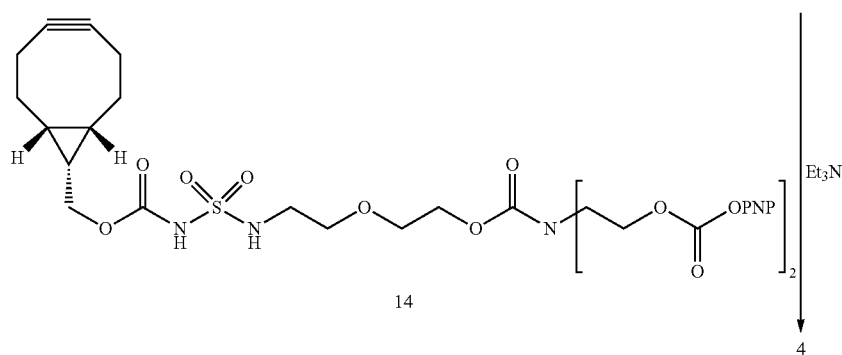

14

Example 10: Preparation of Linker-Conjugate 4

The synthesis of BCN—HS-(vc-PABC-MMAE)$_2$ (4) is also described in PCT/EP2017/052791 (example 25), incorporated herein. To a solution of 14 (27 mg, 33 µmol) in DMF (400 µL) were added triethylamine (22 µL; 16 mg; 158 µmol) and a solution of vc-PABC-MMAE·TFA 13 (96 mg; 78 µmol) in DMF (1.0 mL). The mixture was left standing for 19 h and 2,2'-(ethylenedioxy)bis(ethylamine) (37 µL, 38 mg, 253 µmol) was added. After 2 h, the reaction mixture was diluted with DMF (100 µL) and purified by RP HPLC (C18, 30%→90% MeCN (1% AcOH) in water (1% AcOH). The desired product 4 was obtained as a colourless film (41 mg, 14.7 µmol, 45%). LCMS (ESI+) calculated for $C_{138}H_{219}N_{23}O_{35}S^{2+}$ (M+2H$^+$) 1395.79 found 1396.31.

Example 11: Synthesis of Linker Conjugate 5b

The synthesis of BCN—HS-vc-PABC-CM (5b) was prepared according to the procedures described in WO2019110725, incorporated herein. To a solution of 15 (9.0 mg, 4.88 µmol, compound 138 in WO2019110725) in DMF (445 µL) were added a solution of 16 (12.8 mg, 24.4 µmol, compound 3 in WO2019110725) in DMF (45.8 µL) and a 50% v/v Et$_3$N solution in DMF (8.98 µL, 32.2 µmol). The mixture was left standing for 4 h and then diluted with DCM to a total volume of 4.5 mL. This mixture was purified by silica gel chromatography (0→20% MeOH in DCM). The desired product 5b was obtained as a colorless oil (5.0 mg, 2.24 µmole, 46%). LCMS (ESI+) calculated for $C_{96}H_{136}IN_9O_{35}S_4^{2+}$ (M+2H$^+$) 1115.35, found 1115.40.

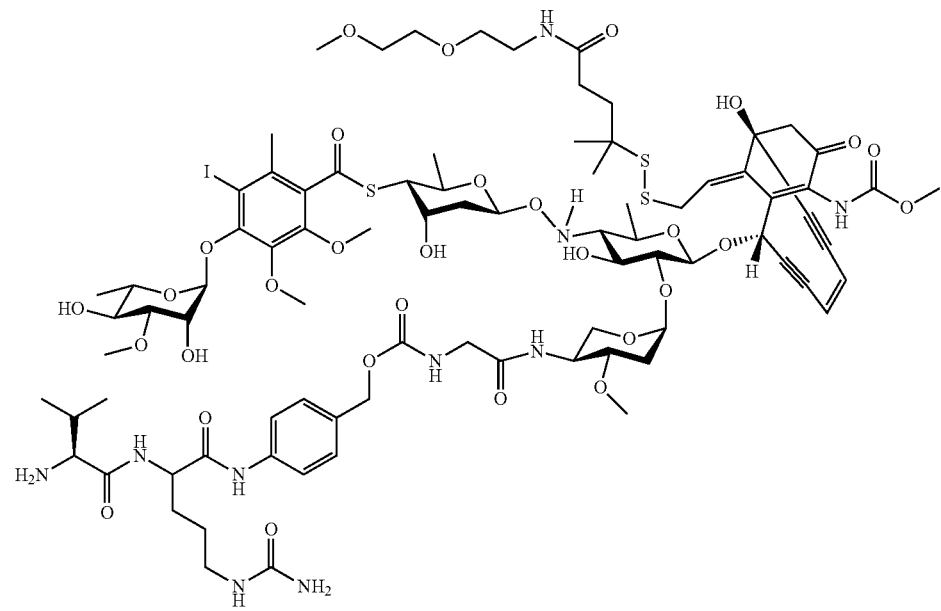
15
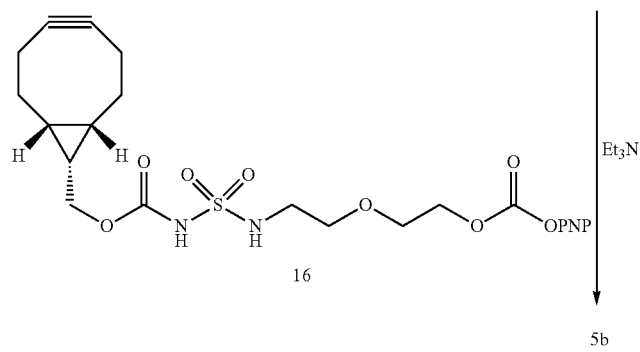
16

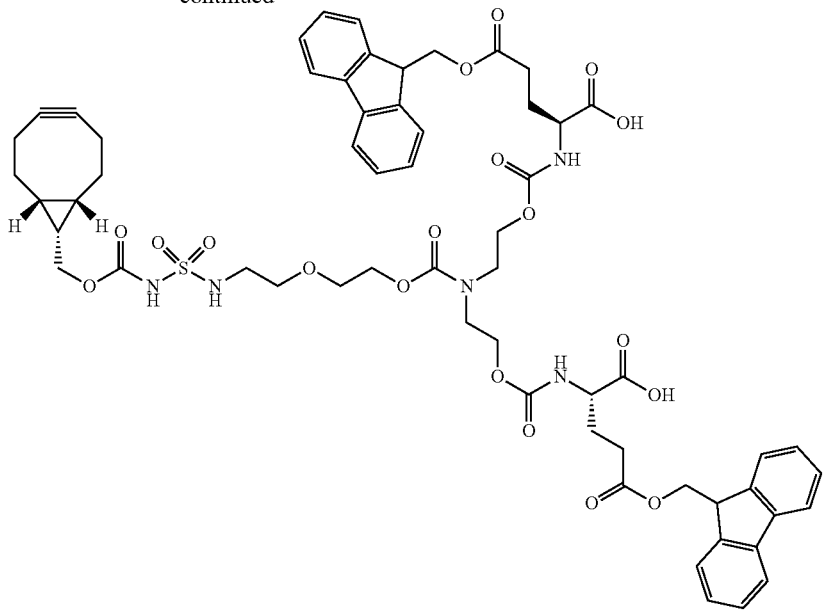

8

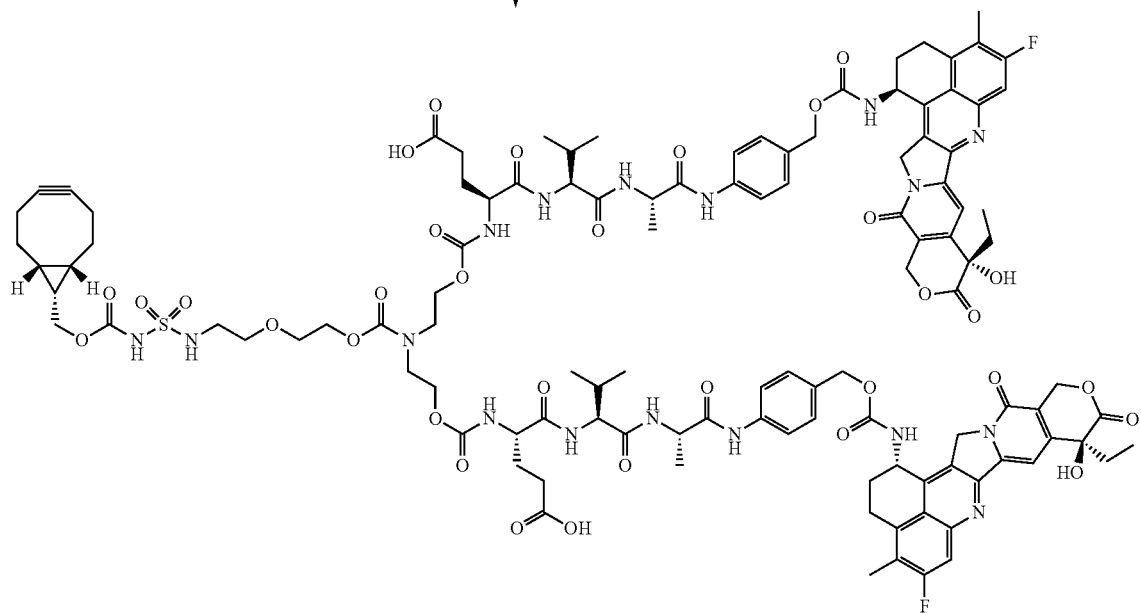

9

Example 12. Preparation of Compound 9

A solution of BCN—HS-PEG2-b-(Glu(OFm)—OH)$_2$ (8, 12.1 mg, 10 µmol, 1.0 eq) dissolved in anhydrous DMF (180 µL) was added to a solution of NH$_2$-Val-Ala-PABC-exatecan (5b, Fmoc-deprotected 5, 19 mg, 25 µmol, 2.5 eq) in anhydrous DCM (180 µL), DIPEA (11 µL, 63 µmol, 6.2 eq) and HATU (8.9 mg, 23 µmol, 2.3 eq). After stirring for 2 h at room temperature, the reaction mixture was further diluted with DCM (800 µL) and purified by flash column chromatography over silica gel (0%→20% MeOH in DCM) to give the product as a clear oil (difficult to determine yield due to presence of DMF). LCMS (ESI+) calculated for C$_{140}$H$_{150}$F$_2$N$_{17}$O$_{33}$S$^+$(M/2+H$^+$) 1334.01, found 1334.79.

This compound was dissolved in DMF (300 µL) and triethylamine (21 µL, 150 µmol, 15 eq) was added. After 17 h at room temperature, the reaction mixture was diluted with DCM (700 µL) and purified by flash column chromatography over silica gel (0%→45% MeOH in DCM) to give compound 9 in 44% yield as a yellow solid (10.2 mg, 4.4 µL). LCMS (ESI+) calculated for C$_{112}$H$_{130}$F$_2$N$_{17}$O$_{33}$S$^+$(M/2+H$^+$) 1156.2, found 1156.74.

Examples 13-24: Conjugation of linker-payloads to (modified) monoclonal antibodies

Example 13: Production of Cofetuzumab-Aur0101

Cofetuzumab (14.4 mg, 4.34 mg/ml in 20 mM histidine, 6% sucrose) was charged with 5% pH adjust buffer (0.5 M Tris, 25 mM EDTA, pH 8.5) and 2.3 molar equivalents TCEP (1 mM in water) and incubated at room temperature for 2 hours. The reduced antibody was charged with DMA to give 10% v/v and 6 molar equivalents Auristatin0101 (2 mM in DMA) and incubated at room temperature for 1 hour. The reaction was quenched using 6 molar equivalents of NAC (100 mM in water). The conjugate was purified by preparative discontinuous diafiltration in Vivaspins into 20 mM histidine/6% sucrose. 0.04% Tween-20 was added before filter sterilization. The average DAR was measured and was 4.3.

Example 14: Conjugation of Cofetuzumab(6-N$_3$-GalNAc)$_2$ with BCN—HS-PEG2-HS—(Va-PAB-Ex)$_2$ 3 to Obtain Conjugate Cofetuzumab-3

To a solution of cofetuzumab(6-N$_3$-GalNAc)$_2$ (1664 μL, 32.0 mg, 19.37 mg/ml in TBS pH 7.5) was added sodium deoxycholate (322 μL, 110 mM) and BCN—HS-PEG2-HS-(va-PAB-Ex)$_2$ 3 (86 μL, 10 mM solution in DMF) and propylene glycol (881 μL). The reaction was incubated overnight at rt. Next the conjugate was purified on a HiLoad 16/600 Superdex200 PG column (Cytiva) on an AKTA Pure (Cytiva). To remove the excess of free payload, 25 mg of active charcoal (Carbon RHC, Filtrox AG) was added and rotated overnight. The charcoal was removed by centrifugation and subsequently filtered over a PES syringe filter (pore 0.20 μm, Corning). Subsequently the solution was buffer exchanged using a HiTrap 26-10 desalting column (Cytiva), rinsed with 0.1M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26461 Da, approximately 90% of total Fc/2), corresponding to the conjugate cofetuzumab-3. RP-UPLC analysis of the sample under reducing conditions showed an average DAR of 3.86.

Example 15: Conjugation of Cofetuzumab(6-N$_3$-GalNAc)$_2$ with BCN—HS—(Vc-PABC-MMAE)$_2$ 4 to Obtain Conjugate Cofetuzumab-4

To a solution of cofetuzumab(6-N$_3$-GalNAc)$_2$ (463 μL, 9.0 mg, 19.37 mg/ml in TBS pH 7.5) was added sodium deoxycholate (60 μL, 110 mM) and BCN—HS-(vc-PABC-MMAE)$_2$ 4 (1.8 μL, 100 mM solution in DMF) and DMF (58 μL). The reaction was incubated overnight at rt. Next the conjugate was purified on a HiLoad 10/300 Superdex200 PG column (Cytiva) on an AKTA Pure (Cytiva). Subsequently the solution was buffer exchanged using a HiTrap 26-10 desalting column (Cytiva), rinsed with 0.1M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 27119 Da, approximately 90% of total Fc/2), corresponding to the conjugate cofetuzumab-4. RP-UPLC analysis of the sample under reducing conditions showed an average DAR of 3.90.

Example 16: Conjugation of Cofetuzumab(6-N$_3$-GalNAc)$_2$ with BCN—HS-Vc-PABC-Calicheamicin 5b to Obtain Conjugate Cofetuzumab-5b To a solution of cofetuzumab(6-N$_3$-GalNAc)$_2$ (730 μL, 14.0 mg, 19.37 mg/ml in TBS pH 7.5) was added sodium deoxycholate (94 μL, 110 mM) and BCN—HS-vc-PABC-calicheamicin 5b (7 μL, 40 mM solution in DMF) and DMF (87 μL). The reaction was incubated overnight at rt. Next the conjugate was purified on a HiLoad 10/300 Superdex200 PG column (Cytiva) on an AKTA Pure (Cytiva). Subsequently the solution was buffer exchanged using a HiTrap 26-10 desalting column (Cytiva), rinsed with 0.1M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26714 Da, approximately 90% of total Fc/2), corresponding to the conjugate cofetuzumab-5b. RP-UPLC analysis of the sample under reducing conditions showed an average DAR of 1.93.

Example 17: Conjugation of B12(6-N$_3$-GalNAc)$_2$ with BCN—HS-PEG2-HS—(Va-PAB-Ex)$_2$ 3 to Obtain Conjugate B12-3

To a solution of B12(6-N$_3$-GalNAc)$_2$ (6.33 mL, 150.0 mg, 23.71 mg/ml in TBS pH 7.5) was added BCN—HS-PEG2-HS-(va-PAB-Ex)$_2$ 3 (495 μL, 10 mM solution in DMF) and propylene glycol (7.0 mL). The reaction was incubated overnight at rt. Next the conjugate was purified on a HiLoad 26/600 Superdex200 PG column (Cytiva) on an AKTA Pure (Cytiva). To remove the excess of free payload, 150 mg of active charcoal (Carbon RHC, Filtrox AG) was added and rotated overnight. The charcoal was removed by centrifugation and subsequently filtered over a PES syringe filter (pore 0.20 μm, Corning). Subsequently the solution was dialysed to 20 mM histidine, 6% sucrose buffer pH 6.0 for two hours at rt and overnight at 4° C. The solution was concentrated using a Vivaspin Turbo 4 10 kDa MWCO ultrafiltration unit (Sartorius) and 0.04% Tween-20 was added before filter sterilization. Mass spectral analysis of the sample after IdeS treatment showed one major Fc/2 product (observed mass 26462 Da, approximately 90% of total Fc/2), corresponding to the conjugate B12-3. RP-UPLC analysis of the sample under reducing conditions showed an average DAR of 3.75.

Example 18: Conjugation of 4D5(6-N$_3$-GalNAc)$_2$ with BCN—HS-PEG2-HS-(va-PAB-Ex)$_2$ 3 to obtain conjugate 4D5-3

To a solution of 4D5(6-N$_3$-GalNAc)$_2$ (424 μL, 8.8 mg, 20.74 mg/ml in TBS pH 7.5) was added sodium deoxycholate (88 μL, 110 mM) and BCN—HS-PEG2-HS-(va-PAB-Ex)$_2$ 3 (23.4 μL, 10 mM solution in DMF) and propylene glycol (240 μL). The reaction was incubated overnight at rt. Next the conjugate was purified using a HiTrap 26-10 desalting column (Cytiva), rinsed with 0.1M NaOH and equilibrated with PBS pH 7.4 on an AKTA Pure (Cytiva). To remove the excess of free payload, 12 mg of active charcoal (Carbon RHC, Filtrox AG) was added and rotated overnight. The charcoal was removed by centrifugation and subsequently filtered over a PES syringe filter (pore 0.20 μm, Corning). Subsequently the solution was dialyzed three times to 20 mM histidine, 6% sucrose buffer pH 6.0, and 0.04% Tween-20 was added before filter sterilization. Mass spectral analysis of the sample after IdeS treatment showed one major Fc/2 product (observed mass 26465 Da, approximately 90% of total Fc/2), corresponding to the conjugate 4D5-3. And one minor Fc/2 product (observed mass 26318 Da, approximately 10% of total Fc/2), corresponding to the non-fucosylated product. RP-UPLC analysis of the sample under reducing conditions showed an average DAR of 3.91.

Example 19: Conjugation of 7C$_8$(6-N$_3$-GalNAc)$_2$ with BCN—HS-PEG2-HS—(Va-PAB-Ex)$_2$ 3 to Obtain Conjugate 7C$_8$-3

To a solution of 7C$_8$(6-N$_3$-GalNAc)$_2$ (313 µL, 6.9 mg, 22.14 mg/ml in TBS pH 7.5) was added BCN—HS-PEG2-HS-(va-PAB-Ex)$_2$ 3 (23.1 µL, 10 mM solution in DMF) and propylene glycol (254 µL). The reaction was incubated overnight at rt. Next the conjugate was purified on a Superdex200 10/300 increase column (Cytiva) on an AKTA Pure (Cytiva). To remove the excess of free payload, 11 mg of active charcoal (Carbon RHC, Filtrox AG) was added and rotated overnight. The charcoal was removed by centrifugation and subsequently filtered over a PES syringe filter (pore 0.20 µm, Corning). Subsequently the solution was buffer exchanged using a HiTrap 26-10 desalting column (Cytiva), rinsed with 0.1M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26466 Da, approximately 90% of total Fc/2), corresponding to the conjugate 7C$_8$-3. RP-UPLC analysis of the sample under reducing conditions showed an average DAR of 3.95.

Example 20: Conjugation of 12C6(6-N$_3$-GalNAc)$_2$ with BCN—HS-PEG2-HS—(Va-PAB-Ex)$_2$ 3 to Obtain Conjugate 12C6-3

To a solution of 12C6(6-N$_3$-GalNAc)$_2$ (481 µL, 10.1 mg, 21.01 mg/ml in TBS pH 7.5) was added BCN—HS-PEG2-HS-(va-PAB-Ex)$_2$ 3 (33.7 µL, 10 mM solution in DMF) and propylene glycol (370 µL). The reaction was incubated overnight at rt. Next the conjugate was purified using a HiTrap 26-10 desalting column (Cytiva), rinsed with 0.1M NaOH and equilibrated with PBS pH 7.4 on an AKTA Pure (Cytiva). To remove the excess of free payload, 12 mg of active charcoal (Carbon RHC, Filtrox AG) was added and rotated overnight. The charcoal was removed by centrifugation and subsequently filtered over a PES syringe filter (pore 0.20 µm, Corning). Subsequently the solution was buffer exchanged using a HiTrap 26-10 desalting column (Cytiva), rinsed with 0.1M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26466 Da, approximately 95% of total Fc/2), corresponding to the conjugate 12C6-3. And one minor Fc/2 product (observed mass 26318 Da, approximately 5% of total Fc/2), corresponding to the non-fucosylated product. RP-UPLC analysis of the sample under reducing conditions showed an average DAR of 3.85.

Example 21: Conjugation of 12C6a(6-N$_3$-GalNAc)$_2$ with BCN—HS-PEG2-HS—(Va-PAB-Ex)$_2$ 3 to Obtain Conjugate 12C6a-3

To a solution of 12C6a(6-N$_3$-GalNAc)$_2$ (484 µL, 10.9 mg, 22.53 mg/ml in TBS pH 7.5) was added BCN—HS-PEG2-HS-(va-PAB-Ex)$_{23}$ (36.3 µL, 10 mM solution in DMF) and propylene glycol (400 µL). The reaction was incubated overnight at rt. Next the conjugate was purified on a Superdex200 10/300 increase column (Cytiva) on an AKTA Pure (Cytiva). To remove the excess of free payload, 12 mg of active charcoal (Carbon RHC, Filtrox AG) was added and rotated overnight. The charcoal was removed by centrifugation and subsequently filtered over a PES syringe filter (pore 0.20 µm, Corning). Subsequently the solution was dialyzed three times to 20 mM histidine, 6% sucrose buffer pH 6.0, and 0.04% Tween-20 was added before filter sterilization. Mass spectral analysis of the sample after IdeS treatment showed one major Fc/2 product (observed mass 26466 Da, approximately 95% of total Fc/2), corresponding to the conjugate 12C6a-3. RP-UPLC analysis of the sample under reducing conditions showed an average DAR of 3.90.

Example 22: Conjugation of 12C6(6-N$_3$-GalNAc)$_2$ with BCN—HS-PEG2-(Eva-PAB-Ex)$_2$ 9 to Obtain Conjugate 12C6-9

To a solution of 12C6(6-N$_3$-GalNAc)$_2$ (340 µL, 10 mg, 29.45 mg/ml in TBS pH 7.5) was added sodium deoxycholate (100 µL, 110 mM) and BCN—HS-PEG2-(eva-PAB-Ex)$_2$ 9 (20 µL, 10 mM solution in DMF) and propylene glycol (280 µL). The reaction was incubated overnight at rt. Next the conjugate was purified using a HiTrap 26-10 desalting column (Cytiva), rinsed with 0.2M NaOH and equilibrated with PBS pH 7.4 on an AKTA Pure (Cytiva). To remove the excess of free payload, 12 mg of active charcoal (Carbon RHC, Filtrox AG) was added and rotated overnight. The charcoal was removed by centrifugation and subsequently filtered over a PES syringe filter (pore 0.20 µm, Corning). Subsequently the solution was buffer exchanged using a HiTrap 26-10 desalting column (Cytiva), rinsed with 0.2M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26466 Da, approximately 95% of total Fc/2), corresponding to the conjugate 12C6-9. And one minor Fc/2 product (observed mass 26643 Da, approximately 5% of total Fc/2), corresponding to the non-fucosylated product. RP-UPLC analysis of the sample under reducing conditions showed an average DAR of 3.84.

Example 23: Conjugation of aFuc-12C6(6-N$_3$-GalNAc)$_2$ with BCN—HS-PEG2-HS-(va-PAB-Ex)$_2$ 3 to obtain conjugate aFuc-12C6-3

To a solution of aFuc-12C6(6-N$_3$-GalNAc)$_2$ (549 µL, 13 mg, 23.69 mg/ml in TBS pH 7.5) was added sodium deoxycholate (130 µL, 110 mM) and BCN—HS-PEG2-HS-(va-PAB-Ex)$_2$ 3 (34.7 µL, 10 mM solution in DMF) and propylene glycol (355 µL). The reaction was incubated overnight at rt. Next the conjugate was purified using a HiTrap 26-10 desalting column (Cytiva), rinsed with 0.2M NaOH and equilibrated with PBS pH 7.4 on an AKTA Pure (Cytiva). Subsequently the solution was buffer exchanged using a HiTrap 26-10 desalting column (Cytiva), rinsed with 0.2M NaOH and equilibrated with 20 mM histidine, 6% sucrose buffer pH 6.0, and 0.04% Tween-20 was added before filter sterilization. Mass spectral analysis of the sample after IdeS treatment showed one major Fc/2 product (observed mass 26318 Da, approximately 95% of total Fc/2), corresponding to the conjugate aFuc-12C6-3. RP- UPLC analysis of the sample under reducing conditions showed an average DAR of 3.74.

Example 24: Conjugation of aFuc-12C6(6-N$_3$-Gal-NAc)$_2$ with BCN—HS-PEG2-(Eva-PAB-Ex)$_2$ 9 to Obtain Conjugate aFuc-12C6-9

To a solution of aFuc-12C6(6-N$_3$-GalNAc)$_2$ (59 μL, 1.4 mg, 23.69 mg/ml in TBS pH 7.5) was added sodium deoxycholate (14 μL, 110 mM) and BCN—HS-PEG2-(eva-PAB-Ex)$_2$ 9 (2.8 μL, 10 mM solution in DMF) and propylene glycol (39 μL). The reaction was incubated overnight at rt. Next the conjugate was purified using a HiTrap 26-10 desalting column (Cytiva), rinsed with 0.2M NaOH and equilibrated with PBS pH 7.4 on an AKTA Pure (Cytiva). RP-UPLC analysis of the conjugate aFuc-12C6-9 sample under reducing conditions showed an average DAR of 3.81.

Examples 25-28: In Vitro Assays

Example 25. hPTK7, cPTK7 and rPTK7 Binding Assay to mAbs and ADCs Using ELISA

Figure 11:
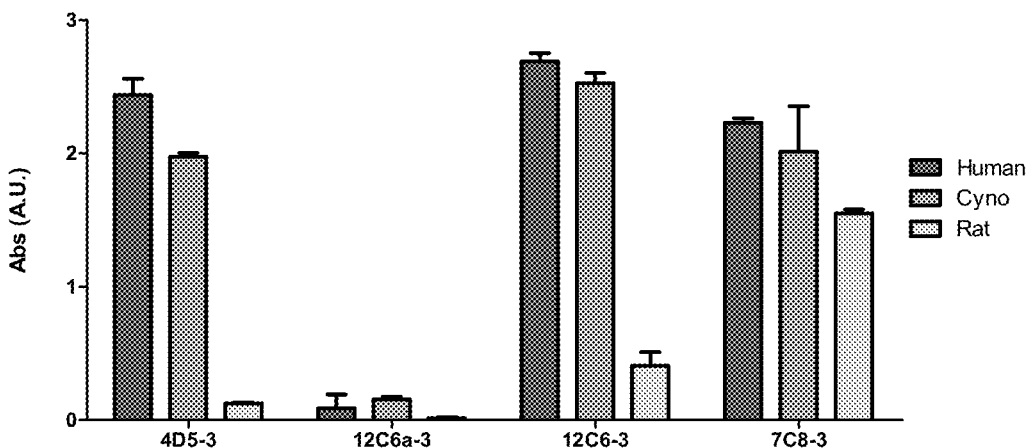
FIG. 11 shows the binding of 4D5-3, 12C6a-3, 12C6-3 and 7C8-3 to hPTK7, cPTK7 and rPTK7. 12C6-3 shows relatively the highest binding affinity to both human and cyno PTK7. 12C6a-3 does not show any binding at all. 4D5-3 and 7C8-3 show similar binding to hPTK7 and cPTK7, however, 7C8 clearly has higher binding affinity to rPTK7.

Nickel NTA plates (Pierce™ Nickel coated plated, ThermoScientific™) were washed three times prior to use. Human PTK7 (CCK4 protein, ECD, His Tag, Sino Biological), cynomolgus PTK7 (CCK4 protein, ECD, His Tag, Sino Biological) and Rat PTK7 (His Tag, Acro Biosystems) were dissolved at a concentration of 0.05 μg/mL in 0.1% BSA in PBS (PBA). 100 μL was added to each well and incubated while shaking for 1 hour at room temperature. After removal, the plate was washed 3× with 0.05% Tween-20 in PBS (washing buffer). ADCs were diluted in 0.1% PBA to a final concentration of 8 μg/mL and 100 μL was added to each well (in triplo). ADCs were incubated for 1 h at room temperature. Prior to the addition of 100 μL 1:1000 dilution of secondary antibody (Goat anti-human IgG, HRP conjugate, Invitrogen) the plate was washed 3× with washing buffer. The plate was incubated again for 1 h at room temperature and subsequently washed 3× with washing buffer and 3× with PBS. Finally, 100 μL TMB ELISA substrate (1 Step™ Turbo™ B ELISA substrate, ThermoScientific™) was added and incubated for 1 minute. The absorbance of the colorimetric signal was measured with Infinite® M1000 (Tecan) at 652 nm. Data was plotted corrected for the background (see FIG. and FIG. 11).

Example 26. Human and Mouse Serum Stability

Stability of ADCs in mice and human plasma was tested. Prior to the assay, the plasma was depleted from all IgG using CaptivA® Protein A agarose (1 mL agarose/mL serum). ADCs were added to the depleted human/mouse serum to a final concentration of 0.1 mg/mL followed by incubation at 37° C. At each time point, 0.5 mL was snap frozen and stored at −80° C. until further analysis. To isolate the ADCs after incubation, 20 μl CaptivA® Protein A agarose resin was added to the samples and incubated for 1 hour at room temperature. The resin was washed three times with PBS and subsequently 0.1 M Glycine-HCl pH 2.7 (0.4 mL) was added to elute the ADCs. After elution, the samples were immediately neutralized with 1.0 M Tris pH 8.0 (0.1 mL). The samples were spin-filtered against PBS for three times using Amicon Ultra spin-filter 0.5 mL MWCO 10 kDa (Merck Millipore) and the volume was reduced to 40 μL, yielding a final ADC concentration of approximately 1 mg/mL. Samples were analyzed on RP-UPLC (DTT reduced) to determine the DAR, tables below.

TABLE 1

Human plasma:

| | DAR t = 0 | DAR t = 3 | DAR t = 7 | DAR t = 14 |
|---|---|---|---|---|
| cofetuzumab-Aur0101 | 4.21* | 3.61 | —† | 2.67 (63%) |
| cofetuzumab-3 | 3.91 | 3.88 | 3.80 | 3.80 (97%) |
| cofetuzumab-4 | 3.93 | 3.91 | 3.90 | 3.88 (99%) |
| 12C6-3 | 3.79* | 3.76 | 3.69 | 3.62 (96%) |
| 12C6-9 | 3.86 | 3.81 | 3.73 | 3.67 (95%) |
| aFuc-12C6-3 | 3.73 | 3.73 | 3.65 | 3.61 (97%) |
| aFuc-12C6-9 | 3.76 | 3.74 | 3.68 | 3.62 (96%) |

TABLE 2

Mice plasma:

| | DAR t = 0 | DAR t = 1 | DAR t = 3 | DAR t = 7 |
|---|---|---|---|---|
| cofetuzumab-Aur0101 | 4.21* | 3.64 | 3.26 | 2.46 (58%) |
| cofetuzumab-3 | 3.90 | 3.89 | 3.88 | 3.86 (99%) |
| cofetuzumab-4 | 3.90 | 3.78 | 3.81 | 3.57 (92%) |
| 12C6-3 | 3.79 | 3.73 | 3.74 | 3.70 (98%) |
| 12C6-9 | 3.85 | 3.85 | 3.85 | 3.82 (99%) |
| aFuc-12C6-3 | 3.73 | 3.74 | 3.68 | 3.65 (98%) |
| aFuc-12C6-9 | 3.77 | —† | 3.75 | 3.74 (99%) |

—† signal too low

*Direct measurement (not through isolation from plasma with protA agarose resin).

Between parentheses is % of t = 0

Example 27: In Vitro Cytotoxicity

Figure 9:
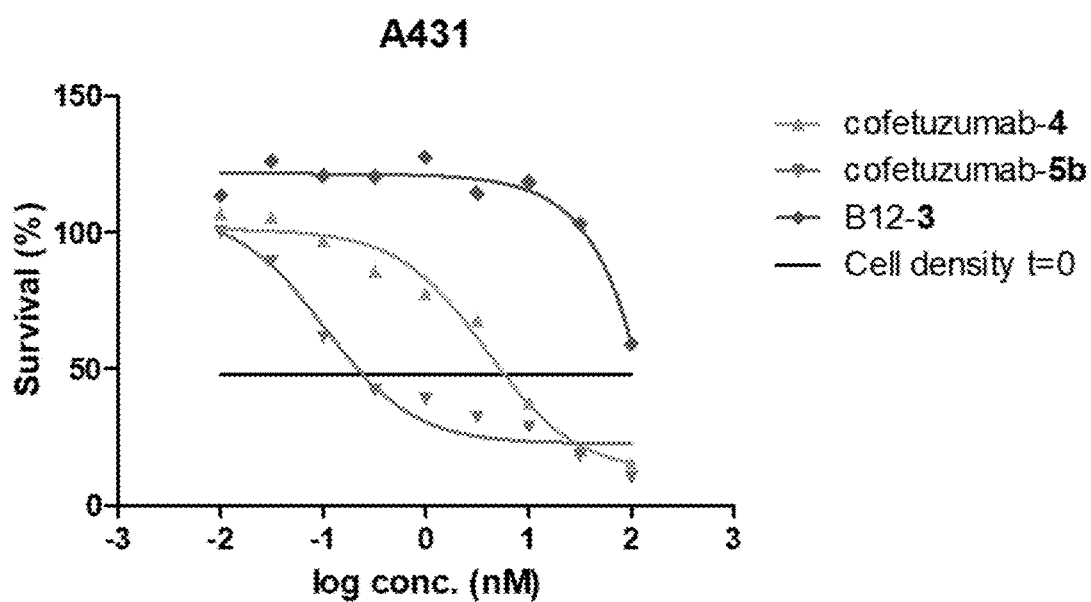
FIG. 9 shows the in vitro potency data of A431 cells treated with increasing concentrations of the ADCs cofetuzumab-4, cofetuzumab-5b, and negative control B12-3. Both cofetuzumab ADCs show cell killing with $IC_{50}$ values of 3.9 nM and 0.1 nM respectively.

A431 (PTK7+, ATCC CRL-1555) cells were plated in 96-well plates (10000 cells in 150 μL/well) in DMEM (ATCC) supplemented with 10% fetal bovine serum (FBS) (Invitrogen) and incubated overnight in a humidified atmosphere at 37° C. and 5% CO$_2$. ADCs were added in triplo in a square root of 10 dilution series to obtain a final concentration ranging from 100 nM-0.01 nM. The cells were incubated for 5 days in a humidified atmosphere at 37° C. and 5% CO$_2$. The culture medium was replaced by 0.01 mg/mL resazurin (Sigma Aldrich) in DMEM supplemented with 10% FBS (200 μL/well). After approximately 4 hours in a humidified atmosphere at 37° C. and 5% CO$_2$ the fluorescence was detected with a fluorescence plate reader (Infinite® M1000 Tecan) at 560 nm excitation and 590 nm emission. The relative fluorescent units (RFU) were normalized to cell viability percentage by setting wells without cells at 0% viability and wells with untreated cells at 100% viability (see FIG. 9). IC$_{50}$ values for ADCs on A431 cells were calculated by non-linear regression using Graphpad prism software and are shown in the table below:

TABLE 3

IC$_{50}$ values for several ADCs and mAbs for A431 cells

| | IC$_{50}$ (nM) |
|---|---|
| cofetuzumab-4 | 3.9 |
| cofetuzumab-5b | 0.10 |
| B12-3 | >100 |

Example 28. Binding Affinity of 12C6-3 and 12C$_6$ Naked mAb with FcγRs Using Biacore Binding of test antibodies to high and low affinity human Fc gamma receptors was assessed by single cycle analysis using a Biacore T200 (serial no. 1909913) instrument running Biacore T200 Evaluation Software (Cytiva, Uppsala, Sweden) running at a flow rate of 30 μl/min. The human Fc receptors, FcγRI, FcγRIIA (both 167R and 167H polymorphisms), FcγRIIB, FcγRIIIA (both 176F and 176V polymorphisms) and FcγRIIIB were obtained from Sino Biological (Beijing, China). FcγR were captured on a CM5 sensor chip pre-coupled using a His capture kit (Cytiva, Uppsala, Sweden) using standard amine chemistry.

At the start of each cycle His-tagged Fc gamma receptors (ligand) diluted in HBS-P+ (Cytiva, Uppsala, Sweden) were loaded to a specific RU level. A five point, three-fold dilution range of test antibody (analyte) without regeneration between each concentration was used for each receptor tested. Test antibodies were passed over the chip in increasing concentrations at 30 μl/min followed by a single dissociation step. Following dissociation, the chip was regenerated with injection of Glycine pH 1.5. The signal from the reference channel Fc1 (blank) was subtracted from that of the Fc loaded with receptor to correct for differences in non-specific binding to the reference surface. Sensorgrams were analysed for 1:1 kinetics for the high affinity Fc gamma receptor hFcγRI and by steady state binding for the low affinity Fc gamma receptors.

Examples 29-34: CDX Evaluation and In Vivo Study

Example 29: IHC staining of NCl—H446 for PTK7 (Performed at Crown Bioscience Taicang, China)

Formalin-fixed paraffin-embedded (FFPE) blocks were sectioned at 4 μm thickness on a manual rotary microtome onto a glass slide. The slides were baked at 60° C. for 30 min. A Bond RX autostainer (Leica) was used for staining with the following procedure: the slides were first treated with dewax solution (Leica) for 0.5 min at 72° C., then at rt and moved to alcohol, three times at rt. Next the slide was washed with Bond Wash buffer (Leica) for three times. Epitope retrieval was performed in Bond ER2 solution (Leica) for 20 min at 100° C. after a fast rinse in the same solution. The slide was subsequently washed shortly for four times in Bond wash buffer and subsequently for 3 minutes at rt. Peroxide block was performed for 10 minutes at rt after which it was washed again for three times. Subsequently, the primary antibody rabbit anti-human PTK7 (PA5-82070, Thermo Fisher, 0.25 μg/mL) was added and incubated for 1 h at rt. Followed by one quick wash and three times for 2 minutes in Bond wash buffer. The secondary antibody, goat anti-rabbit-HRP (Leica, ready to use), was added and incubated for 20 minutes at rt, followed by one quick wash and three times for 2 minutes in Bond wash buffer. The slides were rinsed with deionized water before the incubation with 3,3'-diaminobenzidine (DAB) Refine for 5 minutes at rt. After washing with deionized water for three times, the slides were treated with hematoxylin as counterstain for 10 minutes. Lastly all slides were washed with deionized water and bond wash buffer.

All stained sections were scanned with NanoZoomer-HT 2.0 Image system for 40× magnification. All the images of non-necrotic tumor regions were analyzed with HALO™ platform. The intensity of membrane positive staining was scored at four levels, 0 (negative), 1+(weak staining), 2+(medium staining), 3+(strong staining). The percentages of cells at different intensity levels were evaluated with H-score. H-Score=(% at 0)×0+(% at 1)×1+(% at 2)×2+(% at 3)×3 (H-Score range is 0 to 300). See Table 4 for the H-score of the NCl—H446 lung cancer xenograft cell line.

TABLE 4

Overview table of the binding of test antibodies and ADC to different human Fcγ receptors.

| | hCD16A | | hCD16B | hCD32A | | hCD32B | hCD64 |
|---|---|---|---|---|---|---|---|
| | FcγRIIIA$_{176F}$ | FcγRIIIA$_{176F}$ | FcγRIIIB | FcγRIIA$_{167R}$ | FcγRIIA$_{167H}$ | FcγRIIB | FcγRI |
| Trastuzumab | +++ | +++ | ++ | ++ | ++ | + | +++++ |
| 12C6 | ++ | +++ | ++ | ++ | ++ | ++ | +++++ |
| 12C6-3 | − | − | +/− | − | +/− | +/− | +++ |

Relative scale of binding (KD) is indicated:

+++++, 10$^{-9}$ to 10$^{-10}$M range;

++++, 10$^{-8}$M range;

+++, 10$^{-7}$M range;

++, 10$^{-6}$M,

+, 10$^{-5}$M range as determined by Biacore.

TABLE 4

| | | | IHC score NCI-H446 | | | |
|---|---|---|---|---|---|---|
| Total cells | Positive cells (%) | Weak positive cells (%) | Moderate positive cells (%) | Strong positive cells (%) | Negative cells (%) | H-Score |
| 370387 | 96.97 | 10.55 | 74.04 | 12.37 | 3.03 | 195.75 |

Example 30: In Vivo Efficacy Study (Performed at Crown Bioscience, Zhongshan, China)

NCl—H446, lung cancer xenograft model cell line was maintained in vitro using RPMI-1640 medium supplemented with 10% FBS in humidified cell culture incubator at 37° C. with standard 5% $CO_2$ specs. The cells in an exponential growth phase were harvested and counted for tumor inoculation.

BALB/c nude mice (female) of 7-9 weeks old received a subcutaneous injection in the right front flank region with $5 \times 10^6$ tumor cells in 0.1 ml of PBS mixed with Matrigel (1:1) for tumor development. When tumors reached an average size of 100-200 $mm^3$, randomization was performed into 10 groups of 8 mice and treatment began. Randomization will be performed based on "Matched distribution" method (Study Director™ Software, version 3.1.399.19). The date of randomization will be denoted as day 0.

Electronic caliper measurement were performed 2 times a week. Daily observations for clinical signs, food and water consumption, behavioral changes, animals were weighed 2 times per week. The endpoint of the experiment is a tumor volume of 3,000 $mm^3$, body weight loss over 20% or 28 days, whichever comes first.

Randomization: The randomization was performed when the mean tumor size reached approximately 100-200 $mm^3$. Totally 80 mice were enrolled in NCl—H446 model study and randomly allocated to 10 groups, with 8 mice per group. Randomization will be performed based on "Matched distribution" method (Study Director™ Software, version 3.1.399.19). The date of randomization will be denoted as day 0.

Test article administration: The test article administration was performed via intravenous injection through tail vein, and the dosing volume was 10 mL/kg. Treatment was initiated on the same day of randomization. Dosing was conducted in a Laminar Flow Cabinet.

Observation and data collection. After tumor cells inoculation, the animals are checked daily for morbidity and mortality. At the time of routine monitoring, the animals are checked for any adverse effects of tumor growth and treatments on normal behavior such as mobility, visual estimation of food and water consumption, body weight gain/loss, eye/hair matting and any other abnormal effects. Tumor volumes are measured every 3-4 days in two dimensions using an caliper, and the volume data are expressed in mm3 using the formula: $V=(L \times W \times W)/2$, where V is tumor volume, L is tumor length (the longest tumor dimension) and W is tumor width (the longest tumor dimension perpendicular to L). Dosing as well as tumor and body weight measurements will be conducted in a Laminar Flow Cabinet.

TABLE 5

Overview of test items and dose levels included in in vivo study

| Test item | Dose levels (mg/kg) | Group (N = 8) | Administration | Dosing Schedule |
|---|---|---|---|---|
| vehicle | — | 1 | IV | Single dose |
| cofetuzumab-Aur0101 | 2.33 | 2 | IV | Single dose |
| cofetuzumab-3 | 2.59 | 3 | IV | Single dose |
| | 5.18 | 4 | IV | Single dose |
| | 10.36 | 5 | IV | Single dose |
| cofetuzumab-4 | 1.03 | 6 | IV | Single dose |
| | 2.56 | 7 | IV | Single dose |
| cofetuzumab-5b | 2.59 | 8 | IV | Single dose |
| | 5.18 | 9 | IV | Single dose |
| B12-3 | 10.84 | 10 | IV | Single dose |

Figure 10:
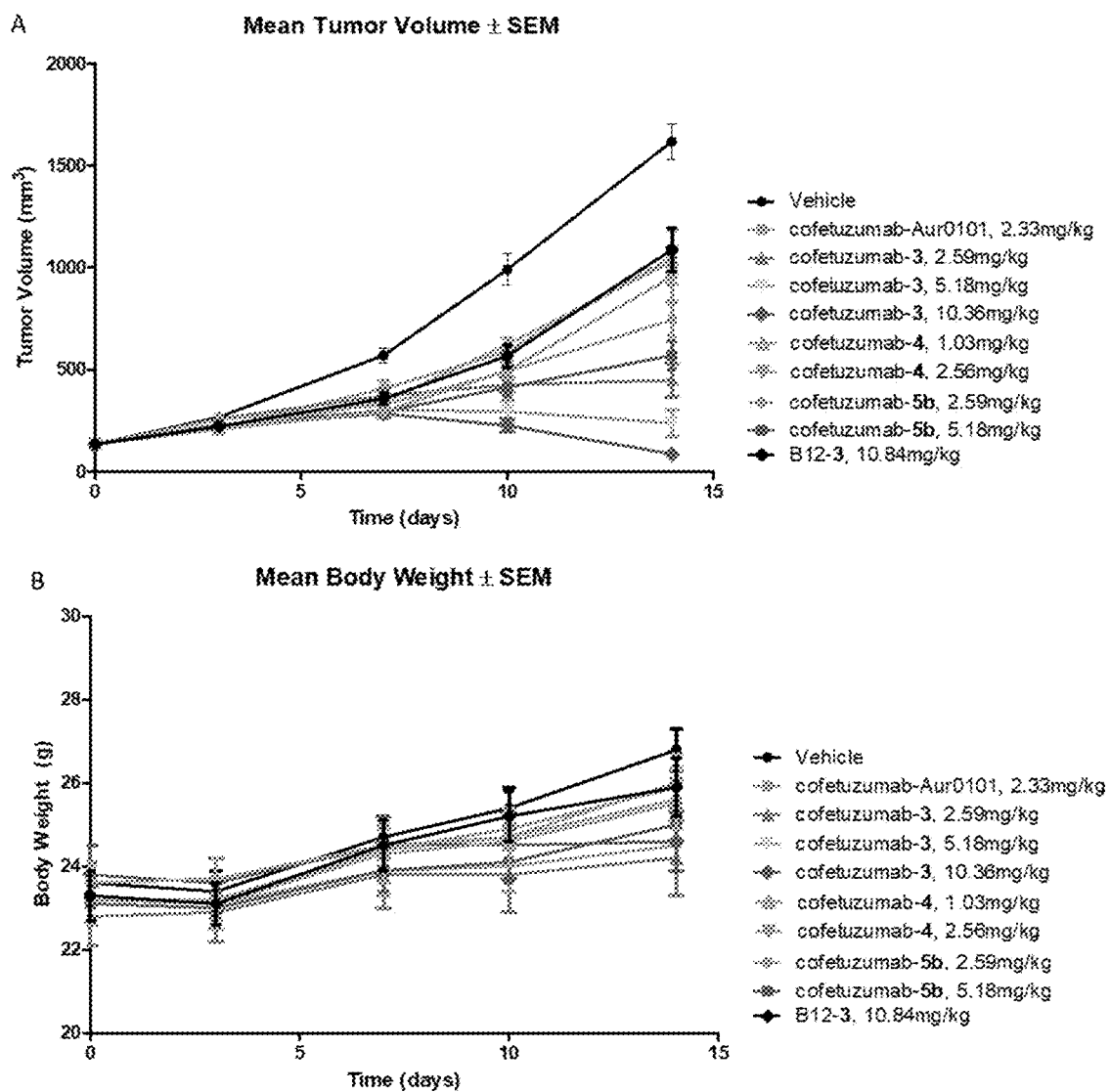
FIG. 10 shows: (A) the in vivo efficacy data on the PTK7 expressing NCI—H446 tumor model over time up to t=14 days and (B) the body weight of mice over time up to t=14 days.
Figure 10C:
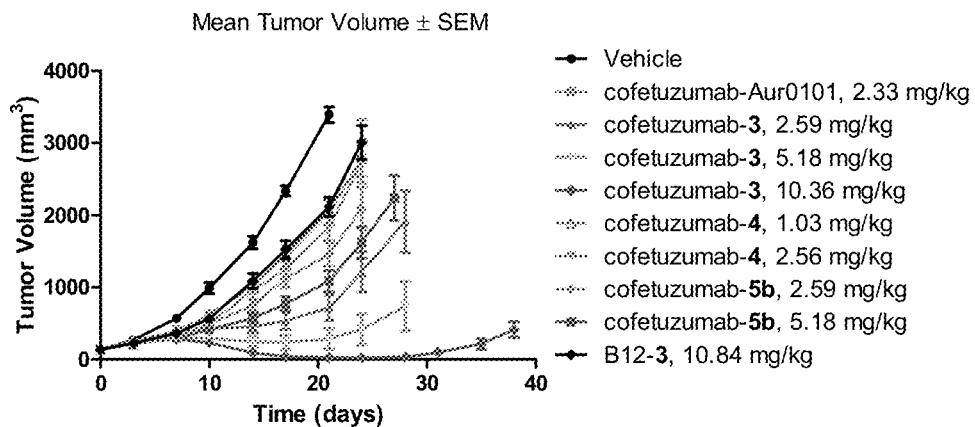
FIG. 10C shows the in vivo efficacy data on the PTK7 expressing NCI—H446 tumor model over time up to t=44 days.
Figure 10D:
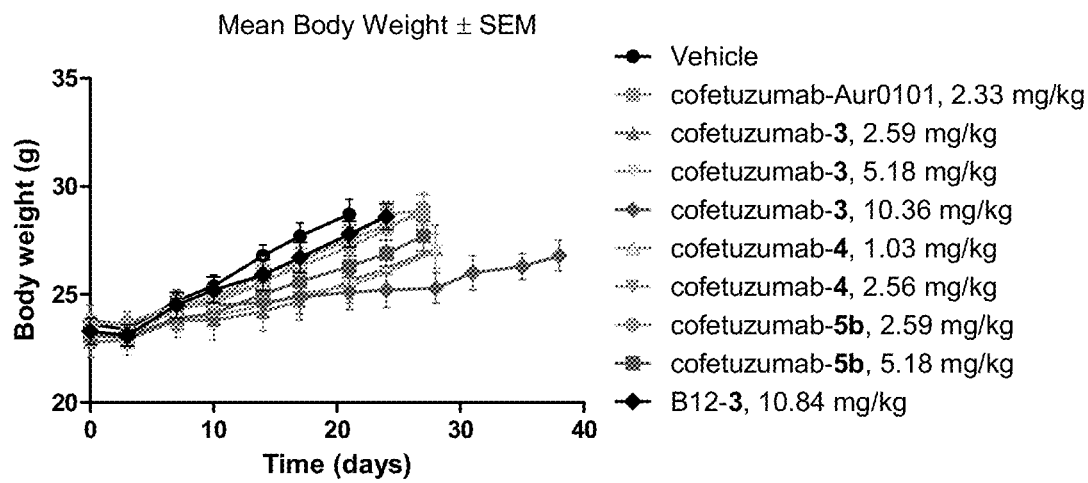
FIG. 10D shows the body weight of mice over time t=28 or 44 days. Cofetuzumab-3 leads to tumor regression with a clear dose-response (2.59, 5.18 and 10.36 mg/kg). Administration of cofetuzumab-5b ADC also shows a dose-response (2.59 and 5.18 mg/kg) leading to tumor growth delay. Other ADCs including cofetuzumab-Aur0101 show only marginal tumor growth delay (similar to isotype control ADC B12-3.

Tumor volume over time and mice body weight in the efficacy study with the test items above are depicted in FIGS. 10-10D.

Example 31: In Vivo Efficacy Study

NCl—H446, lung cancer xenograft model cell line was maintained in vitro using RPMI-1640 medium supplemented with 10% FBS in humidified cell culture incubator at 37° C. with standard 5% $CO_2$ specs. The cells in an exponential growth phase were harvested and counted for tumor inoculation.

BALB/c nude mice (female) of 7-9 weeks old received a subcutaneous injection in the right front flank region with $5 \times 10^6$ tumor cells in 0.1 ml of PBS mixed with Matrigel (1:1) for tumor development. When tumors reached an average size of 100-200 $mm^3$, randomization was performed into 6 groups of 8 mice and treatment began. Randomization will be performed based on "Matched distribution" method (Study Director™ Software, version 3.1.399.19). The date of randomization will be denoted as day 0.

Electronic caliper measurement were performed 2 times a week. Daily observations for clinical signs, food and water consumption, behavioral changes, animals were weighed 2 times per week. The endpoint of the experiment is a tumor volume of 3,000 $mm^3$, body weight loss over 20% or 77 days, whichever comes first.

Randomization: The randomization was performed when the mean tumor size reached approximately 136 $mm^3$. Totally 48 mice were enrolled in NCl—H446 model study and randomly allocated to 6 groups, with 8 mice per group. Randomization will be performed based on "Matched distribution" method (Study Director™ Software, version 3.1.399.19). The date of randomization will be denoted as day 0.

Test article administration: The test article administration was performed via intravenous injection through tail vein, and the dosing volume was 10 mL/kg. Treatment was initiated on the same day of randomization. Dosing was conducted in a Laminar Flow Cabinet.

Observation and data collection: After tumor cells inoculation, the animals are checked daily for morbidity and mortality. At the time of routine monitoring, the animals are checked for any adverse effects of tumor growth and treatments on normal behavior such as mobility, visual estimation of food and water consumption, body weight gain/loss, eye/hair matting and any other abnormal effects. Tumor volumes are measured every 3-4 days in two dimensions using an caliper, and the volume data are expressed in mm3 using the formula: V=(L×W×W)/2, where V is tumor volume, L is tumor length (the longest tumor dimension) and W is tumor width (the longest tumor dimension perpendicular to L). Dosing as well as tumor and body weight measurements will be conducted in a Laminar Flow Cabinet.

TABLE 6

Overview of test items and dose levels included in in vivo study

| Test item | Dose levels (mg/kg) | Group (N = 8) | Administration | Dosing Schedule |
|---|---|---|---|---|
| vehicle | — | 1 | IV | Single dose |
| cofetuzumab-3 | 5 | 2 | IV | Single dose |
| 12C6a-3 | 5 | 3 | IV | Single dose |
| 12C6-3 | 5 | 4 | IV | Single dose |
| 7C8-3 | 5 | 5 | IV | Single dose |
| 4D5-3 | 5 | 6 | IV | Single dose |

Figure 12A:
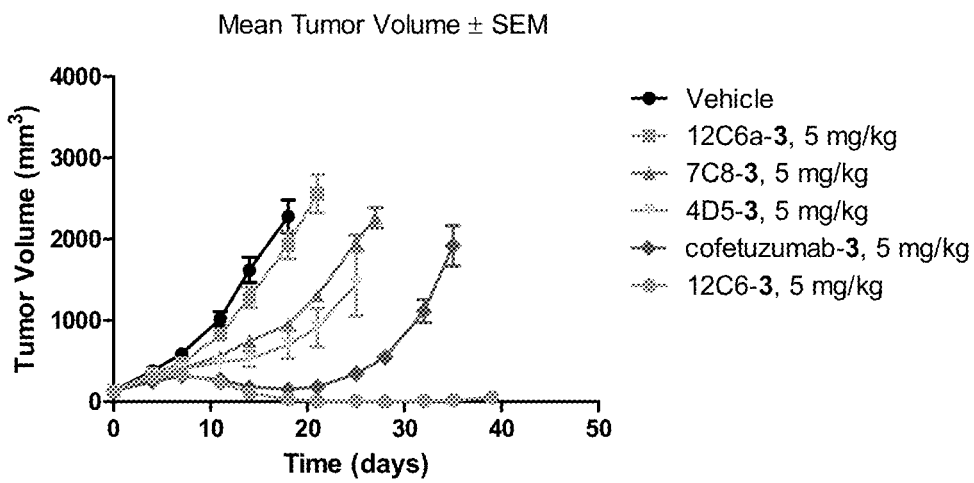
FIG. 12A shows the in vivo efficacy data on the PTK7 expressing NCI—H446 tumor model over time. 12C6-3 does not show tumor growth inhibition as it is similar to the vehicle. Both 7C8-3 and 4D5-3 show marginal tumor growth delay. Cofetuzumab-3 shows tumor growth inhibition, but also early regrowth of the tumor. 12C6-3 shows 99.7% tumor growth inhibition until day 40.
Figure 12B:
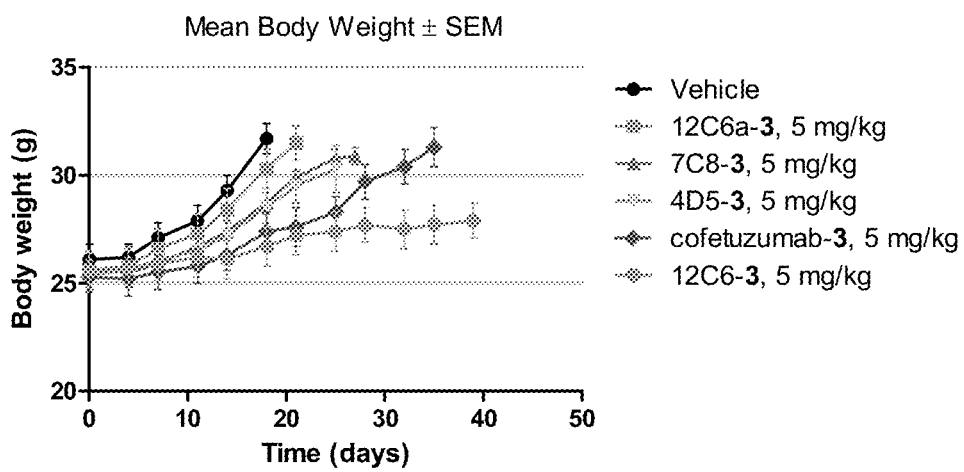
FIG. 12B shows the body weight of mice over time.
Figure 12C:
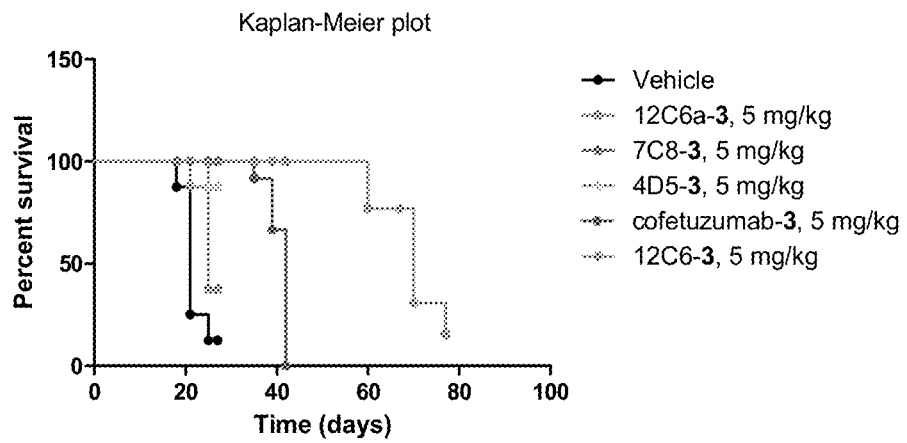
FIG. 12C shows the survival in a Kaplan-Meier plot of the NCI—H446 model over time.

Tumor volume over time and mice body weight in the efficacy study and the corresponding Kaplan-Meier plot with the test items above are depicted in FIGS. 12A, 12B and 12C.

Example 32: In Vivo Efficacy Study

BALB/c nude mice (female) of 7-9 weeks old received a tumor fragment of BR1282, a breast cancer patient derived xenograft model cell line. The tumor fragment (2-3 mm in diameter) was inoculated subcutaneously the right upper flank region. When tumors reached an average size of 100-200 mm$^3$, randomization was performed into 9 groups of 8 mice and treatment began. Randomization will be performed based on "Matched distribution" method (Study Director™ software, version 3.1.399.19). The date of randomization will be denoted as day 0.

Electronic caliper measurement were performed 2 times a week. Daily observations for clinical signs, food and water consumption, behavioral changes, animals were weighed 2 times per week. The endpoint of the experiment is a tumor volume of 3,000 mm$^3$, body weight loss over 20% or 39 days, whichever comes first.

Randomization: The randomization was performed when the mean tumor size reached approximately 135 mm$^3$. Totally 72 mice were enrolled in BR1282 model study and randomly allocated to 9 groups, with 8 mice per group. Randomization will be performed based on "Matched distribution" method (Study Director™ software, version 3.1.399.19). The date of randomization will be denoted as day 0.

Test article administration: The test article administration was performed via intravenous injection through tail vein, and the dosing volume was 10 mL/kg. Treatment was initiated on the same day of randomization. Dosing was conducted in a Laminar Flow Cabinet.

Observation and data collection: After tumor cells inoculation, the animals are checked daily for morbidity and mortality. At the time of routine monitoring, the animals are checked for any adverse effects of tumor growth and treatments on normal behavior such as mobility, visual estimation of food and water consumption, body weight gain/loss, eye/hair matting and any other abnormal effects. Tumor volumes are measured every 3-4 days in two dimensions using an caliper, and the volume data are expressed in mm3 using the formula: V=(L×W×W)/2, where V is tumor volume, L is tumor length (the longest tumor dimension) and W is tumor width (the longest tumor dimension perpendicular to L). Dosing as well as tumor and body weight measurements will be conducted in a Laminar Flow Cabinet.

TABLE 7

Overview of test items and dose levels included in in vivo study

| Test item | Dose levels (mg/kg) | Group (N = 8) | Administration | Dosing Schedule |
|---|---|---|---|---|
| vehicle | — | 1 | IV | Single dose |
| cofetuzumab-Aur0101 | 4 | 2 | IV | Single dose |
| cofetuzumab-3 | 4 | 3 | IV | Single dose |
|  | 8 | 4 | IV | Single dose |
| 12C6a-3 | 8 | 5 | IV | Single dose |
| 12C6-3 | 4 | 6 | IV | Single dose |
|  | 8 | 7 | IV | Single dose |
| 7C8-3 | 4 | 8 | IV | Single dose |
| 4D5 | 4 | 9 | IV | Single dose |

Figure 13A:
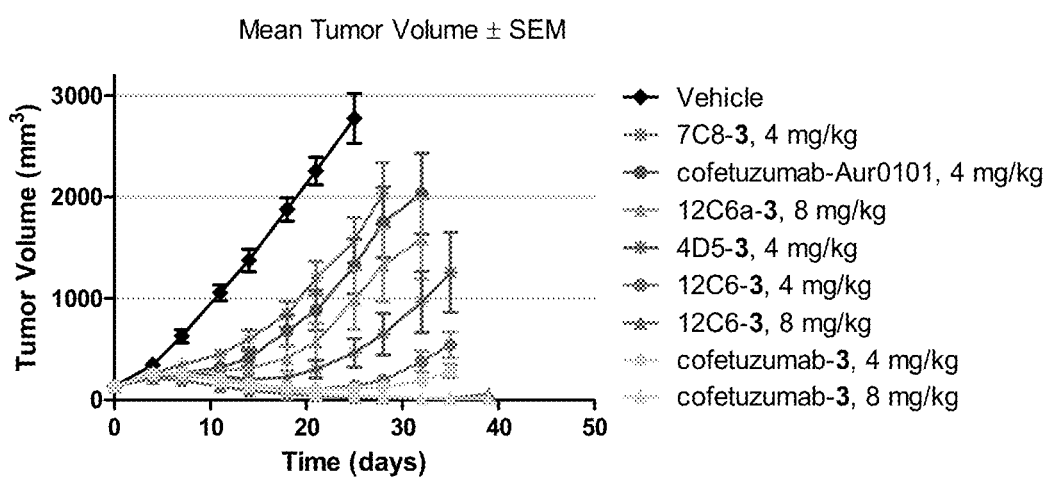
FIG. 13A shows the in vivo efficacy data on the PTK7 expressing BR1282 PDX tumor model over time. 12C6-3 has a better tumor growth inhibition rate than all 7C8-3, 4D5-3 and 12C6a-3 and even compared to cofetuzumab-Aur0101. When comparing to cofetuzumab-3, both ADCs show a similar response and equally good tumor growth inhibition.
Figure 13B:
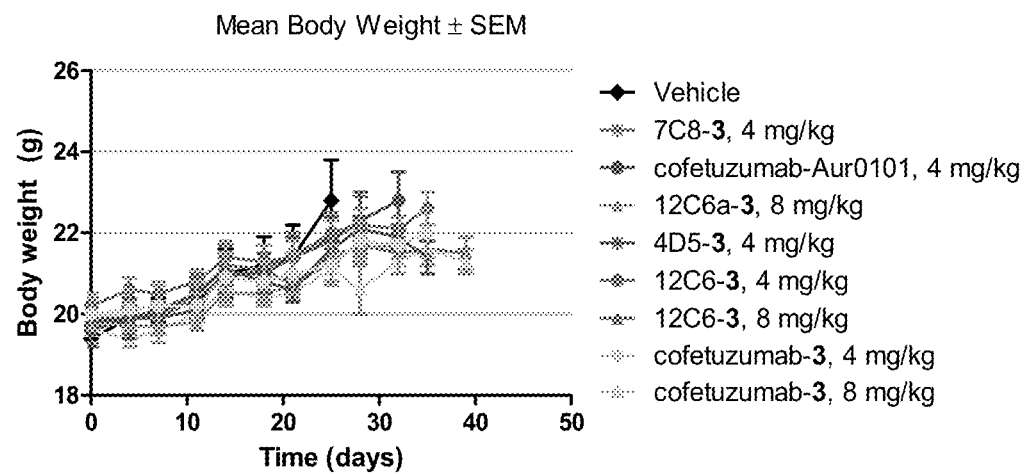
FIG. 13B shows the body weight of mice over time.

Tumor volume over time and mice body weight in the efficacy study with the test items above are depicted in FIGS. 13A and 13B.

Example 33: In Vivo Efficacy Study

NCl—H446, lung cancer xenograft model cell line was maintained in vitro using RPMI-1640 medium supplemented with 10% FBS in humidified cell culture incubator at 37° C. with standard 5% $CO_2$ specs. The cells in an exponential growth phase were harvested and counted for tumor inoculation.

BALB/c nude mice (female) of 7-9 weeks old received a subcutaneous injection in the right front flank region with $5 \times 10^6$ tumor cells in 0.1 ml of PBS mixed with Matrigel (1:1) for tumor development. When tumors reached an average size of 100-200 mm$^3$, randomization was performed into 5 groups of 8 mice and treatment began. Randomization will be performed based on "Matched distribution" method (Study Director™ Software, version 3.1.399.19). The date of randomization will be denoted as day 0.

Electronic caliper measurement were performed 2 times a week. Daily observations for clinical signs, food and water consumption, behavioral changes, animals were weighed 2 times per week. The endpoint of the experiment is a tumor volume of 3,000 mm$^3$, body weight loss over 20% or 28 days, whichever comes first.

Randomization: The randomization was performed when the mean tumor size reached approximately 100-200 mm$^3$. Totally 40 mice were enrolled in NCl—H$_{446}$ model study and randomly allocated to 5 groups, with 8 mice per group. Randomization will be performed based on "Matched distribution" method (Study Director™ Software, version 3.1.399.19). The date of randomization will be denoted as day 0.

Test article administration: The ADC test article administration was performed via intravenous injection through tail vein, and the dosing volume was 10 mL/kg. For the ADC single dose only, initiated on the same day of randomization. Olaparib administration was performed orally at a dose of 50 mg/kg QD×21 days, also initiated on the same day of randomization. Dosing was conducted in a Laminar Flow Cabinet.

Observation and data collection: After tumor cells inoculation, the animals are checked daily for morbidity and mortality. At the time of routine monitoring, the animals are checked for any adverse effects of tumor growth and treatments on normal behavior such as mobility, visual estimation of food and water consumption, body weight gain/loss, eye/hair matting and any other abnormal effects. Tumor volumes are measured every 3-4 days in two dimensions using an caliper, and the volume data are expressed in mm3 using the formula: V=(L×W×W)/2, where V is tumor volume, L is tumor length (the longest tumor dimension) and W is tumor width (the longest tumor dimension perpendicular to L). Dosing as well as tumor and body weight measurements will be conducted in a Laminar Flow Cabinet.

TABLE 8

Overview of test items and dose levels included in in vivo study

| Test item | Dose levels (mg/kg) | Dose level Olaparib (mg/kg) | Group (N = 8) | Administration | Dosing Schedule |
|---|---|---|---|---|---|
| vehicle | — | — | 1 | IV | Single dose |
| 12C6-3 | 2.5 | — | 2 | IV | Single dose |
| 12C6-3 | 2.5 | 50 | 3 | IV + PO | Single dose + QD × 21 days |
| vehicle | — | 50 | 4 | PO | QD × 21 days |
| 12C6-9 | 2.5 | — | 5 | IV | Single dose |

Figure 14A:
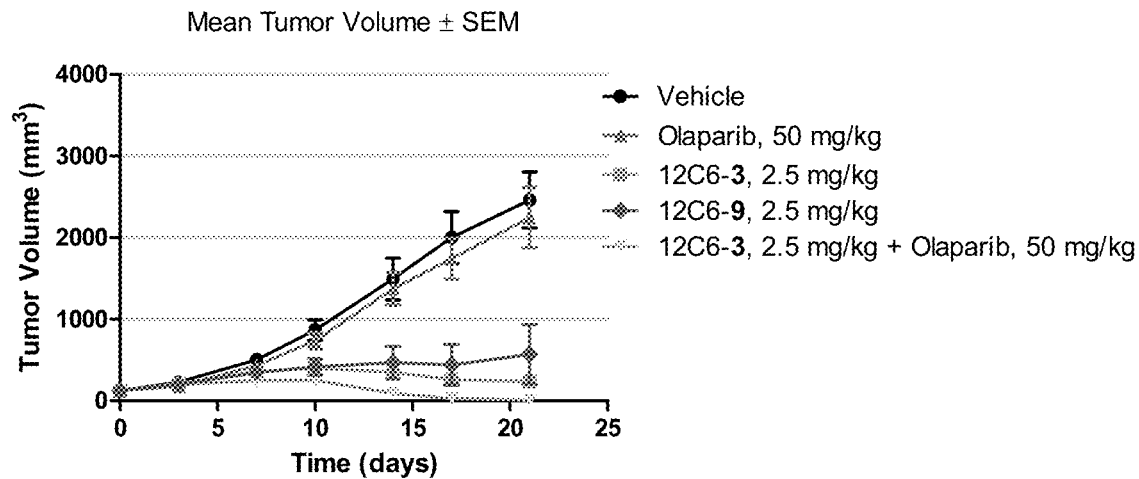
FIG. 14A shows the in vivo efficacy data on the PTK7 expressing NCI—H446 tumor model over time. Olaparib as single treatment shows no significant effect. Both 12C6-3 and 12C6-9 show tumor growth inhibition/stasis. The combination of Olaparib with 12C6-3, however, shows a clear additive effect resulting in the complete response of 6 out of 8 mice at day 21, with the study still ongoing.
Figure 14B:
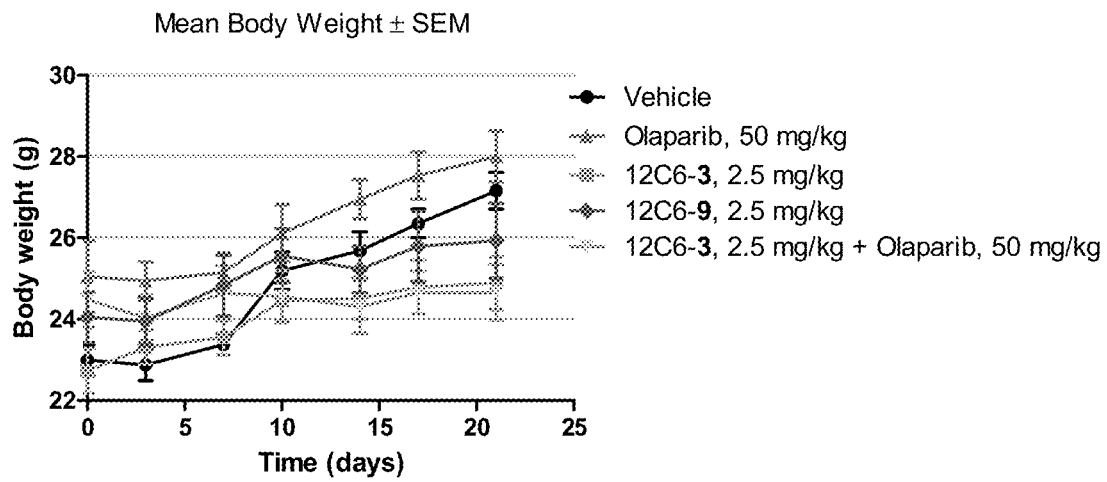
FIG. 14B shows the body weight of mice over time.

Tumor volume over time and mice body weight in the efficacy study with the test items above are depicted in FIGS. 14A and 14B.

Example 34: In Vivo Tolerability Study

Sprague Dawley rats (female) of 6-7 weeks old acclimatized for a week before being enrolled in the study.

Randomization: In the tolerability study totally 15 rats were enrolled and randomly allocated to 5 study groups with 3 rats per group. Randomization was performed based on "Matched distribution" method (StudyDirector™ software, version 3.1.399.19). The date of randomization was denoted as day 0.

Test Article Administration: The treatment was initiated on the same day of randomization (day 0) per study design. Chosen dose levels were 75, 100, 125 and 150 mg/kg, single dose. All animals were dosed via slow intravenous injection (10 mL/kg).

Observation and Data Collection After randomization: The animals were checked daily for morbidity and mortality. During routine monitoring, the animals were checked for any effects of treatments on behavior such as mobility, food and water consumption, body weight gain/loss, eye/hair matting and any other abnormalities. Mortality and observed clinical signs were recorded for individual animals in detail. Dosing as well as body weight measurements were conducted in a Laminar Flow Cabinet. The body weights were measured daily by using StudyDirector™ software (version 3.1.399.19).

Figure 15:
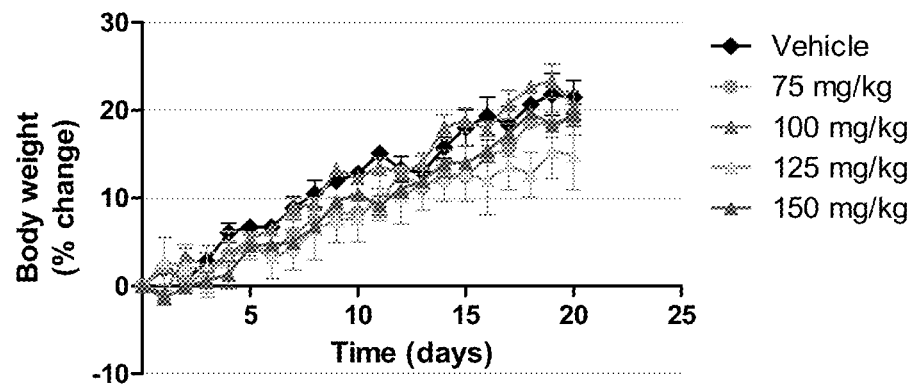
FIG. 15 shows the in vivo tolerability data of 12C6-3 in female Sprague Dawley rats over time. In all concentrations no toxicity and body weight loss was observed. Therefore the maximum tolerated dose is higher than 150 mg/kg.

Body weight of the rats over time with 12C6-3 as test item at several dose levels are depicted in FIG. 15.

The invention claimed is:

1. An antibody-conjugate according to general structure (1):

$$AB\text{-}[(L^6)_b\text{-}\{Z\text{-}L\text{-}D\}_x]_y \quad (1)$$

wherein:

AB is an anti-PTK7 antibody comprising a light chain and a heavy chain comprising the amino acid sequences set forth in SEQ ID NO: 20 and 19, respectively;

$L^6$ is -GlcNAc(Fuc)$_w$-(G)$_j$-S-(L$^7$)$_{w'}$-;

G is selected from galactose, glucose, N-acetylgalactosamine, N-acetylglucosamine, mannose or N-acetylneuraminic acid;

j is an integer in the range of 0-10;

S is GalNAc;

GlcNAc is N-acetylglucosamine;

Fuc is fucose;

w is 0 or 1;

w' is 0, 1 or 2;

b is 0 or 1;

x is 1 or 2;

y is 1, 2, 3 or 4;

$L^7$ is —N(H)C(O)CH$_2$—, —N(H)C(O)CF$_2$— or —CH$_2$—; and

—Z-L-D is:

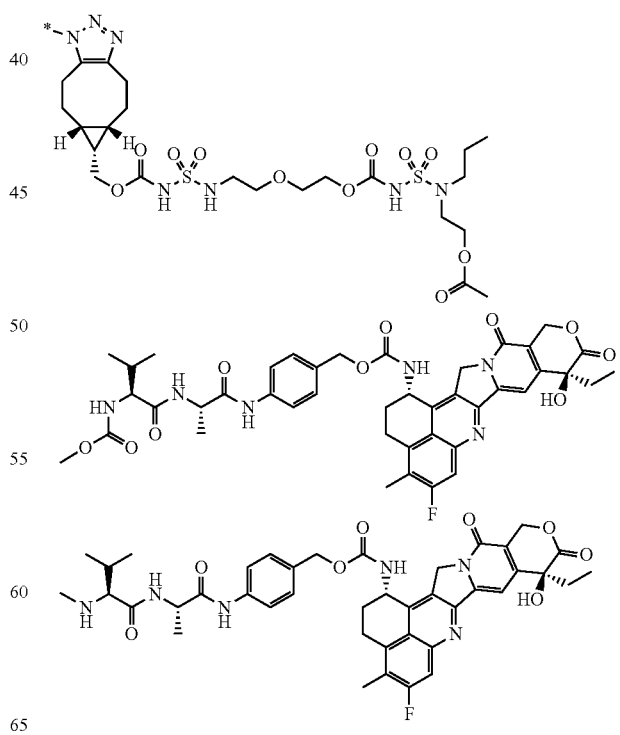

wherein * is the point of attachment of —Z-L-D to L⁶,
or a pharmaceutically acceptable salt thereof.

2. The antibody-conjugate of claim 1, wherein j is 0.

3. The antibody-conjugate of claim 1, wherein w' is 0.

4. The antibody-conjugate according to claim 1, wherein x is 1.

5. The antibody-conjugate according to claim 1, wherein y is 2.

6. The antibody-conjugate of claim 1, wherein said antibody-conjugate is of the following formula:

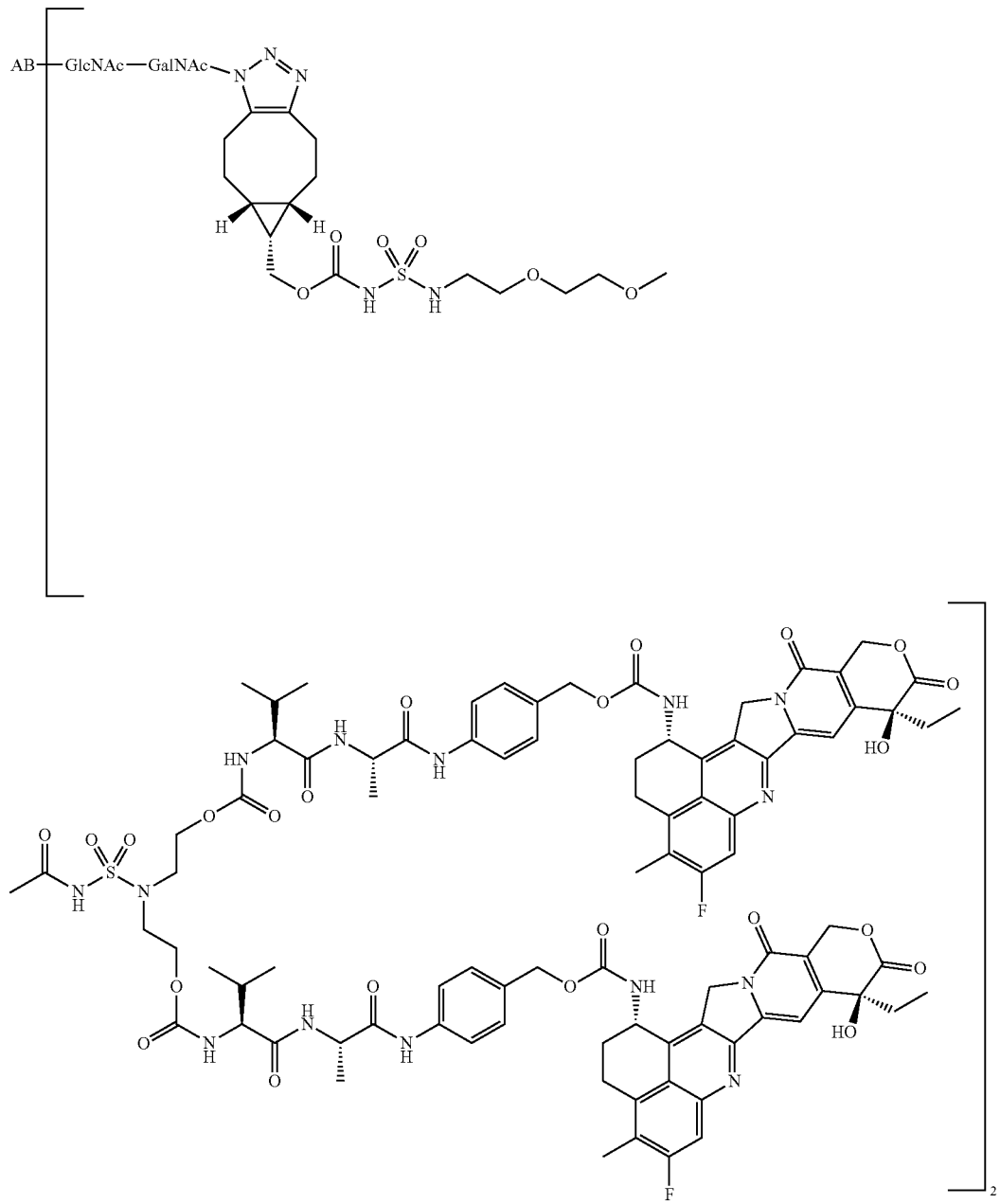

or a pharmaceutically acceptable salt thereof.

7. The antibody-conjugate of claim 1, wherein said antibody-conjugate is of the following formula:

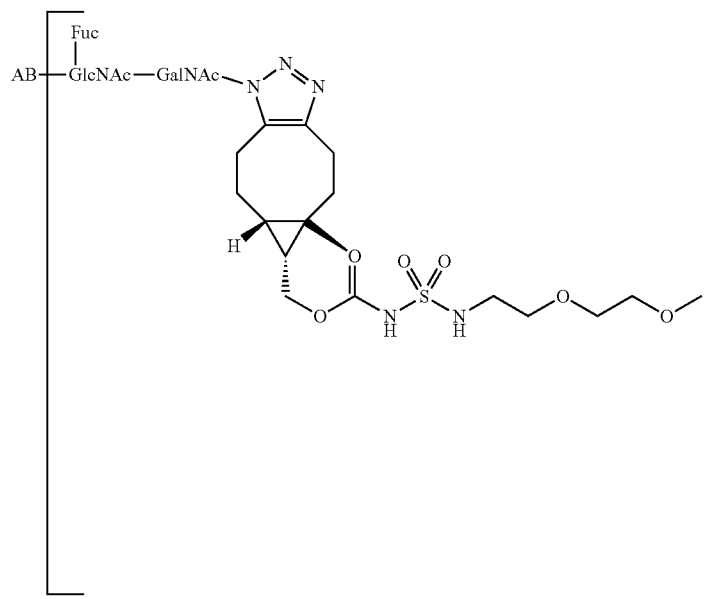
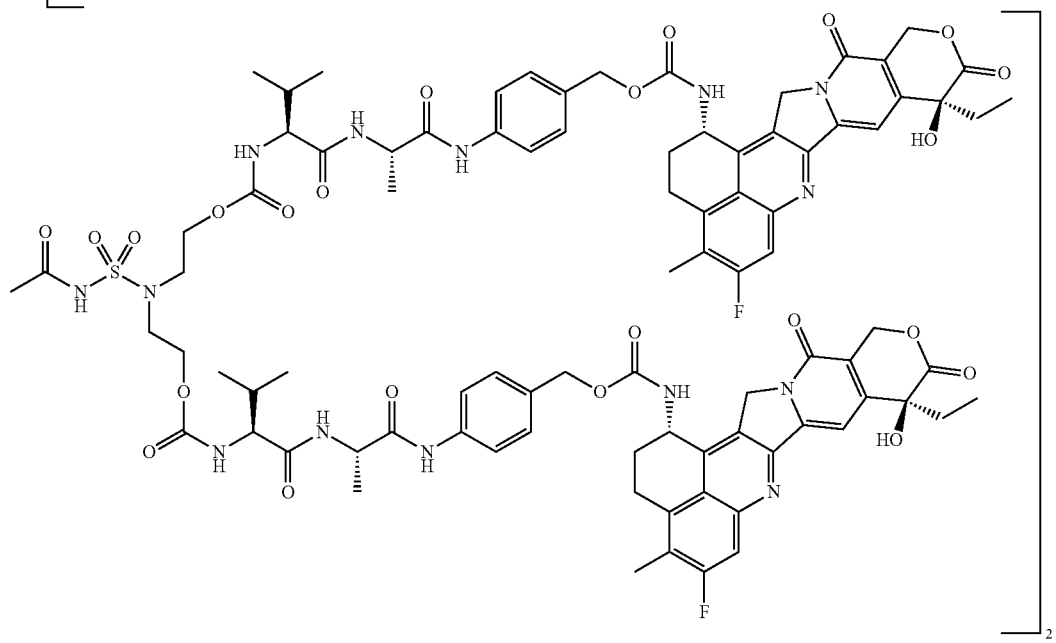
or a pharmaceutically acceptable salt thereof.
8. The antibody-conjugate according to claim 1, wherein w is 0.
9. The antibody-conjugate according to claim 1, wherein w is 1.
* * * * *